US011603197B2

(12) United States Patent
Bublitsky

(10) Patent No.: US 11,603,197 B2
(45) Date of Patent: Mar. 14, 2023

(54) MODULAR VEHICLE SYSTEM

(71) Applicant: ISRAEL AEROSPACE INDUSTRIES LTD., Lod (IL)

(72) Inventor: Ron Bublitsky, Haifa (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 688 days.

(21) Appl. No.: 16/331,736

(22) PCT Filed: Sep. 11, 2017

(86) PCT No.: PCT/IL2017/051025
§ 371 (c)(1),
(2) Date: Mar. 8, 2019

(87) PCT Pub. No.: WO2018/047187
PCT Pub. Date: Mar. 15, 2018

(65) Prior Publication Data
US 2019/0210724 A1      Jul. 11, 2019

(30) Foreign Application Priority Data

Sep. 12, 2016  (IL) .......................................... 247772

(51) Int. Cl.
*B64C 39/02*      (2006.01)
*B64C 27/08*      (2023.01)
(Continued)

(52) U.S. Cl.
CPC .............. *B64C 39/024* (2013.01); *B64C 3/00* (2013.01); *B64C 3/10* (2013.01); *B64C 27/08* (2013.01);
(Continued)

(58) Field of Classification Search
CPC ........... B64C 39/024; B64C 3/00; B64C 3/10; B64C 27/08; B64C 37/00;
(Continued)

(56) References Cited

U.S. PATENT DOCUMENTS 1,783,458 A  *  12/1930  Windsor .............. B64C 29/0033
                                                                244/6
2,825,514 A  *   3/1958  Focke .................. B64C 29/0033
                                                                244/7 R
(Continued)

FOREIGN PATENT DOCUMENTS

CN         102923296 A      2/2013
CN         105235891 A      1/2016
(Continued)

OTHER PUBLICATIONS

Adam Savage's Tested, "Wingcopter Drone Suitable for Beer Delivery", https://www.tested.com/tech/robots/456672-wingcopter-drone-suitable-for-beer-delivery/; Accessed Jun. 6, 2019, Jul. 5, 2013, 3 pages.
(Continued)

*Primary Examiner* — Medhat Badawi
(74) *Attorney, Agent, or Firm* — Dorsey & Whitney LLP

(57) ABSTRACT

A modular vehicle system includes at least one body module having at least one body connection interface, and a kit. The kit includes a plurality of utility modules including at least one first utility module (in the form of a fixed-wing utility module) and at least one second utility module (in the form of a rotor-wing utility module). Each first utility module includes at least one utility module connection interface in the form of a first utility module connection interface for coupling with the body connection interface. Each second utility module includes at least one utility module connection interface in the form of a second utility module connection interface, distinct from the first utility module con- (Continued)

nection interface, for coupling with the body connection interface. Each body connection interface is configured for selective reversible coupling at least with respect to any one of the utility module connection interfaces while concurrently excluding coupling of another utility module connection interface thereto, to provide an air vehicle.

26 Claims, 30 Drawing Sheets

(51) Int. Cl.
    *B64C 3/00*     (2006.01)
    *B64C 3/10*     (2006.01)
    *B64C 37/00*     (2006.01)
    *B64D 27/24*     (2006.01)

(52) U.S. Cl.
    CPC .............. *B64C 37/00* (2013.01); *B64D 27/24* (2013.01); *B64C 2201/027* (2013.01); *B64C 2201/104* (2013.01); *B64C 2201/165* (2013.01); *B64C 2211/00* (2013.01)

(58) Field of Classification Search
    CPC ........ B64C 2201/027; B64C 2201/104; B64C 2201/165; B64C 2211/00; B64C 2201/021; B64C 2201/028; B64C 2201/042; B64C 2201/108; B64D 27/24
    See application file for complete search history.

(56) References Cited

U.S. PATENT DOCUMENTS

| | | | | |
|---|---|---|---|---|
| 2,936,967 A * | 5/1960 | Dancik | B64C 29/0033 | 244/7 C |
| 2,944,395 A * | 7/1960 | Doak | B64C 9/38 | 239/265.29 |
| 2,969,935 A * | 1/1961 | Price | B64C 29/0033 | 244/7 C |
| 4,828,203 A * | 5/1989 | Clifton | B64C 29/0025 | 244/12.3 |
| 4,880,071 A * | 11/1989 | Tracy | B64C 29/0033 | 180/117 |
| 8,070,090 B2 * | 12/2011 | Tayman | B64C 39/024 | 244/7 C |
| 8,205,820 B2 * | 6/2012 | Goossen | B64C 39/024 | 244/2 |
| 9,045,226 B2 * | 6/2015 | Piasecki | B64C 27/32 | |
| 9,120,560 B1 * | 9/2015 | Armer | B64C 29/0025 | |
| 9,150,301 B2 * | 10/2015 | Liu | B64C 39/024 | |
| 9,540,101 B2 * | 1/2017 | Paduano | B64C 13/16 | |
| 10,196,143 B2 * | 2/2019 | Quinlan | B64C 3/00 | |
| 10,640,203 B2 * | 5/2020 | Eadie | B64C 27/33 | |
| 10,780,970 B2 * | 9/2020 | Harris | B64C 39/024 | |
| 11,034,245 B1 * | 6/2021 | Cottrell | B64D 27/24 | |
| 2003/0094537 A1 * | 5/2003 | Austen-Brown | B64C 29/0033 | 244/7 R |
| 2005/0029400 A1 * | 2/2005 | Ouellette | B64D 7/00 | 244/120 |
| 2005/0236520 A1 * | 10/2005 | Wukowitz | B64C 9/02 | 244/105 |
| 2006/0016930 A1 * | 1/2006 | Pak | B64D 35/04 | 244/12.4 |
| 2007/0018035 A1 * | 1/2007 | Saiz | B64C 29/0033 | 244/12.3 |
| 2008/0149758 A1 * | 6/2008 | Colgren | B64C 39/024 | 244/13 |
| 2009/0145998 A1 * | 6/2009 | Salyer | B64D 27/10 | 244/17.23 |
| 2009/0256026 A1 * | 10/2009 | Karem | B64C 27/08 | 244/99.2 |
| 2011/0046821 A1 * | 2/2011 | Grabowsky | B64C 3/56 | 701/3 |
| 2011/0163197 A1 * | 7/2011 | Farrag | B62J 17/08 | 244/2 |
| 2012/0083945 A1 * | 4/2012 | Oakley | B64C 25/52 | 701/2 |
| 2012/0091257 A1 * | 4/2012 | Wolff | B64C 29/0033 | 244/12.4 |
| 2015/0266576 A1 * | 9/2015 | Hobbart | B60F 3/0007 | 244/2 |
| 2016/0114887 A1 * | 4/2016 | Zhou | H04N 5/23238 | 348/148 |
| 2016/0129998 A1 * | 5/2016 | Welsh | B64C 27/24 | 244/12.3 |
| 2016/0221689 A1 * | 8/2016 | Tridico | B64C 39/024 | |
| 2016/0236772 A1 * | 8/2016 | Tang | B64C 39/024 | |
| 2016/0244160 A1 * | 8/2016 | Colten | B64C 39/024 | |
| 2016/0297520 A1 * | 10/2016 | Sada-Salinas | B64D 17/80 | |
| 2017/0015418 A1 * | 1/2017 | Matus | B64C 39/024 | |
| 2017/0036771 A1 * | 2/2017 | Woodman | B64C 25/54 | |
| 2017/0073070 A1 * | 3/2017 | Xing | B60F 3/0061 | |
| 2017/0253333 A1 * | 9/2017 | Baudet | B64C 1/30 | |
| 2018/0016022 A1 * | 1/2018 | Ljung | B64D 35/04 | |
| 2018/0086458 A1 * | 3/2018 | Sartorius | B64C 3/187 | |
| 2018/0126871 A1 * | 5/2018 | Martinotti | B62D 63/025 | |
| 2018/0312251 A1 * | 11/2018 | Petrov | B64C 27/28 | |
| 2018/0359419 A1 * | 12/2018 | Hu | G03B 15/006 | |
| 2019/0210724 A1 * | 7/2019 | Bublitsky | B64D 27/24 | |
| 2021/0197965 A1 * | 7/2021 | Kunz | B64C 39/024 | |

FOREIGN PATENT DOCUMENTS

| | | |
|---|---|---|
| FR | 3025495 A1 | 3/2016 |
| RU | 2523873 C1 | 7/2014 |
| WO | 2010025860 A2 | 3/2010 |
| WO | 2010137016 A2 | 12/2010 |
| WO | 2011149544 A1 | 12/2011 |
| WO | 2018208652 A1 | 11/2018 |

OTHER PUBLICATIONS

Aviation Week Network—Warwick, Graham, "How to Make a Fixed-Wing UAV Fly Vertically", https://aviationweek.com/blog/how-make-fixed-wing-uav-fly-vertically; Accessed Jun. 6, 2019, Apr. 24, 2014, 3 pages.

DIY Drones—Anderson, Chris, "A newbie's guide to UAVs", https://diydrones.com/profiles/blogs/a-newbies-guide-to-uavs; Accessed Jun. 6, 2019, Mar. 28, 2009, 9 pages.

DIY Drones—Hesselbarth, Jonathan, "ArduVTOL—Wingcopter—Flight Report Nr.1", https://diydrones.com/profiles/blogs/arduvtol-wingcopter-flight-report-nr-1; Accessed Jun. 6, 2019, May 17, 2013, 8 pages.

DIY Drones—Janetzko, Andy, "Wingcopter Fixed-Wing-Airplane/Quadcopter Fusion VTOL UAV", https://diydrones.com/forum/topics/wingcopter-fixed-wing-airplane-quadcopter-fusion-vtol-uav; Accessed on Jun. 18, 2019, Dec. 7, 2012, 8 pages.

engineering.com—Spendlove, Tom, "SkyProwler—VTOL UAV Transforms to Fast Fixed Wing Cruiser", https://www.engineering.com/PLMERP/ArticleID/10120/SkyProwler--VTOL-UAV-Transforms-to-Fast-Fixed-Wing-Cruiser.aspx; Accessed Jun. 6, 2019, May 14, 2015, 2 pages.

Insitu—A Boeing Company, "ScanEagle 3 Brochure", https://www.insitu.com/images/uploads/pdfs/Insitu_ScanEagle3_Subfolder_fnl.pdf; Accessed Jun. 6, 2019, 2 pages.

Intelligent Aerospace—Howard, Courtney E., "Insitu launches ScanEagle3 UAS at Xponential 2018", https://www.intelligent-aerospace.com/unmanned/article/16545306/insitu-launches-scaneagle3-uas-at-xponential-2018; Accessed Jun. 6, 2019, May 1, 2018, 10 pages.

Krossblade Aerospace, "SkyProwler 2", https://www.krossblade.com/; Accessed Jun. 6, 2019, 2019, 6 pages.

Naval Research Laboratory, "Stop-Rotor Rotary Wing Aircraft", http://www.nrl.navy.mil/techtransfer/sites/www.nrl.navy.mil.techtransfer/files/files/stoprotor.pdf; Accessed Aug. 12, 2016, 1 pages.

New Atlas—Belezina, Jan, "Hybrid RotorWing design transitions from fixed to rotary wing mid-flight", https://newatlas.com/hybrid-rotorwing-stop-rotor/27092/; Accessed Jun. 6, 2019, Apr. 21, 2013, 5 pages.

(56) References Cited

OTHER PUBLICATIONS

New Atlas—Coxworth, Ben, "SkyProwler combines a quadcopter and a fixed-wing airplane in one device", https://newatlas.com/skyprowler-fixed-wing-quadcopter/36154/?li_source=LI&li_medium=default-widget?li_source=LI&li_medium=default-widget; Accessed Jun. 6, 2019, Feb. 18, 2015, 3 pages.

New Atlas—Hanlon, Mike, "Concept aircraft combines VTOL with fixed wing capabilities", https://newatlas.com/go/1571/; Accessed Jun. 6, 2019, Jun. 4, 2004, 2 pages.

New Atlas—Hanlon, Mike, "SkyTote—the VTOL UAV that transitions into horizontal flight", https://newatlas.com/skytote-the-vtol-uav-that-transitions-into-horizontal-flight/5478/; Accessed Jun. 6, 2019, Apr. 7, 2006, 4 pages.

New Atlas—Moss, Richard, "VTOL Kestrel drone morphs into fixed-wing aircraft after takeoff", https://newatlas.com/vtol-kestrel-drone-rotary-fixed-wing/41244/?li_source=LI&li_medium=default-widget; Accessed Jun. 6, 2019, Jan. 8, 2016, 2 pages.

New Atlas—New Atlas Team, "VTOL Flying-Wing: a new take on UAV design", https://newatlas.com/flying-wing-vtol-uav/13962/; Accessed Jun. 6, 2019, Jan. 1, 2010, 3 pages.

NewScientist—Glaskin, Max, "Disc-shaped spyplane could hunt for terrorists", https://www.newscientist.com/article/dn1859-disc-shaped-spyplane=-could-hunt-for-terrorists/; Accessed Jun. 6, 2019, Feb. 4, 2002, 5 pages.

PCT, "International Search Report and Written Opinion", Application No. PCT/IL2017/051025, dated Dec. 27, 2017, 9 pages.

Pranay, Sinha et al., "Versatile, modular, extensible vtol aerial platform with autonomous flight mode transitions", 2012 IEEE Aerospace Conference; IEEE 0.1109/AERO.2012.6187313; Accessed Jun. 6, 2019; Abstract, Mar. 3-10, 2012, 3 pages.

RC Groups, "Chimera VTOL (tricopter tilt rotor)", https://www.rcgroups.com/forums/showthread.php71816216-Chimera-VTOL-(tricopter-tilt-rotor); Accessed Jun. 6, 2019, Jan. 23, 2013, 6 pages.

RC Groups, "VTOL RC aircraft concepts, designs and links", https://www.rcgroups.com/forums/showthread.php?2056389-VTOL-RC-aircraft-concepts-designs-and-links; Accessed Jun. 6, 2019, Dec. 15, 2013, 24 pages.

Sandia National Laboratories, "Unique Mobility—Volant", https://www.sandia.gov/research/robotics/unique_mobility/volant.html; Accessed Jun. 6, 2019, 2019, 2 pages.

StopRotor, "Website Home Page", http://www.stoprotor.com.au/; Accessed Jun. 6, 2019, 4 pages.

U.S. Naval Research Laboratory, "Stop-Rotor Rotary Wing Aircraft", https://www.nrl.navy.mil/techtransfer/available-technologies/electronics/stop-rotor-rotary-wing-aircraft; Accessed Jun. 6, 2019, 2 pages.

WingCopter, "Website Home Page", https://wingcopter.com/; Accessed Jun. 6, 2019, 2018, 3 pages.

Youtube, "Insitu ScanEagle3—Features and Benefits Video", https://www.youtube.com/watch?v=cwywTWNFXtA; Accessed Jun. 6, 2019, May 1, 2018, 2 pages.

\* cited by examiner

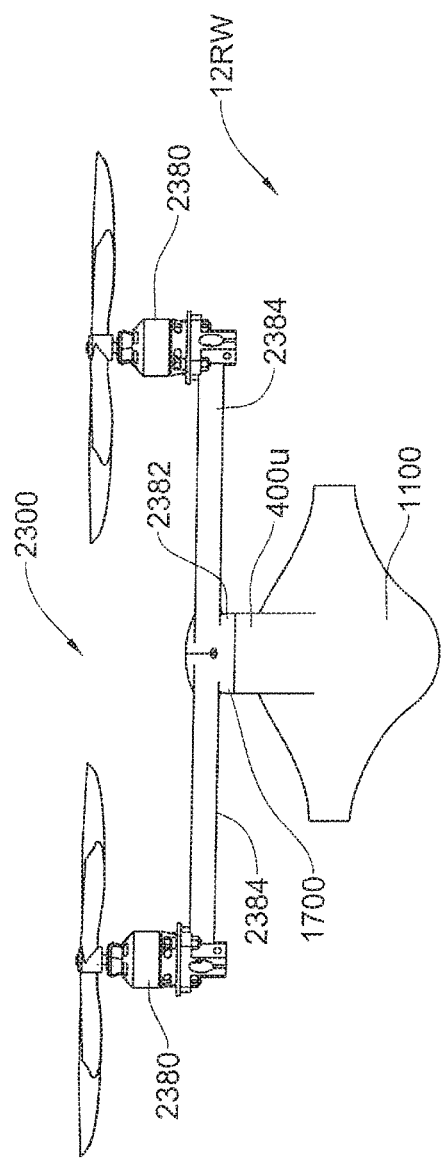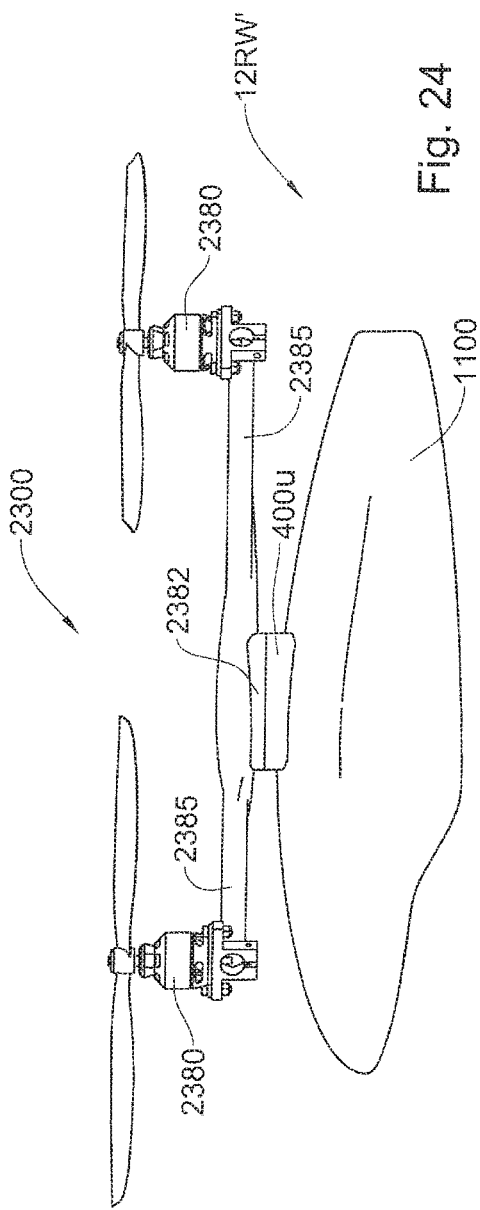

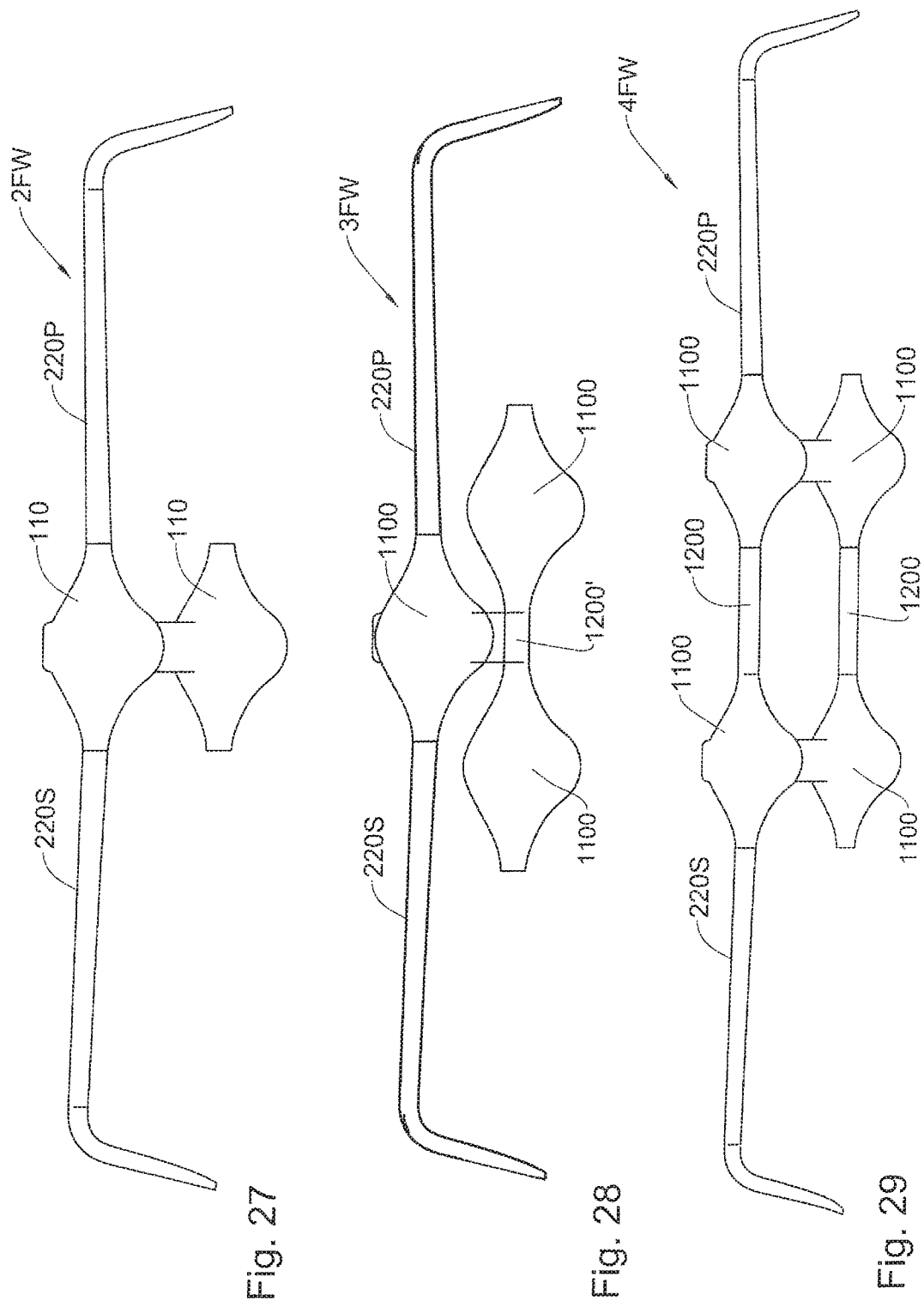

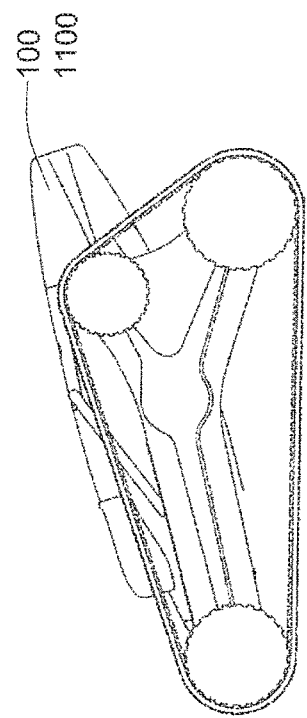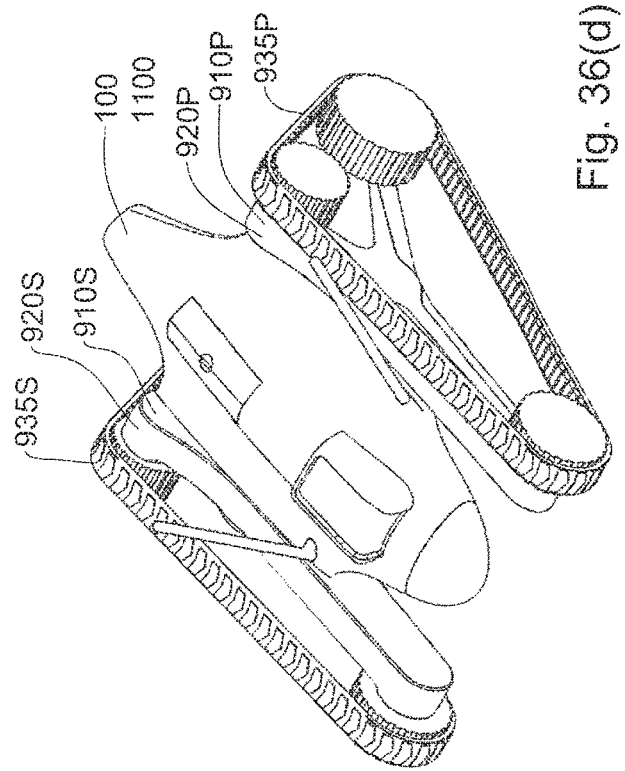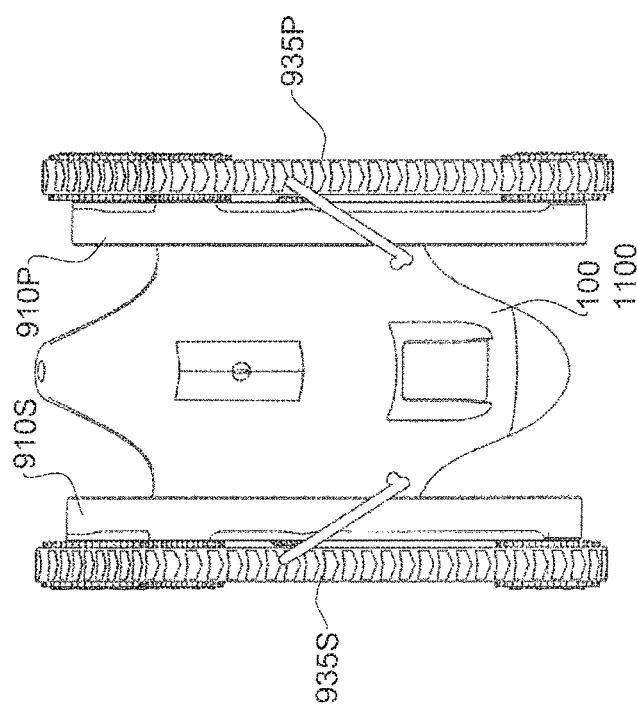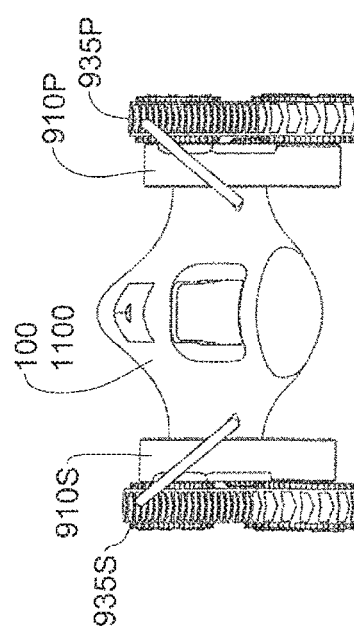

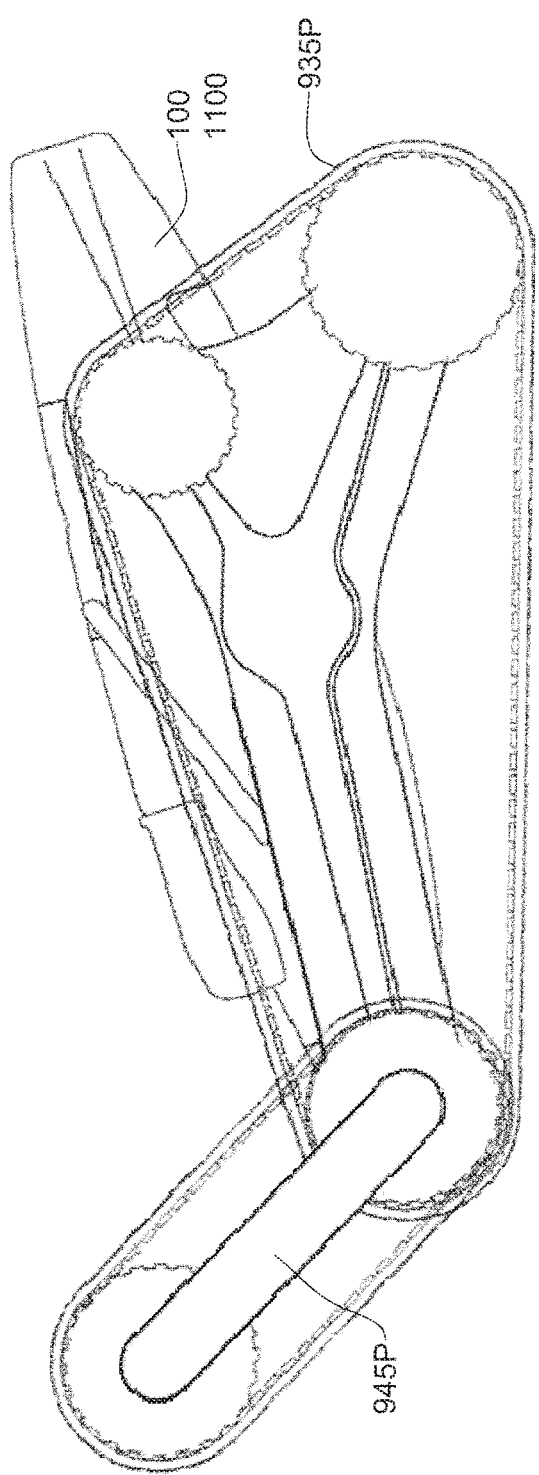
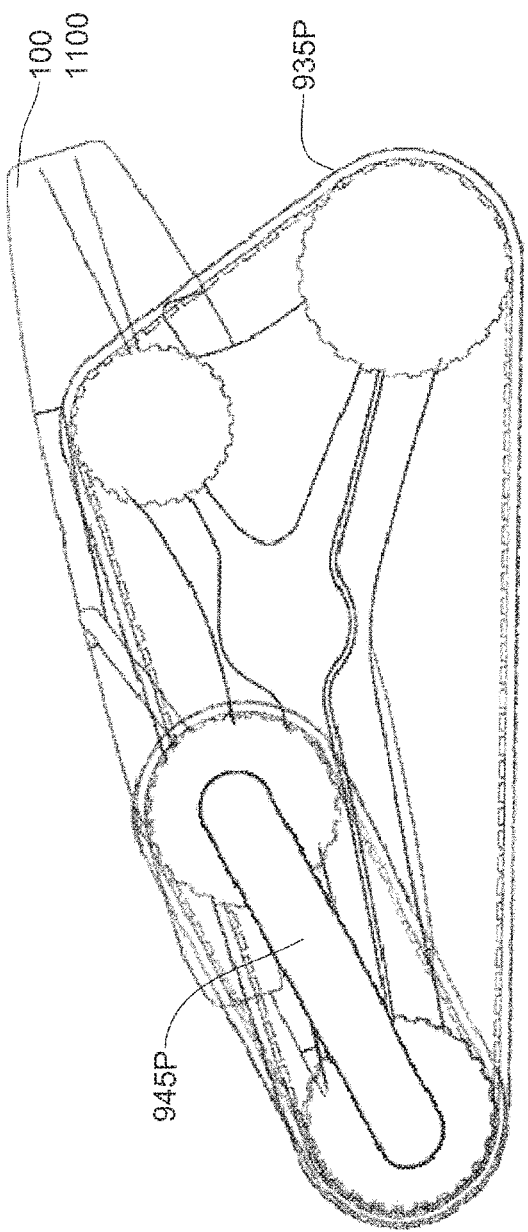
Fig. 37(a)
Fig. 37(b)

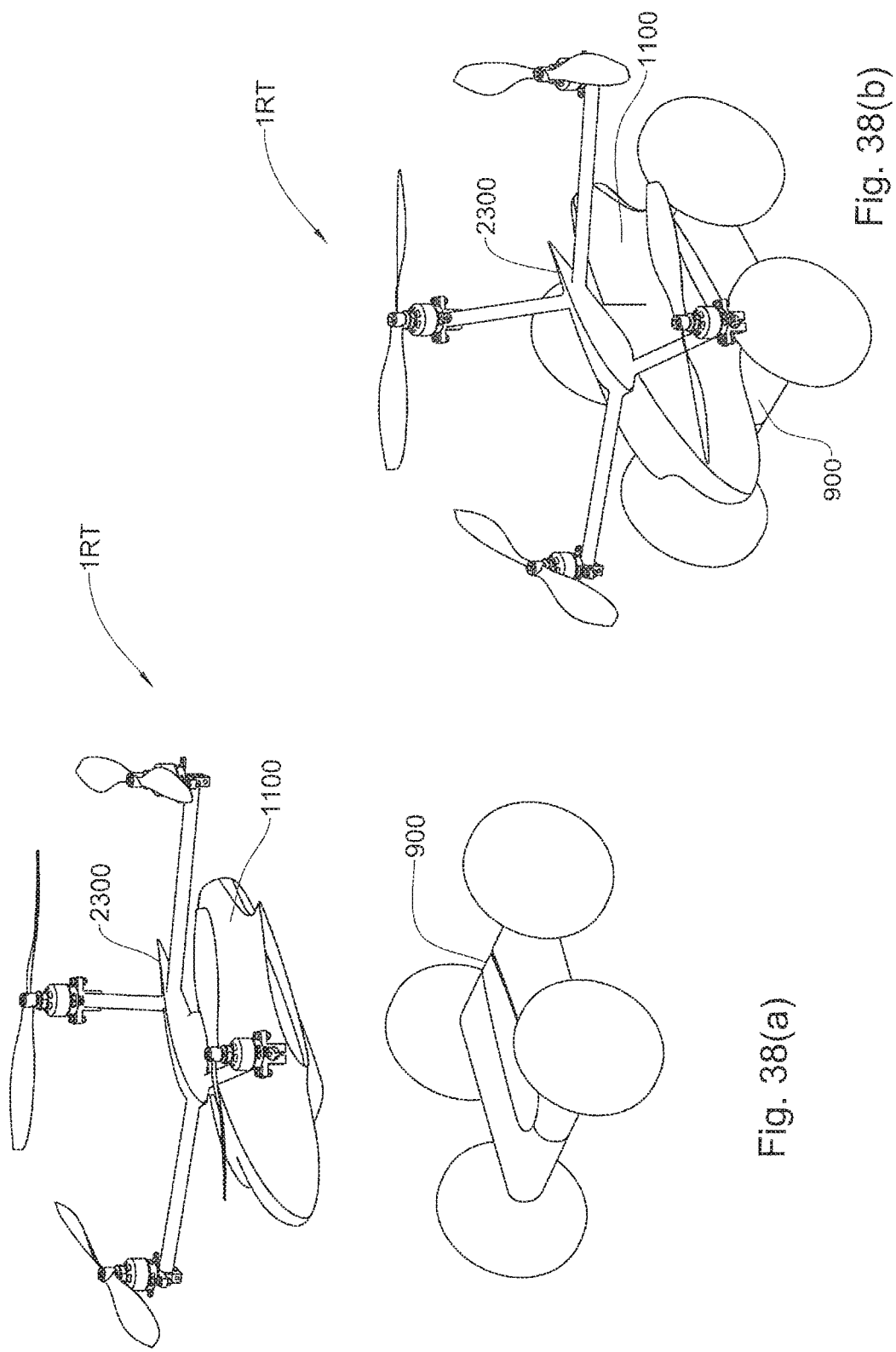

MODULAR VEHICLE SYSTEM

TECHNOLOGICAL FIELD

The presently disclosed subject matter relates to vehicles, in particular to modular vehicles and also to powered vehicles.

BACKGROUND ART

References considered to be relevant as background to the presently disclosed subject matter are listed below:
US 2015/0266576
U.S. Pat. No. 8,070,090
WO 2010/137016
http://www.gizmag.com/flying-wing-vtol-uav/13962/
http://www.wingcopter.com/-
http://www.tested.com/tech/robots/456672-wingcopter-drone-suitable-beer-delivery/
http://www.regroups.com/forums/showthread.php?t=1816216
http://www.regroups.com/forums/showthread.php?t=2083331&page=4
http://diydrones.com/profiles/blogs/arduvtol-wingcopter-flight-report-nr-1
http://diydrones.com/forum/topics/wingcopter-fixed-wing-airplane-quadcopter-fusionvtol-uav
http://diydrones.com/forum/topics/wingcopter-fixed-wing-airipane-quadcopter-fusionvtol-uav
http://diydrones.com/profiles/blogs/a-newbies-guide-to-uavs
http://aviationweek.com/blog/how-make-fixed-wing-uav-fly-vertically
http://ieeexplore.ieee.org/xpl/login.jsp?reload=true&tp=&arnumber=6187313&url=http%3A%2Fieeexplore.ieee.org%2fxpls%2Fabs_all.jsp%3Farnumber%3D6187313
http://www.regroups.com/forums/showthread.php?t=2056389
http://www.gizmag.com/vtol-kestrel-drone-rotary-fixed-wing/41244/?li_source=LI&li_medium=default-widget
http://www.sandia.gov/research/robotics/unique_mobility/volant.html
http://www.stoprotor.com.au/
http://www.gizmag.com/hybrid-rotorwing-stop-rotor/27092/
http://www.nrl.navy.mil/techtransfer/available-technologies/electronics/stop-rotor-rotary-wing-aircraft
http://www.nrl.navy.mil/techtransfer/sites/www.nrl.navy.mil.techtransfer/files/files/stoprotor.pdf
http://www.trentonsystems.com/blog/airborne-surveillance/stop-rotor-rotary-wing-aircraft-alter-uav-landscape/
http://www.gizmag.com/skytote-the-vtol-uav-that-transitions-into-horizontal-flight/5478/
http://www.krossblade.com/
http://www.engineering.com/PLMERP/ArticleID/10120/SkyProwler--VTOL-UAV-Transforms-to-Fat-Fixed-Wing-Cruiser.aspx
http://www.gizmag.com/go/1571/
http://www.newscientist.com/article/dn1859-disc-shaped-spyplane=-could-hunt-for-terrorists/
http://www.gizmag.com/skyprowler-fixed-wing-quadcopter/36154/?li_source=LI&li_medium=default-widget?li_source=LI&li_medium=default-widget Acknowledgement of the above references herein is not to be inferred as meaning that these are in any way relevant to the patentability of the presently disclosed subject matter.

BACKGROUND

Vehicles configured for a variety of different mission profiles are well known. For example, there are a variety of hybrid air vehicles that are configured for operating in aerodynamic lift operating mode from takeoff to landing for some missions, and for providing vectored thrust operating mode, at least for takeoff and/or for landing in other missions. Such vehicles can sometimes obviate the need for having different vehicles for different missions on the one hand, but on the other hand it is known that providing optimum performance for such a hybrid vehicle for each operating mode can prove challenging.

Also known are vehicles configured for operation in a variety of environments. For example a number of amphibious craft are known that could travel over a water surface as well as overland, using a different propulsion mode for each—a marine screw is used for water propulsion and wheels or tracks are for land propulsion. Subsequently hovercraft were developed providing similar utility but using the same propulsion system for both land and sea propulsion.

By way of non-limiting example, US 2015/266576 disclose a Multiple Environment Unmanned Vehicle (MEUV) that is able to navigate aerial, aquatic, and terrestrial environments through the use of different mission mobility attachments. The attachments allow the MEUV to be deployed from the air or through the water prior to any terrestrial navigation. The mobility attachments can be removed or detached by and from the vehicle during a mission.

Also by way of non-limiting example, U.S. Pat. No. 8,070,090 discloses systems and methods for transitioning an aircraft between helicopter and fixed wing flight modes. In one embodiment, an aircraft comprises a plurality of wings each having a spar and a flap; a flap actuator configured to move the flap with respect to the spar; and a center section rotatably coupled to each spar. The center section includes at least one spar actuator configured to rotate at least one of the wings about a rotational axis of the spar when the aircraft transitions between helicopter and fixed wing flight modes.

GENERAL DESCRIPTION

According to a first aspect of the presently disclosed subject matter there is provided a modular vehicle system comprising:
at least one body module comprising at least one body connection interface;
a kit comprising a plurality of utility modules including at least one first utility module and at least one second utility module,
each said first utility module being in the form of a fixed-wing utility module configured for selectively providing said at least one body module with fixed wing flight capability [herein also referred to as fixed wing flight transportation] when coupled thereto, each said first utility module comprising at least one utility module connection interface in the form of a first utility module connection interface for coupling with at least one said body connection interface to thereby enable coupling of the respective said first utility module to the said at least one body module;

each said second utility module being in the form of a rotor-wing utility module configured for selectively providing said at least one body module with rotor wing flight capability [herein also referred to as rotor wing flight transportation] when coupled thereto, each said second utility module comprising at least one said utility module connection interface in the form of a second utility module connection interface, distinct from said first utility module connection interface, for coupling with at least one said body connection interface to thereby enable coupling of the respective said second utility module to the said at least one body module;

wherein each said body connection interface is configured for selective reversible coupling at least with respect to any one of said utility module connection interfaces while concurrently excluding coupling of another said utility module connection interface thereto, to provide an air vehicle.

Each said body module comprises one body connection interface for alternately coupling said body module with said fixed-wing utility module or said rotor-wing utility module via the respective said first utility module connection interface or said second utility module connection interface. For example, said fixed-wing utility module comprises an integral wing comprising a port wing component connected to a starboard wing component, wherein said port wing component and said starboard wing component are configured for generating aerodynamic lift sufficient to thereby provide aerodynamic flight capability to said at least one body module when coupled thereto.

For example, said fixed-wing utility module comprises at least one wing mounted propulsion unit for providing propulsion to said fixed-wing utility module. For example, at least one said wing mounted propulsion unit is in fixed geometric relationship with said integral wing to provide a forward propulsion thereto, and/or at least one said wing mounted propulsion unit is pivotably mounted with respect to said integral wing to provide a vectored propulsion thereto.

Additionally or alternatively, for example, said at least one wing mounted propulsion unit is selectively operatively connected to the respective body module via a suitable propulsion system-body module coupling system. For example, the modular vehicle system includes at least one of the following:

wherein said at least one wing mounted propulsion unit comprises an integral electric motor system, and wherein said integral electric motor system is in electrical power communication with an electric power source accommodated in said at least one body module via said propulsion system-body module coupling system in the form of a power coupling system;

wherein said at least one wing mounted propulsion unit comprises an integral electric motor system, and wherein said integral electric motor system is in electrical power communication with an electric power source accommodated in said at least one body module via said propulsion system-body module coupling system in the form of a power coupling system, and wherein said power coupling system comprises a first power coupling component comprised in said utility module connection interface, and a second power coupling component comprised in said body connection interface;

wherein said at least one wing mounted propulsion unit comprises a fuel engine system, and wherein said fuel engine system is in fuel communication with a fuel source accommodated in said at least one body module via said propulsion system-body module coupling system in the form of a fuel coupling system;

wherein said at least one wing mounted propulsion unit is driven by an electric motor system via said propulsion system-body module coupling system in the form of a mechanical coupling system, and wherein said electric motor system is accommodated in said at least one body module;

wherein said at least one wing mounted propulsion unit is driven by an electric motor system via said propulsion system-body module coupling system in the form of a mechanical coupling system, and wherein said electric motor system is accommodated in said at least one body module, and wherein said mechanical coupling system comprises a first driveshaft coupling component comprised in said utility module connection interface, and a second driveshaft coupling component comprised in said body connection interface.

Alternatively, said fixed-wing utility module has an absence of propulsion unit. For example, said air vehicle comprising said body module coupled with said fixed-wing utility module is configured for operation as a glider.

For example, said rotor-wing utility module comprises a propulsion unit in the form of at least one primary rotor unit for generating rotor lift sufficient to thereby provide rotor flight capability to said at least one body module when coupled thereto. For example, wherein said rotor-wing utility module comprises one said primary rotor unit for generating rotor lift sufficient to thereby provide rotor flight capability to said at least one body module when coupled thereto. For example, said modular vehicle system includes at least one of the following:

wherein said primary rotor unit comprises at least one pair of counter-rotating coaxial rotors;

wherein said primary rotor unit comprises at least one main rotor, and said rotor-wing utility module further comprises an anti-torque tail rotor unit.

For example, the modular vehicle system includes at least one of the following:

wherein said rotor-wing utility module comprises a plurality of said primary rotor units for together generating rotor lift sufficient to thereby provide rotor flight capability to said at least one body module when coupled thereto;

wherein said rotor-wing utility module comprises two said primary rotor units in tandem rotor arrangement or in adjacent lateral spaced arrangement for together generating rotor lift sufficient to thereby provide rotor flight capability to said at least one body module when coupled thereto;

wherein said rotor-wing utility module comprises three said primary rotor units in triangular arrangement for together generating rotor lift sufficient to thereby provide rotor flight capability to said at least one body module when coupled thereto;

wherein said rotor-wing utility module comprises three said primary rotor units in triangular arrangement for together generating rotor lift sufficient to thereby provide rotor flight capability to said at least one body module when coupled thereto, one said rotor unit being aligned with a longitudinal axis of the said at least one body module, the other two said rotor units being spaced on opposite laterals sides of the longitudinal axis;

wherein said rotor-wing utility module comprises four said primary rotor units in quadcopter arrangement for together generating rotor lift sufficient to thereby provide rotor flight capability to said at least one body module when coupled thereto.

For example, said at least one primary rotor unit is selectively operatively connected to the respective body module via a suitable propulsion system-body module coupling system. For example, the modular vehicle system includes at least one of the following:

wherein said at least one said primary rotor unit comprises an integral electric motor system, and wherein said integral electric motor system is in electrical power communication with an electric power source accommodated in said at least one body module via said propulsion system-body module coupling system in the form of a power coupling system;

wherein said at least one said primary rotor unit comprises an integral electric motor system, and wherein said integral electric motor system is in electrical power communication with an electric power source accommodated in said at least one body module via said propulsion system-body module coupling system in the form of a power coupling system, and wherein said power coupling system comprises a first power coupling component comprised in said utility module connection interface, and a second power coupling component comprised in said body connection interface;

wherein said at least one primary rotor unit comprises a fuel engine system, and wherein said fuel engine system is in fuel communication with a fuel source accommodated in said at least one body module via said propulsion system-body module coupling system in the form of a fuel coupling system;

wherein said at least one primary rotor unit is driven by an integral electric motor system via said propulsion system-body module coupling system in the form of a mechanical coupling system, and wherein said integral electric motor system is accommodated in said at least one body module;

wherein said at least one primary rotor unit is driven by an integral electric motor system via said propulsion system-body module coupling system in the form of a mechanical coupling system, and wherein said integral electric motor system is accommodated in said at least one body module, and wherein said mechanical coupling system comprises a first driveshaft coupling component comprised in said utility module connection interface, and a second driveshaft coupling component comprised in said body connection interface.

Alternatively, said at least one primary rotor unit is unpowered. For example, 7, wherein said air vehicle comprising said body module coupled with said rotor-wing utility module is configured for operation as an autogyro.

In another example, the modular vehicle system is configured wherein:

said at least one body module comprises at least two said body connection interfaces, including a port said body connection interface and a starboard said body connection interface;

said fixed-wing utility module comprises at least one port fixed-wing utility module comprising one said first utility module connection interface for selective reversible coupling with said port body connection interface, and at least one starboard fixed-wing utility module comprising another said first utility module connection interface for selective reversible coupling with said starboard body connection interface; and said rotor-wing utility module comprises at least one port rotor-wing utility module comprising one said second utility module connection interface for selective reversible coupling with said port body connection interface, and at least one starboard rotor-wing utility module comprising another said second utility module connection interface for selective reversible coupling with said starboard body connection interface.

For example, said port fixed-wing utility module and said starboard fixed-wing port wing utility module are configured for generating aerodynamic lift sufficient to thereby provide aerodynamic flight capability to said at least one body module when said port fixed-wing utility module and said starboard fixed-wing port wing utility module are coupled thereto. For example, wherein each one of said port fixed-wing utility module and said starboard fixed-wing port wing utility module comprises at least one wing mounted propulsion unit for providing propulsion to the respective said port fixed-wing utility module and said starboard fixed-wing port wing utility module. For example, the modular vehicle system includes at least one of the following:

wherein at least one said wing mounted propulsion unit is in fixed geometric relationship with the respective said port fixed-wing utility module or said starboard fixed-wing port wing utility module to provide a forward propulsion thereto;

wherein at least one said wing mounted propulsion unit is pivotably mounted with respect to the respective said port fixed-wing utility module or said starboard fixed-wing port wing utility module to provide a vectored propulsion thereto.

For example, said at least one wing mounted propulsion unit is selectively operatively connected to the respective body module via a suitable propulsion system-body module coupling system. For example, the modular vehicle system includes at least one of the following:

wherein said at least one wing mounted propulsion unit comprises an integral electric motor system, and wherein said integral electric motor system is in electrical power communication with an electric power source accommodated in said at least one body module via said propulsion system-body module coupling system in the form of a power coupling system;

wherein said at least one wing mounted propulsion unit comprises an integral electric motor system, and wherein said integral electric motor system is in electrical power communication with an electric power source accommodated in said at least one body module via said propulsion system-body module coupling system in the form of a power coupling system, and wherein said power coupling system comprises a first power coupling component comprised in said utility module connection interface, and a second power coupling component comprised in said body connection interface.

wherein said at least one wing mounted propulsion unit comprises a fuel engine system, and wherein said fuel engine system is in fuel communication with a fuel source accommodated in said at least one body module via said propulsion system-body module coupling system in the form of a fuel coupling system;

wherein said at least one wing mounted propulsion unit is driven by an electric motor system via said propulsion system-body module coupling system in the form of a mechanical coupling system, and wherein said electric motor system is accommodated in said at least one body module;

wherein said at least one wing mounted propulsion unit is driven by an electric motor system via said propulsion system-body module coupling system in the form of a mechanical coupling system, and wherein said electric motor system is accommodated in said at least one body module, and wherein said mechanical coupling system comprises a first driveshaft coupling component comprised in said utility module connection interface, and a second driveshaft coupling component comprised in said body connection interface.

Alternatively, said fixed-wing utility module has an absence of propulsion unit. For example, said air vehicle comprising said body module coupled with said fixed-wing utility module is configured for operation as a glider.

For example, said port rotor-wing utility module comprises at least one primary rotor unit for generating rotor lift and said starboard rotor-wing utility module comprises at least one said primary rotor unit for generating rotor lift, wherein a collective said rotor lift is sufficient to thereby provide rotor flight capability to said at least one body module when said port rotor-wing utility module and said starboard rotor-wing utility module are coupled thereto. For example, each one of said port rotor-wing utility module and said starboard rotor-wing port wing utility module comprises one said primary rotor unit for generating said corresponding rotor lift. For example, each one of said port rotor-wing utility module and said starboard rotor-wing port wing utility module comprises at least one pair of counter-rotating coaxial rotors, or, each one of said port rotor-wing utility module and said starboard rotor-wing port wing utility module comprises at least one said primary rotor. For example, each one of said port rotor-wing utility module and said starboard rotor-wing port wing utility module comprises a plurality of said primary rotor units for together generating rotor lift sufficient to thereby provide rotor flight capability to said at least one body module when coupled thereto.

For example, each one of said port rotor-wing utility module and said starboard rotor-wing port wing utility module comprises two said primary rotor units to provide a quadcopter arrangement for said at least one body module when coupled thereto, said rotor units together generating rotor lift sufficient to thereby provide aerodynamic flight capability to said at least one body module when coupled thereto.

For example, said at least one wing mounted propulsion unit is selectively operatively connected to the respective body module via a suitable propulsion system-body module coupling system. For example, the modular vehicle system includes at least one of the following:

wherein said at least one said primary rotor unit comprises an integral electric motor system, and wherein said integral electric motor system is in electrical power communication with an electric power source accommodated in said at least one body module via said propulsion system-body module coupling system in the form of a power coupling system;

wherein said at least one said primary rotor unit comprises an integral electric motor system, and wherein said integral electric motor system is in electrical power communication with an electric power source accommodated in said at least one body module via said propulsion system-body module coupling system in the form of a power coupling system, and wherein said power coupling system comprises a first power coupling component comprised in said utility module connection interface, and a second power coupling component comprised in said body connection interface;

wherein said at least one said primary rotor unit comprises a fuel engine system, and wherein said fuel engine system is in fuel communication with a fuel source accommodated in said at least one body module via said propulsion system-body module coupling system in the form of a fuel coupling system;

wherein said at least one primary rotor unit is driven by an electric motor system via said propulsion system-body module coupling system in the form of a mechanical coupling system, and wherein said electric motor system is accommodated in said at least one body module;

wherein said at least one primary rotor unit is driven by an electric motor system via said propulsion system-body module coupling system in the form of a mechanical coupling system, and wherein said electric motor system is accommodated in said at least one body module, and wherein said mechanical coupling system comprises a first driveshaft coupling component comprised in said utility module connection interface, and a second driveshaft coupling component comprised in said body connection interface.

Alternatively, said at least one primary rotor unit is unpowered. For example, said air vehicle comprising said body module coupled with said rotor-wing utility module is configured for operation as an autogyro.

Additionally or alternatively, for example, said body module comprises a least one body mounted propulsion unit for providing propulsion to said body module.

Additionally or alternatively, for example, at least one said body module comprises operative components including a power supply and at least one of: navigation module, control computer, sensors, communication system. For example, at least one of said operative components is in modular form, and said body module is configured for enabling replacement of said modular operative components.

Additionally or alternatively, for example, at least one of said body module, fixed-wing utility module, and rotor-wing utility module comprises an undercarriage.

Additionally or alternatively, for example, at least one said body module comprises a payload bay.

Additionally or alternatively, for example, the modular vehicle system comprises at least two body modules, each said body module having at least one body-to-body connection interface configured for coupling to another said body-to-body connection interface to thereby enable one said body module to be coupled to another said body module.

Additionally or alternatively, for example, at least one said body module comprises a terrain locomotion system for enabling the body to travel over terrain. For example, said terrain locomotion system comprises any one of wheels, caterpillar tracks, skis. For example, said terrain locomotion system comprises a drive unit coupled to said wheels or caterpillar tracks.

Additionally or alternatively, for example, at least one said body module comprises a water locomotion system for enabling the body to travel over water. For example, said water locomotion system comprises any one of hydrofoils, floats, hull. Additionally or alternatively, for example, said water locomotion system comprises a drive unit coupled to any one of: water screw, water paddle, air propeller, ducted fan.

According to a second aspect of the presently disclosed subject matter there is provided a method for operating a modular vehicle system, comprising:
  providing at least one said modular vehicle system as defined herein according to the first aspect of the presently disclosed subject matter;
  coupling one of said fixed-wing utility module or said rotor-wing utility module to said body module to provide said air vehicle;
  operating said air vehicle.

For example, the method further comprises:
  uncoupling said one of said fixed-wing utility module or said rotor-wing utility module from said body module;
  coupling the other one of said fixed-wing utility module or said rotor-wing utility module to said body module to provide said air vehicle.

According to a third aspect of the presently disclosed subject matter there is provided a modular vehicle comprising at least one body module and at least one first utility module or at least one second utility module coupled to the at least one body module, wherein said at least one body module, said at least one first utility module, and said at least one second utility module are provided by the modular vehicle as defined herein according to the first aspect of the presently disclosed subject matter. For example, the modular vehicle is configured as a UAV.

According to the above aspects or to other aspects of the presently disclosed subject matter there is provided a modular vehicle system that includes at least one body module having at least one body connection interface, and a kit. The kit includes a plurality of utility modules including at least one first utility module (in the form of a fixed-wing utility module) and at least one second utility module (in the form of a rotor-wing utility module). Each first utility module includes at least one utility module connection interface in the form of a first utility module connection interface for coupling with the body connection interface. Each second utility module includes at least one utility module connection interface in the form of a second utility module connection interface, distinct from the first utility module connection interface, for coupling with the body connection interface. Each body connection interface is configured for selective reversible coupling at least with respect to any one of the utility module connection interfaces while concurrently excluding coupling of another utility module connection interface thereto, to provide an air vehicle.

A feature of at least one example of the presently disclosed subject matter is that the modular vehicle system provides a very flexible system for providing many different air vehicle configurations based on only a small number of different vehicle components.

A feature of at least one example of the presently disclosed subject matter is that the modular vehicle system enables each corresponding air vehicle to be configured, and in particular optimized, for a specific desired mission (for example VTOL mission as compared with a conventional aerodynamic flight mission), without the need to carry hardware or vehicle components that are not required for that specific mission but may be required in another mission.

A feature of at least one example of the presently disclosed subject matter is that the modular vehicle system enables a plurality of different air vehicles to be provided, each one optimized for one of a variety of different missions, while having substantially the same body module configuration, for example including the same core body operative components.

A feature of at least one example of the presently disclosed subject matter is that the modular vehicle system enables quick and easy replacements of vehicle components for a corresponding air vehicle, in case of malfunction or damage of a vehicle component.

A feature of at least one example of the presently disclosed subject matter is that the modular vehicle system comprises body operative components in modular form, which allow, for example, rapid changeover in a body module from a fuel system to an electrical system for powering the air vehicle propulsion units.

BRIEF DESCRIPTION OF THE DRAWINGS

In order to better understand the subject matter that is disclosed herein and to exemplify how it may be carried out in practice, embodiments will now be described, by way of non-limiting example only, with reference to the accompanying drawings, in which:

FIG. 23 illustrates, in front view, another example of a rotor wing air vehicle provided by the system of FIG. 1 using the body module of the example of FIG. 17 and including two primary rotor units in lateral spaced arrangement.

FIG. 24 illustrates, in side view, another example of a rotor wing air vehicle provided by the system of FIG. 1 using the body module of the example of FIG. 17 and including two primary rotor units in tandem spaced arrangement.

FIG. 27 illustrates, in front view, another example of a fixed wing air vehicle provided by the system of FIG. 1 using two body modules of the example of FIG. 17 mounted to one another.

FIG. 28 illustrates, in front view, another example of a fixed wing air vehicle provided by the system of FIG. 1 using three body modules of the example of FIG. 17 mounted to one another.

FIG. 29 illustrates, in front view, another example of a fixed wing air vehicle provided by the system of FIG. 1 using four body modules of the example of FIG. 17 mounted to one another.

FIGS. 36(*a*) to 36(*d*) illustrate, in top view, side view, front view and in front-top-side isometric view, respectively, another example of an air vehicle provided by the system of FIG. 1 using a body module of the example of FIG. 2 or of FIG. 17, and another example utility module of FIG. 1 in the form of a terrain locomotion unit.

FIG. 37 illustrates, in side view, a variation of the example of FIGS. 36(*a*) to 36(*d*).

FIGS. 38(*a*) and 38(*b*) illustrate, in front-top-side isometric view a hybrid rotary wing/terrain vehicle, in detached configuration and attached configuration, respectively, provided by the system of FIG. 1 using a body module of the example of FIG. 2 or of FIG. 17, and another example utility module of FIG. 1 in the form of a terrain locomotion unit.

DETAILED DESCRIPTION

Figure 1:
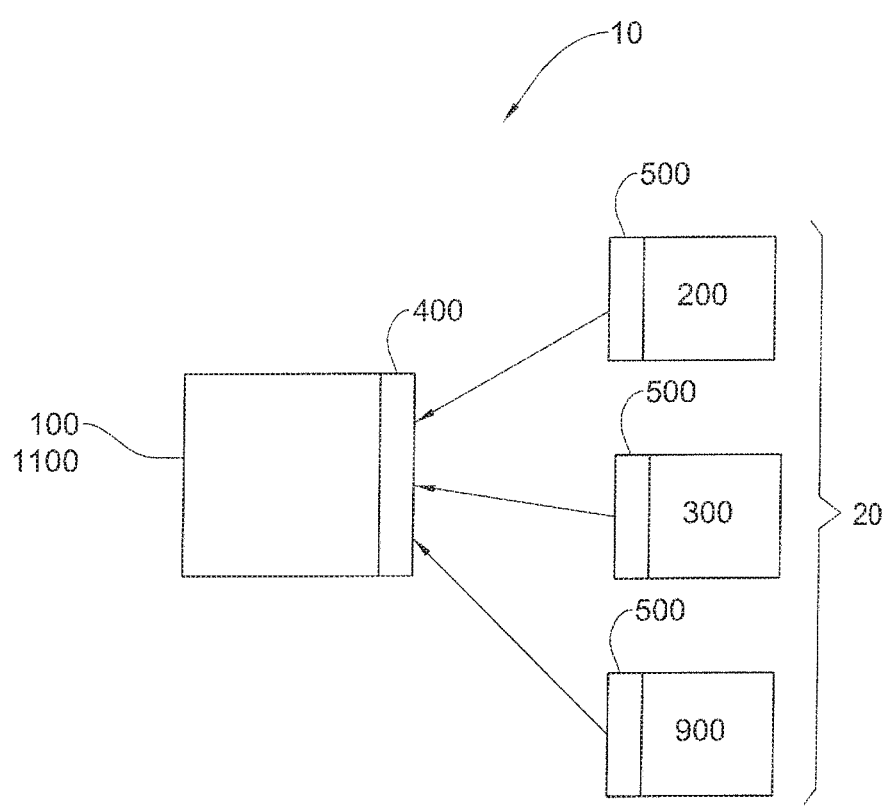
FIG. 1 schematically illustrates a modular vehicle system according to a first example of the presently disclosed subject matter.
Figure 2:
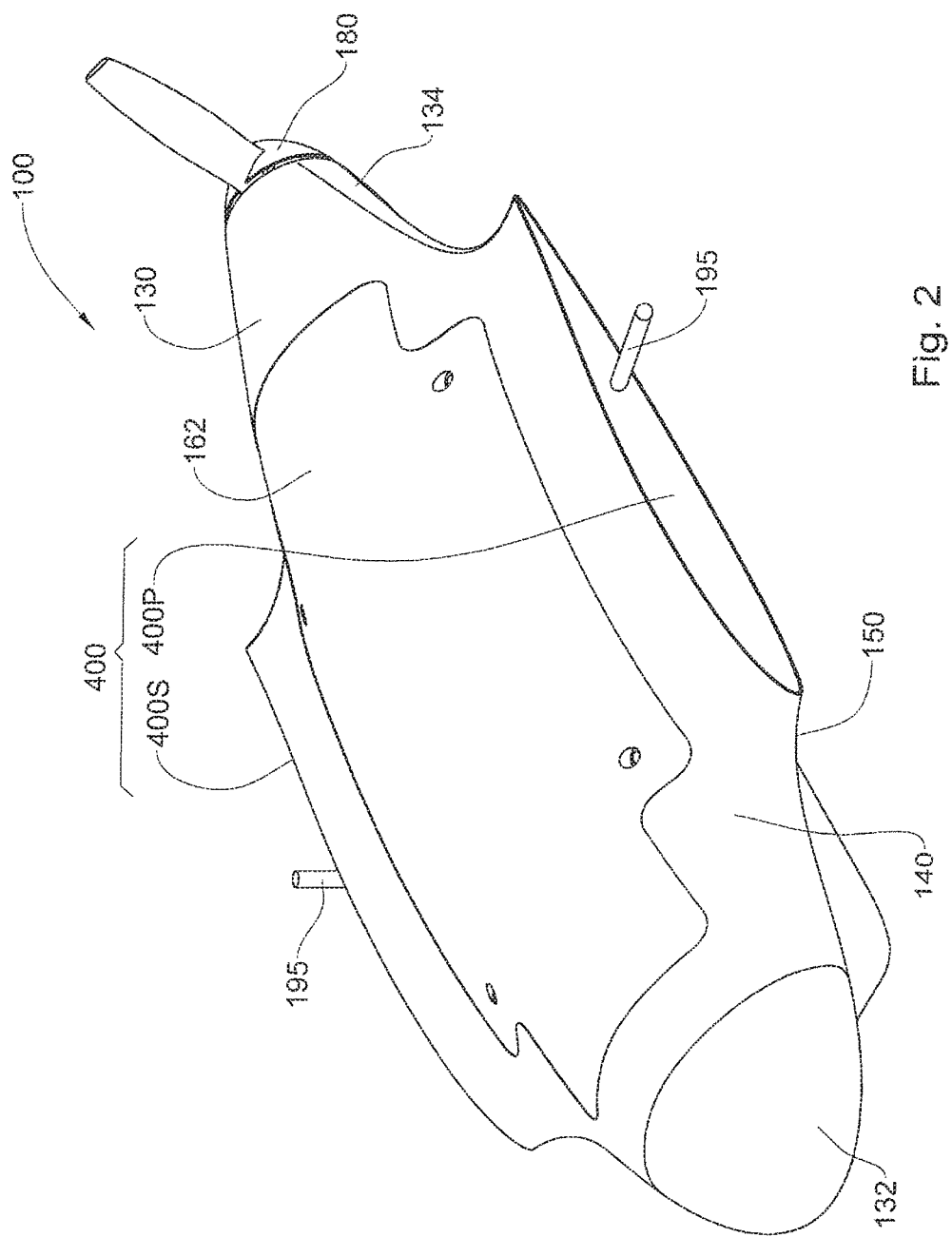
FIG. 2 illustrates, in front-top-side isometric view, an example of a body module of FIG. 1.
Figure 3:
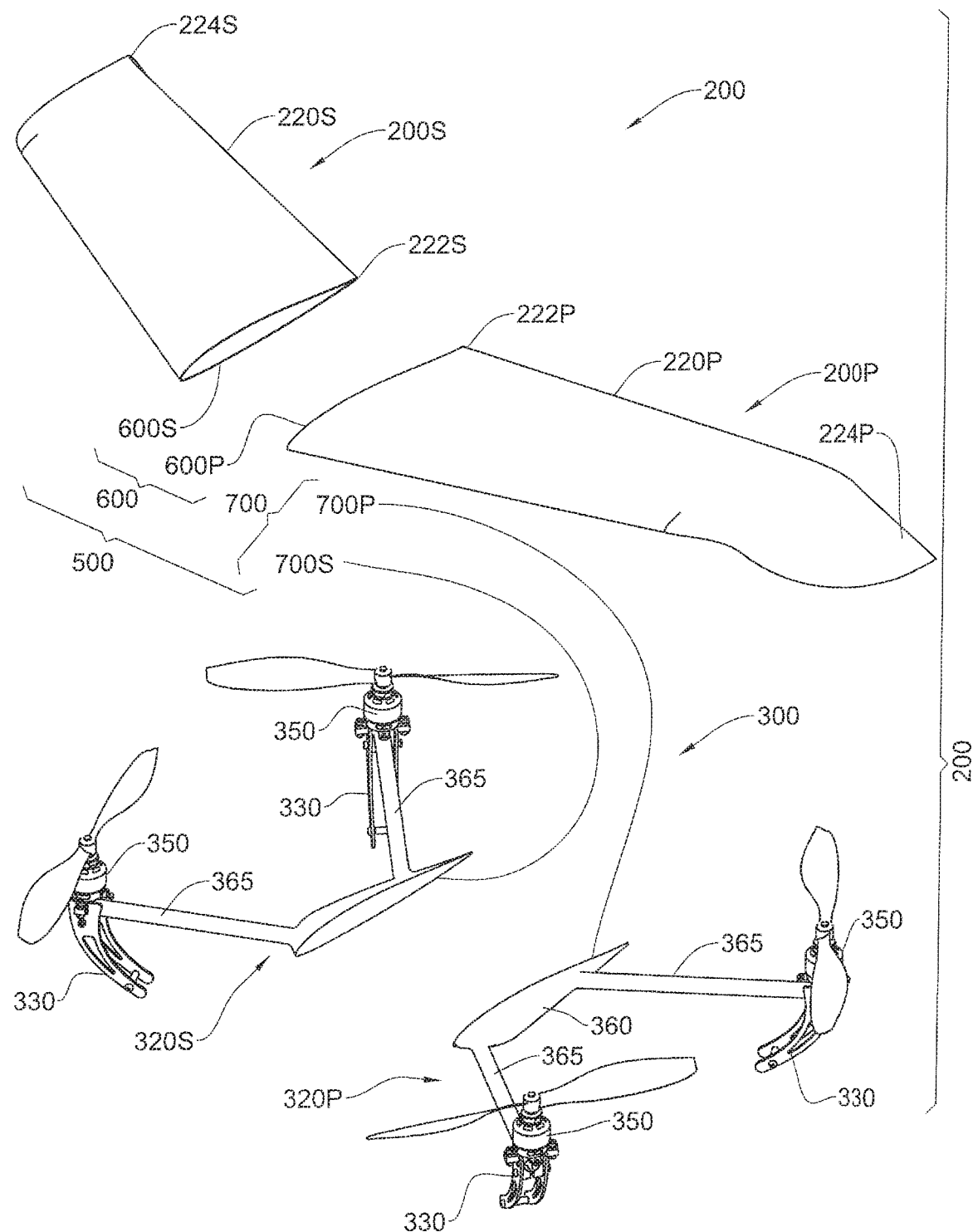
FIG. 3 illustrates, in front-top-side isometric view, an example of a kit of FIG. 1.

Referring to FIGS. 1, 2 and 3, a modular vehicle system according to a first example of the presently disclosed subject matter, and generally designated with the reference numeral 10, comprises a body module 100 (FIGS. 1 and 2) and a kit 20 (FIGS. 1 and 3) comprising a plurality of utility modules including at least one first utility module 200 and at least one second utility module 300.

In this example, the body module 100 comprises at least two body connection interfaces 400, which in this example comprises a port body connection interface 400P and a starboard body connection interface 400S, located on the port and starboard lateral sides, respectively, of the body module 100.

Each first utility module 200 is in the form of a fixed-wing utility module configured for selectively providing the body module 100 with fixed wing flight capability when coupled thereto, and each first utility module 200 comprises at least one utility module connection interface 500. The utility module connection interface 500 is in the form of a first utility module connection interface 600 configured for coupling with the body connection interface 400 to thereby enable coupling of the respective first utility module 200 to the body module 100.

In this example, the first utility module 200 comprises a port fixed-wing utility module 200P in the form of port wing 220P, and a starboard fixed-wing utility module 200S in the form of starboard wing 220S.

The port fixed-wing utility module 200P and the starboard fixed-wing port wing utility module 200P are together configured for generating aerodynamic lift sufficient to thereby provide aerodynamic flight capability to the body module 100 when the port fixed-wing utility module 200P and the starboard fixed-wing port wing utility module 200S are coupled to the body module 100.

The port wing 220P and the starboard wing 220S are discrete and different from one another, and in operation when coupled to the body module 100 are laterally separated from one another by the body module 100. The port wing 220P comprises a port wing root 222P and a port wing tip 224P, and is configured for being reversibly coupled to the port side of the body 100. The starboard wing 220S comprises a starboard wing root 222S and a starboard wing tip 224S and is configured for being reversibly coupled to the starboard side of the body 100.

In this example the first utility module connection interface 600 comprises a port first utility module connection interface 600P located at the port wing root 222P of port wing 220P, and a starboard first utility module connection interface 600S located at the starboard wing root 222S of starboard wing 220S.

Figure 4:
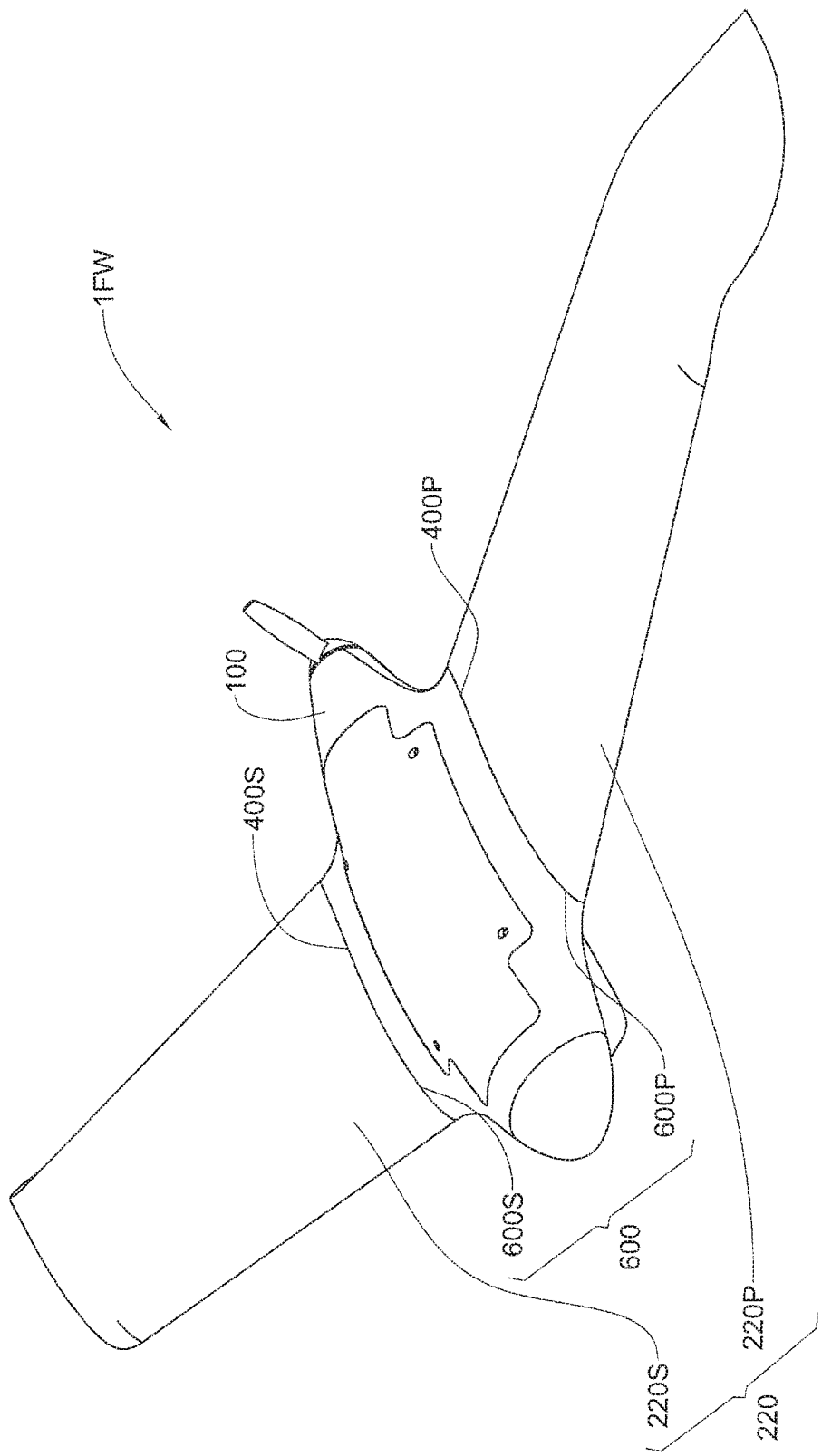
FIG. 4 illustrates, in front-top-side isometric view, an example of a fixed wing air vehicle provided by the system of FIG. 1.

The body connection interface 400 is configured for selective reversible coupling at least with first utility module connection interface 600, to thereby enable the first utility module 200 to be selectively reversibly coupled to the body module 100 to thereby provide a fixed wing air vehicle 1FW (see FIG. 4).

In particular, the port body connection interface 400P is configured for selective reversible coupling at least with the port first utility module connection interface 600P, to thereby enable the port wing 220P to be selectively reversibly coupled to the body module 100, and the starboard body connection interface 400S is configured for selective reversible coupling at least with the starboard first utility module connection interface 600S, to thereby enable the starboard wing 220S to be selectively reversibly coupled to the body module 100, to thereby provide fixed wing air vehicle 1FW (see FIG. 4).

In at least this example, the body connection interface 400 and the first utility module connection interface 600 comprise a suitable mechanical coupling arrangement that allows the body connection interface 400 to be selectively and reversibly coupled at least with respect to the first utility module connection interface 600. For example, the body connection interface 400 and the first utility module connection interface 600 each comprises a mechanical bracket, and the two brackets are in load-bearing abutment, and can be bolted or otherwise secured to one another, when the body connection interface 400 is coupled with the first utility module connection interface 600. Alternatively, the body connection interface 400 and the first utility module connection interface 600 each comprises a complementary part of a mechanical snap connector, and the two complementary parts are in load-bearing abutment and in snapped connection to one another, when the body connection interface 400 is coupled with the first utility module connection interface 600. Other types of mechanical coupling arrangements can of course be used.

Specifically, the port body connection interface 400P and the port first utility module connection interface 600P, comprise a suitable mechanical coupling arrangement that allows the respective port body connection interface 400P to be selectively and reversibly coupled at least with respect to the port first utility module connection interface 600P. Similarly, the starboard body connection interface 400S and the starboard first utility module connection interface 600S, comprise another suitable mechanical coupling arrangement that allows the respective starboard body connection interface 400S to be selectively and reversibly coupled at least with respect to the starboard first utility module connection interface 600S. For example, each such mechanical coupling arrangement can include a pair of mechanical brackets, in which one bracket is provided by the port body connection interface 400P (or the starboard body connection interface 400S) and the other bracket is provided by the port first utility module connection interface 600P (or the starboard first utility module connection interface 600S, respectively), and the two brackets are in load-bearing abutment, and can be bolted or otherwise secured to one another, when the port body connection interface 400P is coupled with the port first utility module connection interface 600P (or when the starboard body connection interface 400S is coupled with the starboard first utility module connection interface 600S, respectively). Alternatively, the port body connection interface 400P and the port first utility module connection interface 600P each comprises a complementary part of a mechanical snap connector, and the two complementary parts are in load-bearing abutment and in snapped connection to one another, when the port body connection interface 400P is coupled with the port first utility module connection interface 600P; and similarly the starboard body connection interface 400S and the starboard first utility module connection interface 600S each comprises a complementary part of another mechanical snap connector, and the two complementary parts are in load-bearing abutment and in snapped connection to one another, when the starboard body connection interface 400S is coupled with the starboard first utility module connection interface 600S.

In this example, the port wing 220P and starboard wing 220S further provide suitable aerodynamic control and stability to the body module 100 without the need for an empennage. For example, each of the port wing 220P and the starboard wing 220S has a tapered and swept back configuration including a winglet at the wing tip, configured for providing the aforesaid aerodynamic control and stability to the body module 100 without the need for an empennage.

Figure 7:
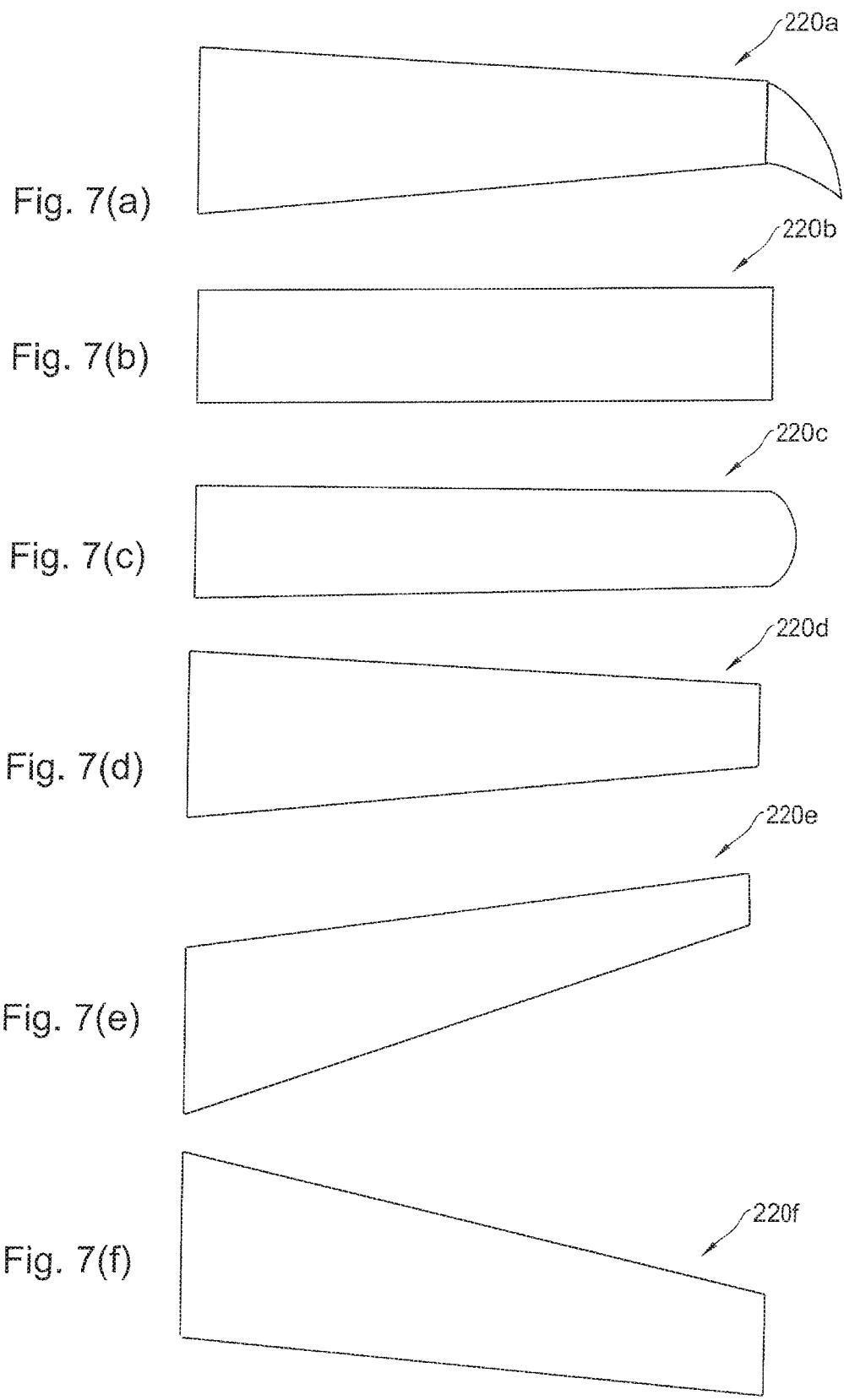
FIGS. 7(a) to 7(f) illustrate, in top view, various examples of fixed wing modules of the kit of FIG. 1.

However, in alternative variations of this example, and in other examples, each of the port wing 220P and the starboard wing 220S can have, for example, any one of:

- a tapered, zero swept configuration 220*a*, including a winglet at the wing tip (FIG. 7(*a*));
- a non-tapered, zero swept configuration 220*b*, including a straight wing tip (FIG. 7(*b*));
- a non-tapered, zero swept configuration 220*c*, including a rounded wing tip (FIG. 7(*c*));
- a tapered, zero swept configuration 220*d*, including a straight wing tip (FIG. 7(*d*));
- a tapered, forward swept configuration 220*e*, including a straight wing tip (FIG. 7(*e*));
- a tapered, aft swept configuration 220*f*, including a straight wing tip (FIG. 7(*f*))
- a variable geometry (swing wing) configuration (not shown).

In this example, the port wing 220P and starboard wing 220S are configured for subsonic flight and/or for transonic flight. In alternative variations of this example, and in other examples, the port wing 220P and starboard wing 220S can be configured for supersonic flight.

In this example, the port wing 220P and starboard wing 220S include movable control surfaces, such as one or more of ailerons, flaps, flaperons, and so on. These control surfaces can include suitable actuators accommodated in the respective wing and connected to a power source in the body module 100 via suitable power couplings, or can include self-contained power sources within the respective wing and controlled via wireless connection to a controller in the body module 100, for example. In alternative variations of this example, and in other examples, the port wing 220P and starboard wing 220S do not include movable control surfaces.

Figure 8:
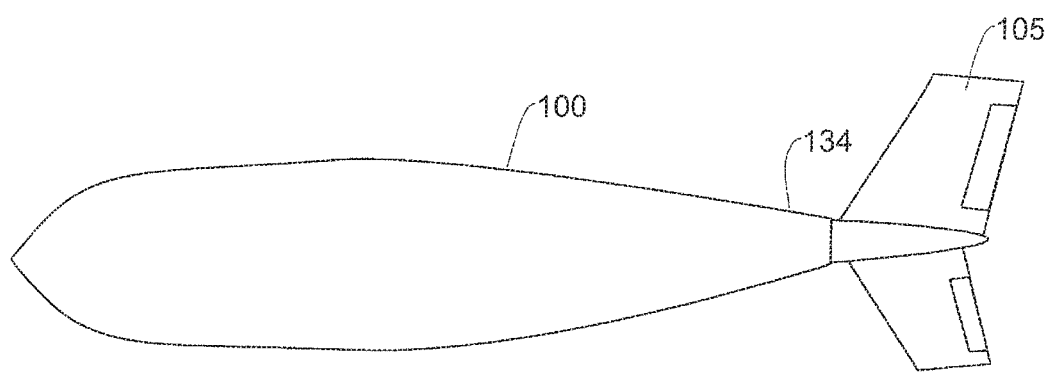
FIG. 8 illustrates, in side view, an example of a body module of FIG. 1 including an example of an empennage.

In alternative variations of this example, and in other examples, the body module 100 and/or the port wing 220P and the starboard wing 220S can be fitted with a suitable empennage. Such an empennage can include, for example a tail plane 105 attachable to an aft end of the body module 100 (see FIG. 8), or can be wing mounted, or can be in the form of a twin tail boom arrangement connected to the port wing 220P and the starboard wing 220S.

In this example the port wing 220P and starboard wing 220S do not include any, i.e., has an absence of, wing-mounted propulsion units. However, in alternative variations of this example, and in other examples, each one of the port fixed-wing utility module 200P and the starboard fixed-wing port wing utility module 200S comprises at least one wing mounted propulsion unit 290 for providing propulsion to the respective port fixed-wing utility module 200P and said starboard fixed-wing port wing utility module 200P.

Figure 9A:
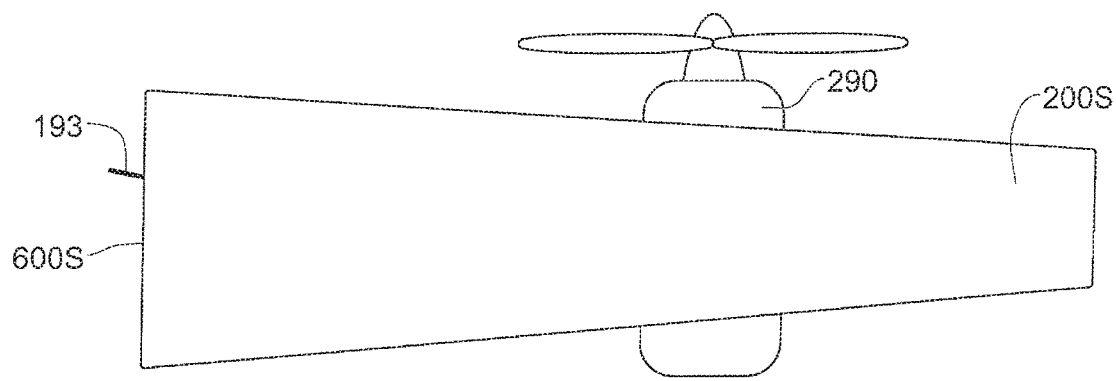
FIGS. 9(a) and 9(b) illustrate, in top view, examples of wing mounted propulsion units for the fixed wing modules of the kit of FIG. 1.
Figure 9B:
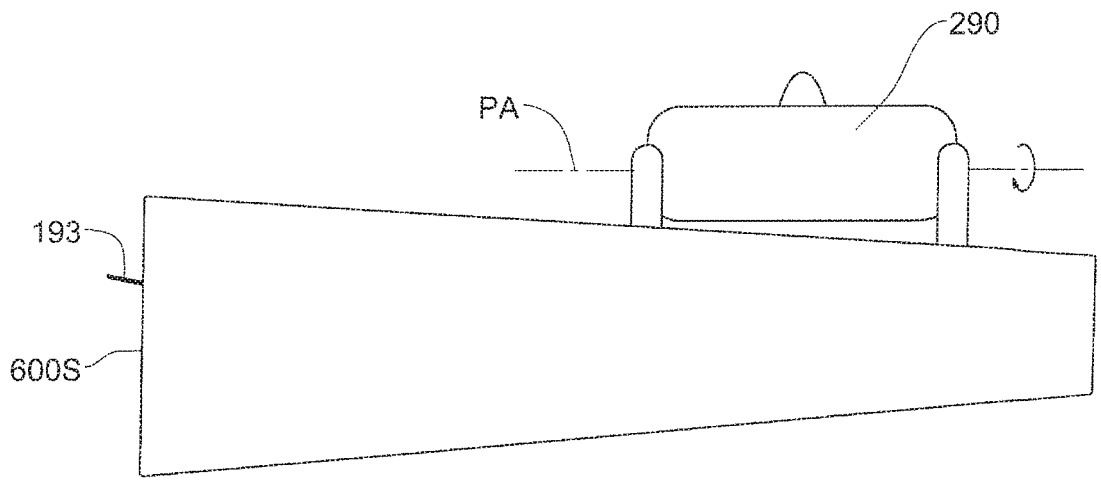

For example, referring to FIG. 9(*a*), the one or more wing mounted propulsion unit 290 is in fixed geometric relationship with the respective port fixed-wing utility module 200P or the starboard fixed-wing port wing utility module 200S to provide a forward propulsion thereto and thus to the air vehicle 1FW when the port fixed-wing utility module 200P and the starboard fixed-wing port wing utility module 200S are coupled to the body 100, for example.

Figure 14:
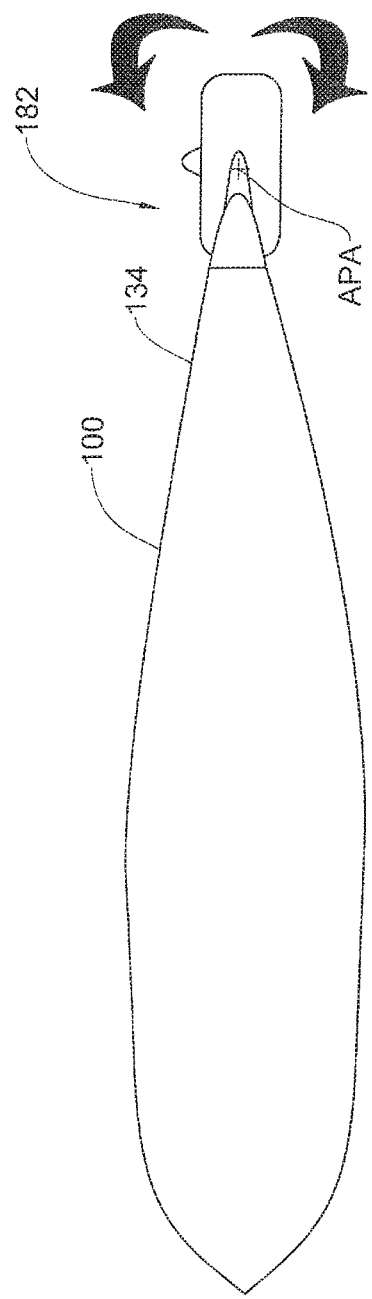
FIG. 14 illustrates, in side view, an example of a body module of FIG. 1 including an example of an aft body mounted pivotable propulsion unit.

Alternatively, for example, and referring to FIG. 9(*b*), the one or more wing mounted propulsion units 290 can each be pivotably mounted with respect to the respective port fixed-wing utility module 200P or the starboard fixed-wing port wing utility module 200S about a pivot axis PA to provide a vectored propulsion thereto and thus to the air vehicle 1FW when the port fixed-wing utility module 200P and the starboard fixed-wing port wing utility module 200S are coupled to the body 100, for example. Such pivoting allows the wing mounted propulsion units 290 and the thrust generated thereby to vector between vertical and horizontal directions. In such an example, and referring to FIG. 14, the body module 100 can include a pivotable propulsion unit 182, pivotable about pivot axis APA. This pivotable propulsion unit 182 can be aft mounted instead of the body mounted propulsion unit 180 of FIG. 2, or alternatively can be provided at the forward end of the body module 100. This pivoting about pivot axis APA also allows the pivotable propulsion unit 182, and the thrust generated thereby, to vector between vertical and horizontal directions. In at least some variations of this example the direction and extent of pivoting of each one of the wing mounted propulsion units 290 and the pivotable propulsion unit 182, can be independently controlled, one from the other to enable control moments to be generated in one or more of pitch, yaw and roll. Additionally or alternatively, the individual thrusts generated by each one of the wing mounted propulsion units 290 and the pivotable propulsion unit 182, can be independently controlled, one from the other to enable control moments to be generated in one or more of pitch, yaw and roll.

In any case, in examples wherein the port fixed-wing utility module 200P and/or the starboard fixed-wing port wing utility module 200S each comprises at least one wing mounted propulsion unit 290 this can be selectively operatively connected to the respective body module via a suitable propulsion system-body module coupling system.

For example, in examples wherein the port fixed-wing utility module 200P and/or the starboard fixed-wing port wing utility module 200S each comprises at least one wing mounted propulsion unit 290, in which the wing mounted propulsion unit 290 comprises an integral electric motor system, such an integral electric motor system being in electrical power communication with an electric power source 190 (FIG. 6) accommodated in the body module 100 via the respective propulsion system-body module coupling system in the form of a power coupling system. The electrical power source 190 includes batteries 192 and power module 194. The power coupling system comprises a first power coupling component 193 (FIGS. 9(*a*), 9(*b*)) comprised in each one of the starboard first utility module connection interface 600S and port first utility module connection interface 600P, and a second power coupling component 195 (FIG. 2) comprised in each one of the starboard body connection interface 400S and port body connection interface 400P. When the port fixed wing utility module 200P is coupled to the body module 100, the respective first power coupling component 193 is coupled with the respective second power coupling component 195 to provide power to the wing mounted propulsion unit 290 of the port fixed-wing utility module 200P. Similarly, when the starboard fixed-wing utility module 200S is coupled to the body module 100, the respective first power coupling component 193 is coupled with the respective second power coupling component 195 to provide power to the wing mounted propulsion unit 290 of the starboard fixed-wing utility module 200S.

In alternative variations of this example, and in other examples, each wing mounted propulsion unit 290 comprises a fuel engine system, including at least one fuel engine (for example an internal combustion engine) coupled to a rotor. The fuel engine system is in selective fuel communication with a fuel source (accommodated in the body module 100) via the respective propulsion system-body module coupling system in the form of a fuel coupling system. The fuel coupling system comprises a first fuel coupling component comprised in each one of the starboard first utility module connection interface 600S and port first utility module connection interface 600P, and a second fuel coupling component comprised in each one of the starboard body connection interface 400S and port body connection interface 400P. When the port fixed-wing utility module 200P is coupled to the body module 100, the respective first fuel coupling component is coupled with the respective second fuel coupling component to provide fuel to the wing mounted propulsion unit 290 of the port fixed-wing utility module 200P. Similarly, when the starboard fixed-wing utility module 200S is coupled to the body module 100, the respective first fuel coupling component is coupled with the respective second fuel coupling component to provide power to the wing mounted propulsion unit 290 of the starboard fixed-wing utility module 200S.

In alternative variations of this examples, and in other examples, the wing mounted propulsion unit 290 comprise suitable rotors driven by one or more electric motors and/or one or more fuel engines (for example internal combustion engines) accommodated in the body module 100, via the respective propulsion system-body module coupling system in the form of a suitable mechanical coupling system. For example, the mechanical coupling system can comprise a first driveshaft coupling component comprised in each one of first utility module connection interface 600S or port first utility module connection interface 600P, and a second driveshaft coupling component comprised in each one of the starboard body connection interface 400S and port body connection interface 400P. When the port fixed-wing utility module 200P is coupled to the body module 100, the respective first driveshaft coupling component is mechanically coupled with the respective second driveshaft coupling component to drive the wing mounted propulsion unit 290 of the port fixed-wing utility module 200P. Similarly, when the starboard fixed-wing utility module 200S is coupled to the body module 100, the respective first driveshaft coupling component is coupled with the respective second driveshaft coupling component to drive the wing mounted propulsion unit 290 of the starboard rotor-wing utility module 320S.

In alternative variations of this example, and in other examples, and referring to FIGS. 12(*a*) to 12(*d*), the port wing 220P and starboard wing 220S do not include any, i.e., has an absence of, wing-mounted propulsion units, and, additionally, the body module 100 also does not include any, i.e., has an absence of, body-mounted propulsion units. In such a case, the port fixed-wing utility module 200P and the starboard fixed-wing utility module 200S, in the form of the port wing 220P and starboard wing 220S respectively, are reversibly coupled to the body module 100 to thereby provide a fixed wing air vehicle 1FWG configured for operation as a glider.

In alternative variations of this example, and in other examples, the port fixed-wing utility module 200P and the starboard fixed-wing utility module 200S, each include an undercarriage.

Each second utility module 300 is in the form of a rotor-wing utility module configured for selectively providing the body module 100 with rotor wing flight capability when coupled thereto, and each second utility module 300 comprises at least one said utility module connection interface 500. The utility module connection interface 500 for the second utility module 300 is in the form of a second utility module connection interface 700 configured for coupling with the body connection interface 400 to thereby enable coupling of the respective second utility module 300 to the body module 100.

In this example, the second utility module 300 comprises a port rotor-wing utility module 320P, and a starboard rotor-wing utility module 320S. Also in this example, each one of the port rotor-wing utility module 320P and the starboard rotor-wing utility module 320S comprises a plurality of propulsion units in the form of two primary rotor units 350, each such rotor unit 350 being connected to a respective fairing 360 via respective struts 365.

It is to be noted that in at least this example the second utility module connection interface 700 is substantially identical with the first utility module connection interface 600, and furthermore the second utility module connection interface 700 selectively reversibly couples with the body connection interface 400 in a substantially identical manner as the first utility module connection interface 600 selectively reversibly couples with the body connection interface 400.

In this example the second utility module connection interface 700 comprises a port second utility module connection interface 700P located at the port fairing 360 of the port rotor-wing utility module 320P, and a starboard second utility module connection interface 700S located at the starboard fairing 360 of the starboard rotor-wing utility module 320S. Furthermore, the port second utility module connection interface 700P is substantially identical to the port first utility module connection interface 600P, mutatis mutandis, and the starboard second utility module connection interface 700S is substantially identical to the starboard first utility module connection interface 600S, mutatis mutandis.

In at least this example, the body connection interface 400 and the second utility module connection interface 700 thus comprise a suitable mechanical coupling arrangement similar to the mechanical coupling arrangement disclosed above regarding the body connection interface 400 and the first utility module connection interface 600, mutatis mutandis.

Specifically, the port body connection interface 400P and the port second utility module connection interface 700P, comprise a suitable mechanical coupling arrangement that allows the respective port body connection interface 400P to be selectively and reversibly coupled at least with respect to the port second utility module connection interface 700P, for example as disclosed herein regarding the port body connection interface 400P and the port first utility module connection interface 600P, mutatis mutandis.

Similarly, the starboard body connection interface 400S and the starboard second utility module connection interface 700S, comprise another suitable mechanical coupling arrangement that allows the respective starboard body connection interface 400S to be selectively and reversibly coupled at least with respect to the starboard second utility module connection interface 700S, for example as disclosed herein regarding the starboard body connection interface 400S and the starboard first utility module connection interface 600S, mutatis mutandis.

Figure 5:
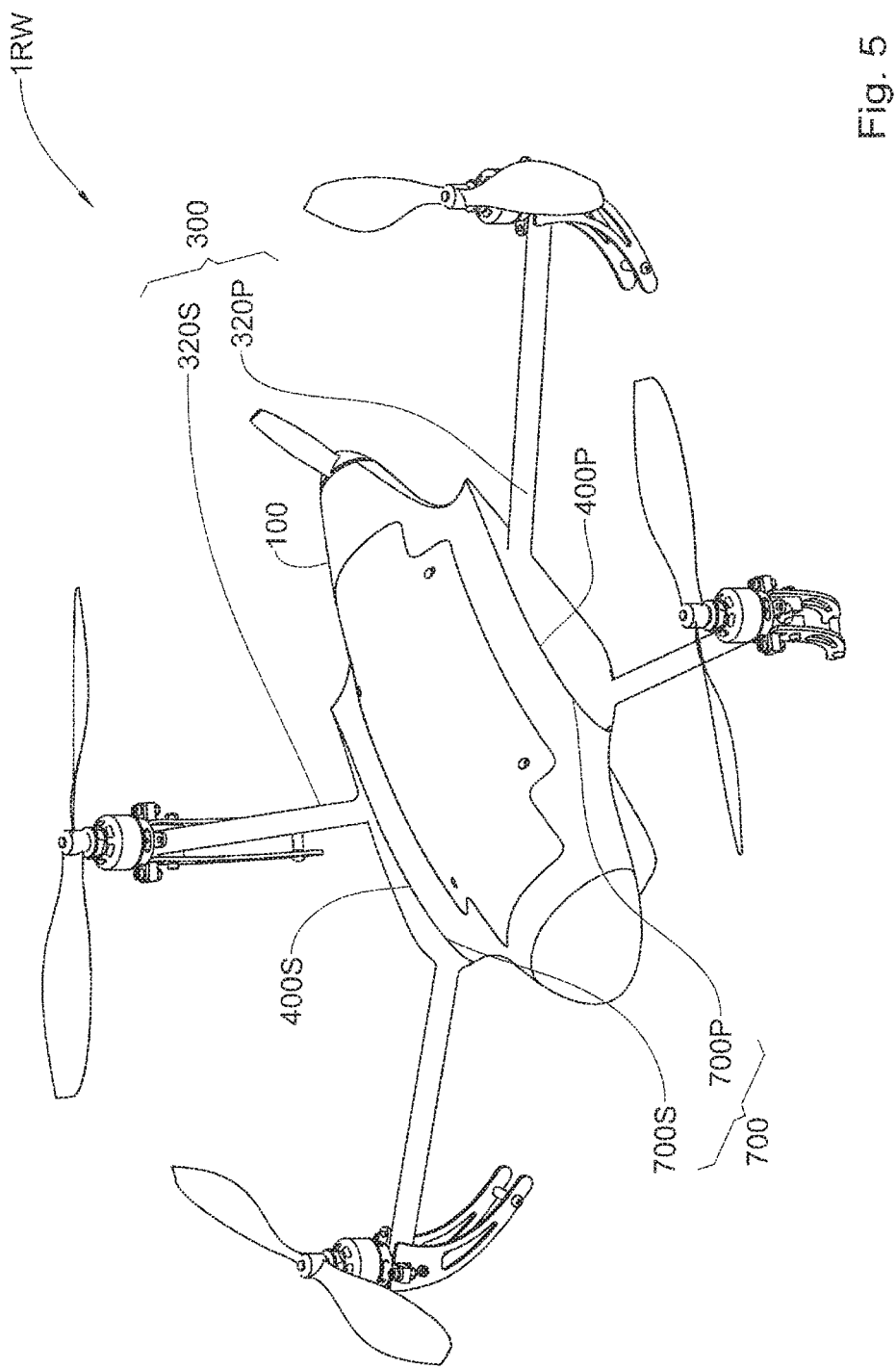
FIG. 5 illustrates, in front-top-side isometric view, an example of a rotor wing air vehicle provided by the system of FIG. 1.

The body connection interface 400 is configured for selective reversible coupling in turn at least with the second utility module connection interface 700, in a similar manner to the aforementioned selective reversible coupling with the first utility module connection interface 600, mutatis mutandis, to thereby enable the second utility module 300 to be selectively reversibly coupled to the body module 100 to thereby provide a rotor wing air vehicle 1RW (see FIG. 5).

In particular, the port body connection interface 400P is configured for selective reversible coupling at least with the port second utility module connection interface 700P, in a similar manner to the aforementioned coupling of the port body connection interface 400P with the port first utility module connection interface 600P, mutatis mutandis, to thereby enable the port rotor-wing utility module 320P to be selectively reversibly coupled to the body module 100, and the starboard body connection interface 400S is configured for selective reversible coupling at least with the starboard second utility module connection interface 700S, in a similar manner to the aforementioned coupling of the starboard body connection interface 400S with the starboard first utility module connection interface 600S, mutatis mutandis, to thereby enable the starboard rotor-wing utility module 320S to be selectively reversibly coupled to the body module 100, to thereby provide a fixed wing air vehicle 1RW.

Each primary rotor unit 350 is configured for generating rotor lift, and the collective rotor lift generated by all the primary rotor units 350 of the second utility module 300 is sufficient to thereby provide rotor flight capability to the body module 100 when the port rotor-wing utility module 320P and the starboard rotor-wing utility module 320S are coupled to the body module 100.

In this example, the port rotor-wing utility module 320P and the starboard rotor-wing utility module 320S are discrete and different from one another, and in operation when coupled to the body module 100 are laterally separated from one another by the body module 100. The port rotor-wing utility module 320P is configured for being reversibly coupled to the port side of the body 100, while the starboard rotor-wing utility module 320S is configured for being reversibly coupled to the starboard side of the body 100.

In this example, the four primary rotor units 350 provide a quadcopter arrangement for the body module 100 when coupled thereto, the four primary rotor units 350 together generating sufficient collective rotor lift to thereby provide rotor flight capability, as well as independent pitch, roll, yaw control, independent sideslip control, independent forward/ aft motion control, and independent hover control to the body module 100 when coupled thereto.

In any case, in examples wherein the port rotor-wing utility module 320P and/or the starboard rotor-wing port wing utility module 320S each comprises at least one powered propulsion unit, in the form of primary rotor units 350, the primary rotor units 350 can be selectively operatively connected to the respective body module via a suitable propulsion system-body module coupling system.

Figure 6:
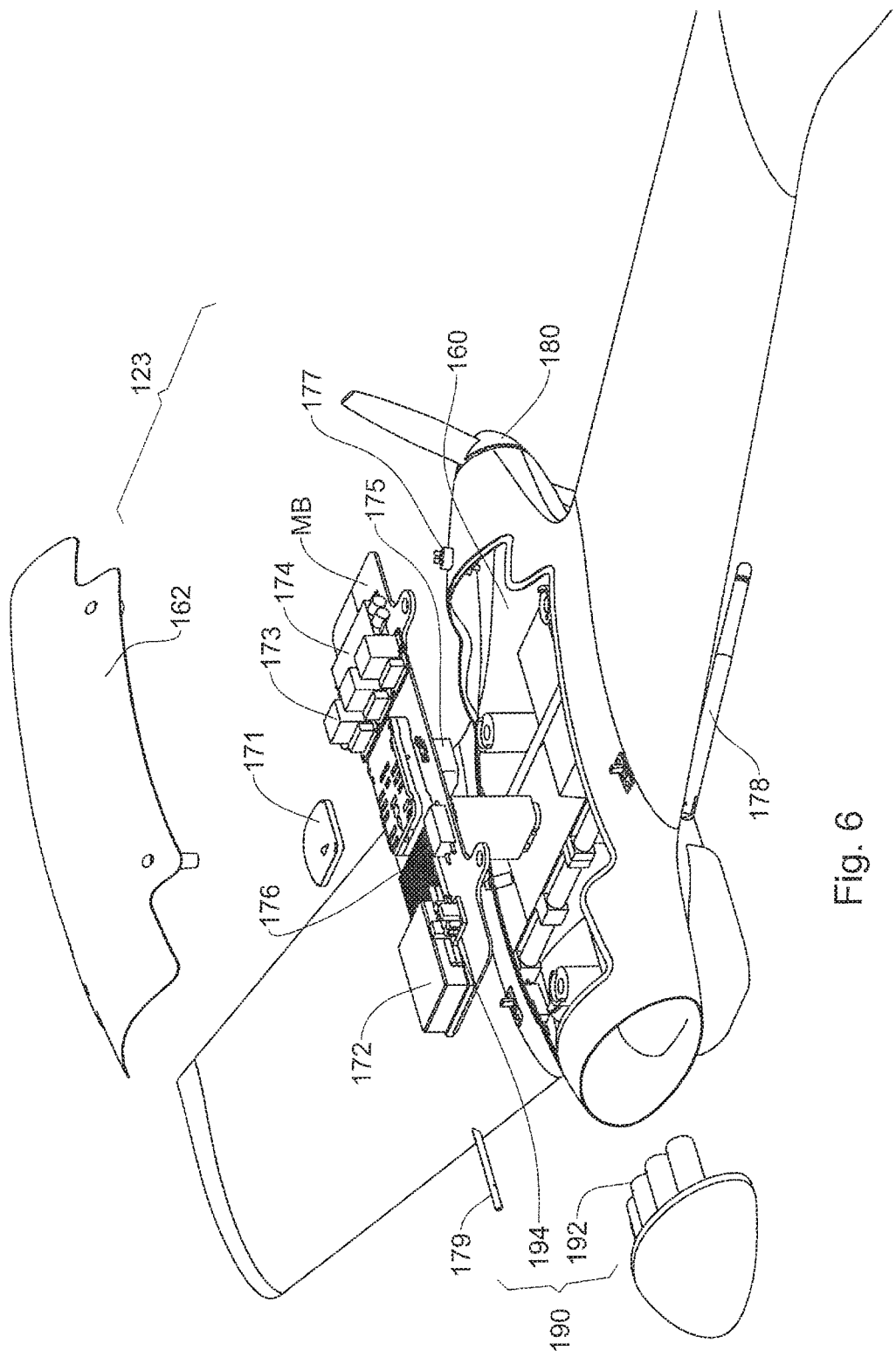
FIG. 6 illustrates, in front-top-side isometric exploded view, the example of FIG. 4.

In this example, and referring also to FIG. 6, each primary rotor unit 350 comprises an integral electrical motor system 351, including at least one electric motor 352 coupled to a rotor system 354. The electrical motor system 351 is in selective electrical power communication with electrical power source 190 via the respective propulsion system-body module coupling system in the form of a power coupling system. The electrical power source 190 includes batteries 192 and power module 194, and is accommodated in the body module 100. The power coupling system comprises a first power coupling component 193 (FIG. 3) comprised in each one of the starboard second utility module connection interface 700S and port second utility module connection interface 700P, and a second power coupling component 195 (FIG. 2) comprised in each one of the starboard body connection interface 400S and port body connection interface 400P. When the port rotor-wing utility module 320P is coupled to the body module 100, the respective first power coupling component 193 is coupled with the respective second power coupling component 195 to provide power to the primary rotor units 350 of the port rotor-wing utility module 320P. Similarly, when the starboard rotor-wing utility module 320S is coupled to the body module 100, the respective first power coupling component 193 is coupled with the respective second power coupling component 195 to provide power to the primary rotor units 350 of the starboard rotor-wing utility module 320S.

In alternative variations of this examples, and in other examples, each primary rotor unit 350 comprises a fuel engine system, including at least one fuel engine (for example an internal combustion engine) coupled to a rotor. The fuel engine system is in selective fuel communication with a fuel source (accommodated in the body module 100) via the respective propulsion system-body module coupling system in the form of a fuel coupling system. The fuel coupling system comprises a first fuel coupling component comprised in each one of the starboard second utility module connection interface 700S and port second utility module connection interface 700P, and a second fuel coupling component comprised in each one of the starboard body connection interface 400S and port body connection interface 400P. When the port rotor-wing utility module 320P is coupled to the body module 100, the respective first fuel coupling component is coupled with the respective second fuel coupling component to provide fuel to the primary rotor units 350 of the port rotor-wing utility module 320P. Similarly, when the starboard rotor-wing utility module 320S is coupled to the body module 100, the respective first fuel coupling component is coupled with the respective second fuel coupling component to provide power to the primary rotor units 350 of the starboard rotor-wing utility module 320S.

In alternative variations of this examples, and in other examples, the primary rotor units comprise suitable rotors driven by one or more electric motors and/or one or more fuel engines (for example internal combustion engines) accommodated in the body module 100, via the respective propulsion system-body module coupling system in the form of a suitable mechanical coupling system. For example, the mechanical coupling system can comprise a first driveshaft coupling component comprised in each one of second utility module connection interface 700S or port second utility module connection interface 700P, and a second driveshaft coupling component comprised in each one of the starboard body connection interface 400S and port body connection interface 400P. When the port rotor-wing utility module 320P is coupled to the body module 100, the respective first driveshaft coupling component is mechanically coupled with the respective second driveshaft coupling component to drive the primary rotor units 350 of the port rotor-wing utility module 320P. Similarly, when the starboard rotor-wing utility module 320S is coupled to the body module 100, the respective first driveshaft coupling component is coupled with the respective second driveshaft coupling component to drive the primary rotor units 350 of the starboard rotor-wing utility module 320S.

In at least this example, the respective rotor system 354 of each primary rotor unit 350 comprises a single rotor. However, in alternative variations of this examples, and in other examples, the respective rotor system 354 of each primary rotor unit 350 can instead comprise multiple rotors, for example two co-axial counter rotating rotors.

In at least this example, the rotor of the respective rotor system 354 of each primary rotor unit 350 is in the form of a propeller, having two propeller blades. However, in alternative variations of this examples, and in other examples, the respective rotor can comprise a propeller having more than two blades, or can instead comprise a ducted fan arrangement, for example.

In at least this example, the port rotor-wing utility module 320P and the starboard rotor-wing utility module 320S, each include an undercarriage, in the form of flexible struts 330 (FIG. 3) projecting in a downward direction from each of the primary rotor units 350.

In alternative variations of this example, and in other examples, and referring to FIGS. 13(*a*) to 13(*d*), each of the each primary rotor unit 350 is configured as an unpowered rotor unit, or is operated unpowered, and, additionally, the body module 100 also does not include any, i.e., has an absence of, body-mounted propulsion units. Alternatively, each of the each primary rotor unit 350 is configured as an unpowered rotor unit, or is operated unpowered, and, additionally, the body module 100 includes at least one body-mounted propulsion units. In either case, the port rotor-wing utility module 320P and the starboard rotor-wing utility module 320S, are reversibly coupled to the body module 100 to thereby provide a rotor wing air vehicle 1RWG configured for operation as an autogyro.

Figure 10:
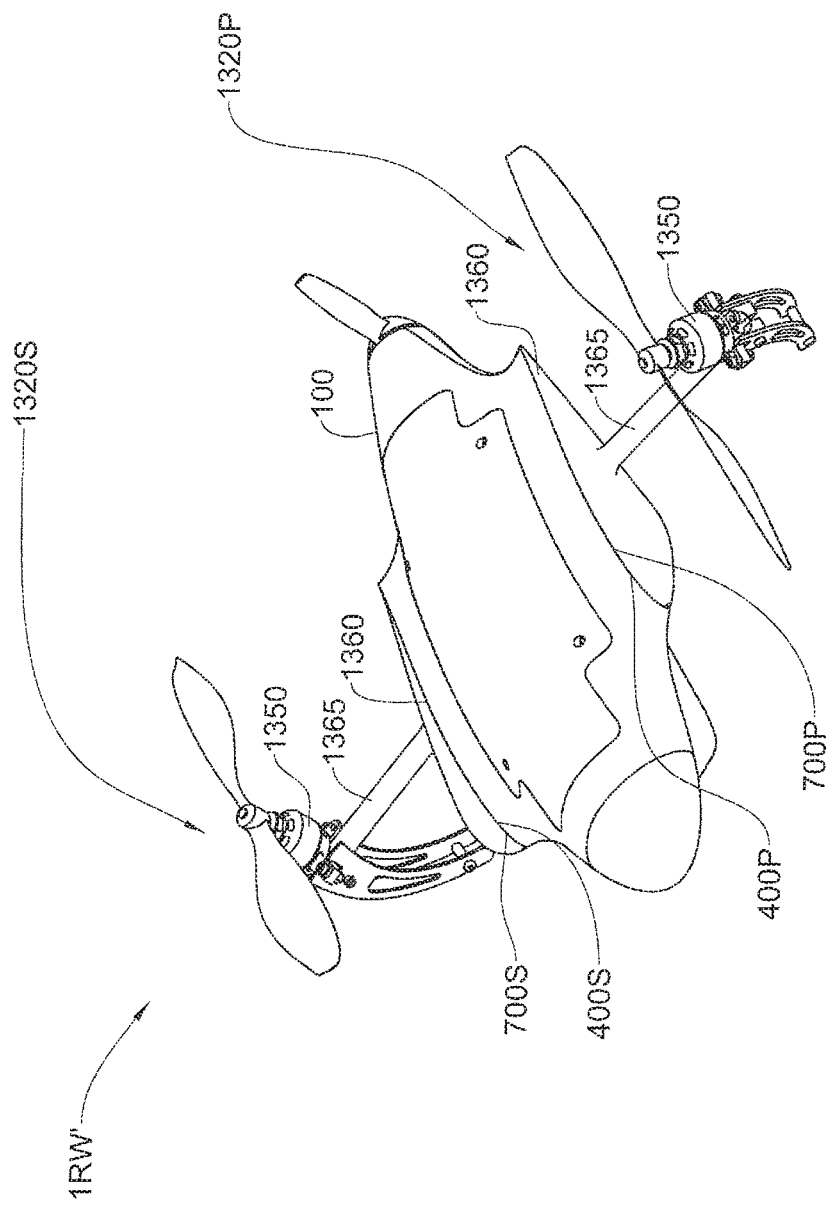
FIG. 10 illustrates, in front-top-side isometric view, another example of a rotor wing air vehicle provided by the system of FIG. 1.

Referring to FIG. 10, the kit 20 includes, additionally or alternatively, a rotor wing utility module 300 in the form of a port rotor-wing utility module 1320P, and a starboard rotor-wing utility module 1320S, which can be similar to the port rotor-wing utility module 320P and to the starboard rotor-wing utility module 320S, as disclosed herein, mutatis mutandis, with the following differences. In this example, each one of the port rotor-wing utility module 1320P and the starboard rotor-wing utility module 1320S comprises one primary rotor unit 1350, which can be similar to the aforementioned primary rotor unit 350 mutatis mutandis. Each primary rotor unit 1350 is connected to a respective fairing 1360 via respective struts 1365, similar to the aforementioned fairing 360 and struts 365, mutatis mutandis. The port fairing 1360 includes a port second utility module connection interface 700P which can be coupled to the port body connection interface 400P of the body module 100, while the starboard fairing includes a starboard second utility module connection interface 700S which can be coupled to the starboard body connection interface 400S of the body module 100, to provide a rotor wing air vehicle 1RW' having only two rotors. In at least this example, the center of gravity of the rotor wing air vehicle 1RW' is located between the two primary rotor unit 1350.

Figure 11:
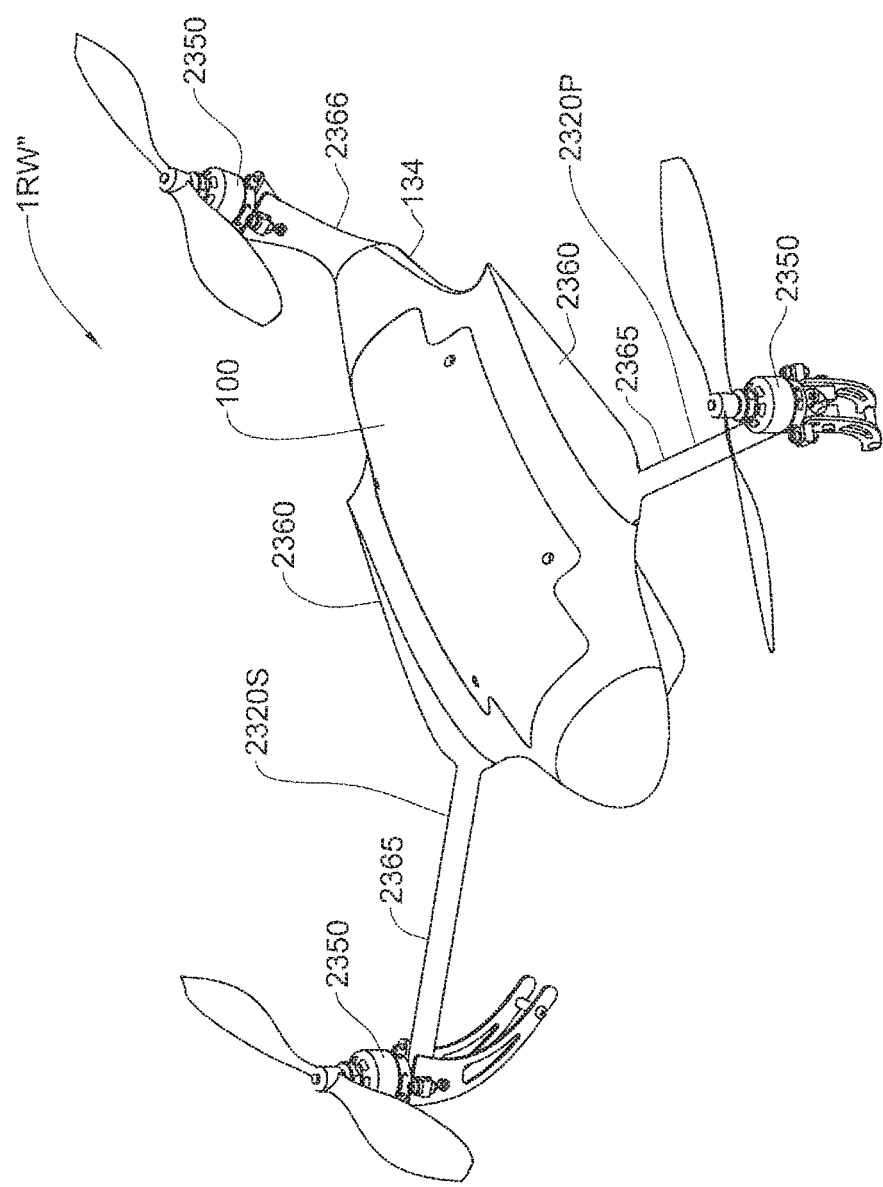
FIG. 11 illustrates, in front-top-side isometric view, another example of a rotor wing air vehicle provided by the system of FIG. 1.
Figure 12B:
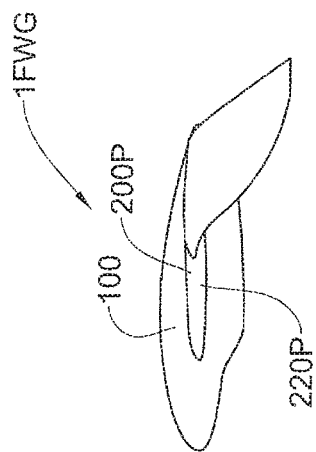
FIGS. 12(a) to 12(d) illustrate, in top view, side view, front view and in front-top-side isometric view, respectively, another example of a fixed wing air vehicle provided by the system of FIG. 1 and configured as a glider.
Figure 12D:
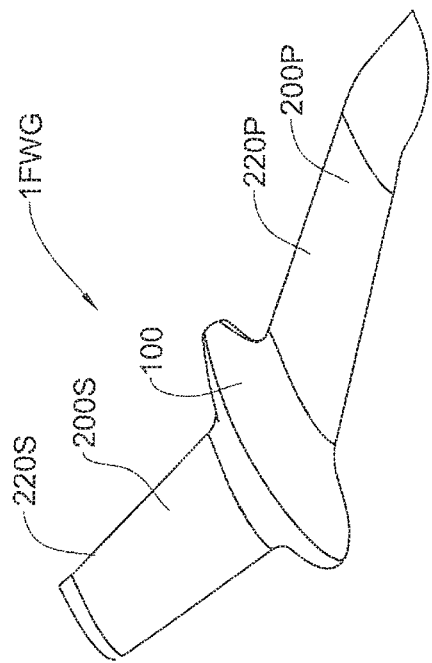
Figure 12A:
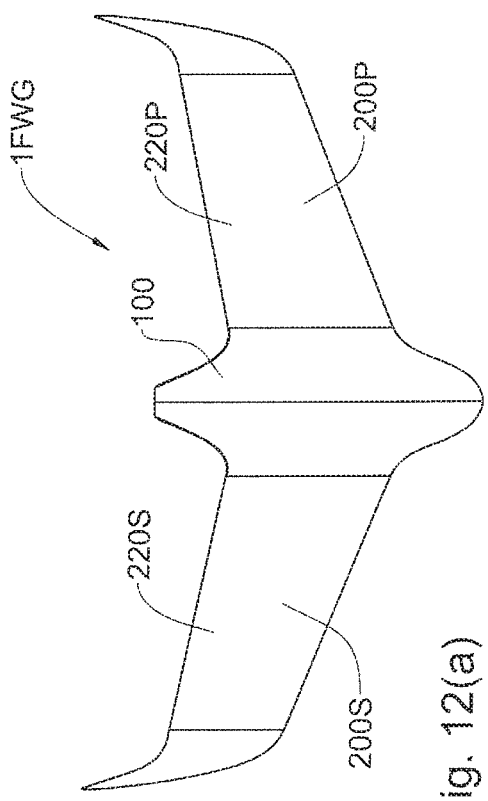
Figure 12C:
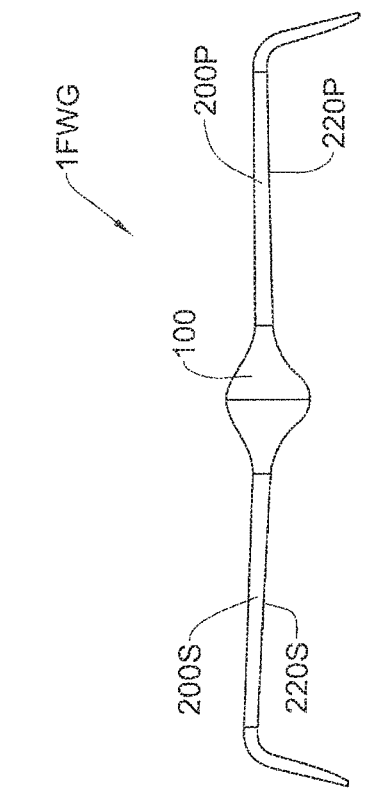
Figure 13A:
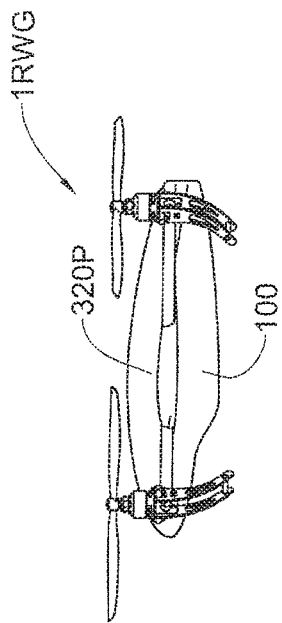
FIGS. 13(a) to 13(d) illustrate, in top view, side view, front view and in front-top-side isometric view, respectively, another example of a rotor wing air vehicle provided by the system of FIG. 1.
Figure 13B:
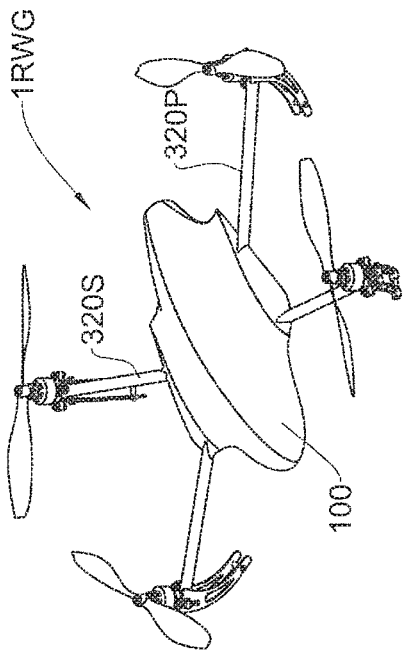
Figure 13C:
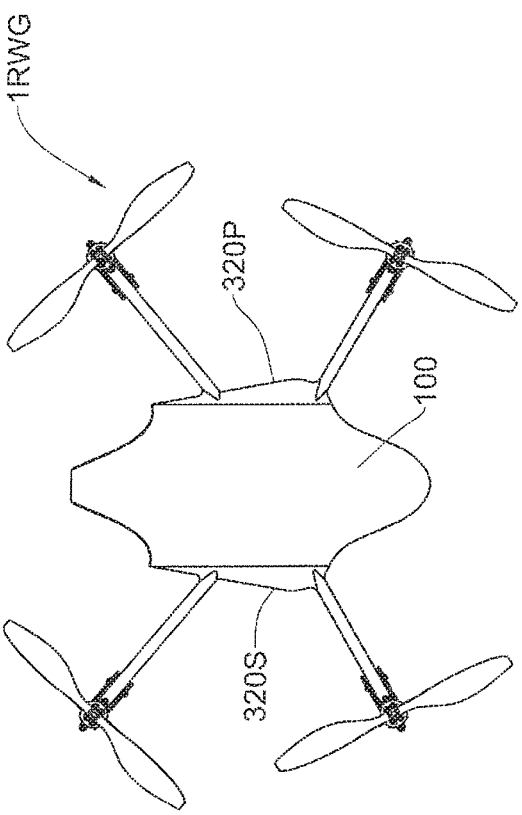
Figure 13D:
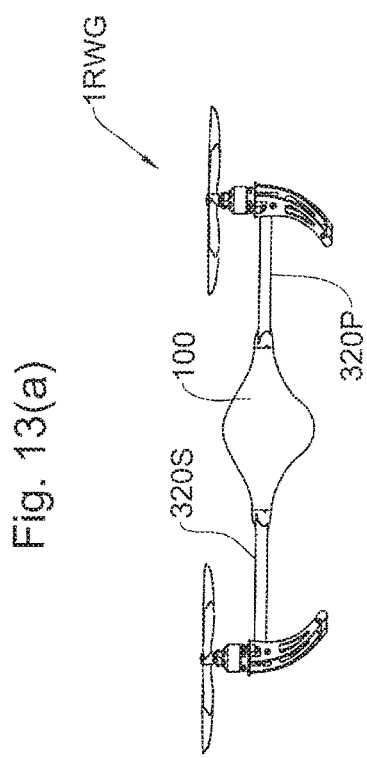

Referring to FIG. 11, the kit 20 includes, additionally or alternatively, a rotor wing utility module 300 in the form of a port rotor-wing utility module 2320P, and a starboard rotor-wing utility module 2320S, which can be similar to the port rotor-wing utility module 1320P and to the starboard rotor-wing utility module 1320S, as disclosed herein, mutatis mutandis, with the following differences. In this example, each one of the port rotor-wing utility module 2320P and the starboard rotor-wing utility module 2320S comprises one primary rotor unit 2350, which can be similar to the aforementioned primary rotor unit 1350 mutatis mutandis. Each primary rotor unit 2350 is connected to a respective fairing 2360 via respective struts 2365, similar to the aforementioned fairing 1360 and struts 1365, mutatis mutandis, but the primary rotor units 2350 can be located forward with respect to the fairings 2360, as compared with the example of FIG. 10. The port fairing 2360 includes a port second utility module connection interface 700P which can be coupled to the port body connection interface 400P of the body module 100, while the starboard fairing 2360 includes a starboard second utility module connection interface 700S which can be coupled to the starboard body connection interface 400S of the body module 100. Additionally, a third primary rotor unit 2350 is connected to the aft end 134 of the body module 100 via struts 2366, to provide a rotor wing air vehicle 1RW" having three rotors. In at least this example, the center of gravity of the rotor wing air vehicle 1RW" is located in plan view within a triangle formed by the three two primary rotor units 2350.

In at least some of the above examples, and referring in particular to FIGS. 2 and 6, the body module 100 comprises one body mounted propulsion unit 180 for providing propulsion to the body module 100, and thus for providing forward propulsion to:
  the air vehicle 1FW when the port fixed-wing utility module 200P and the starboard fixed-wing port wing utility module 200S are coupled to the body 100, for example; or to
  the air vehicle 1RW when the port rotor-wing utility module 320P and the starboard rotor-wing port wing utility module 320S are instead coupled to the body 100, for example.

In this example, the body mounted propulsion unit 180 is configured as an aft mounted pusher propeller propulsion unit, though in another alternative variations of this example, the propulsion unit 180 can configured as a forward mounted puller propeller propulsion unit, and/or the propeller can be replaced with a ducted fan or multiple coaxial propellers, for example.

The body module 100 comprises an aerodynamically contoured fuselage shell 130, having a detachable nose 132, an aft end 134, an upper side 140, a lower side 150. A payload bay 160 is provided in the body module 100, and access thereto is via body cover 162 provided in this example on upper side 140.

In at least this example, the body module 100 also comprises one or more body operative components 123 including one or more of a navigation module, a control computer, sensors, and communication system.

For example, the body module 100 also comprises the following body operative components 123:
  Micro Data Link System (MDLS) 172;
  Global Positioning System (GPS) unit 171 or other satellite based system for determining global coordinates of the body module 100 when fitted therewith;
  Battle switch Relay 173, to enable operation of the body module 100 to switch between manual control and autonomous or automatic control;
  Engine speed controller 174;
  Air vehicle remote control receiver 175, for receiving external radio signals for controlling the body module 100;
  Electrical power regulator 176;
  Engine switch 177, provided as a safety feature, such that so long as the engine switch is plugged in the propulsion units (for example the primary rotor units, or the wing mounted propulsion units, or the body mounted propulsion units) cannot be started; once the engine switch 177 is removed, it is then possible to start the propulsion units;
  Communications antenna 178, for receiving and/or transmitting radio signals.

Most of these operative components 123 can be accommodated within the payload bay 160.

In at least one example one or more of the above operative components is in modular form. In particular, one or more of the above modular operative components can be provided on a standardized modular board MB that can be easily mounted and replaced with respect to the payload bay 160. In this manner it is also possible to have a number of different modular boards MB, each having the respective hardware and/or software optimized for a type of mission—for example: manual operation; autonomous operation; automatic operation. In this manner, the desired modular board MB can also be fitted to the respective body 100 each time, according to the mission profile. The above operative components can also include, for example, a fuel system or an electrical power system for powering the propulsion units, and providing such operative components in modular form can for example provide rapid changeover in a body module from a fuel system to an electrical system for powering the air vehicle propulsion units.

One such sensor includes, for example, a pitot-static tube 179 mounted to one of the port fixed-wing utility module 200P or the starboard fixed-wing port wing utility module 200S to measure total pressure and static pressure during flight.

In alternative variations of this example, and in other examples, the body module 100 includes an undercarriage.

In this example the body module 100 is configured for remote operation (including manual (via radio control for example), autonomous or automatic control), i.e., for unmanned operation, such that the corresponding air vehicle provided by the modular vehicle system 10, by coupling the body module 100 to a fixed wing utility module 200 or to a rotor wing utility module 300, operates as a UAV.

In alternative variations of this example, and in other examples, the corresponding air vehicle provided by the modular vehicle system 10, by coupling the body module 100 to a fixed wing utility module 200 or to a rotor wing utility module 300, operates as a manned vehicle, and the respective body module is configured with a cockpit for accommodating at least one pilot.

As will become clearer herein, the modular vehicle system 10 include a first plurality of the same or different body modules, and/or the kit 20 can include a second plurality of the same or different fixed wing utility modules 200 and/or a third plurality of the same or different rotor wing utility modules 300.

It is thus readily apparent that each body module 100 is configured for coupling, via a specific body connection interface to only one utility module, for example to only one fixed wing utility module 200 or only one rotor wing utility module 300 chosen from the aforesaid second plurality of fixed wing utility modules 200 and/or third plurality of rotor wing utility modules 300.

In particular it is readily apparent that each body module 100 comprises at least one body connection interface for alternately coupling the body module 100 with the fixed-wing utility module 200 or with the rotor-wing utility module 300 via the respective first utility module connection interface 600 or via the respective second utility module connection interface 700.

It is also readily apparent that the body connection interface 400 is configured for selective reversible coupling at least with respect to any one of the respective utility module connection interfaces 500 while concurrently excluding coupling of another utility module connection interface 500 to the same body connection interface 400, to provide an air vehicle—a rotary wing air vehicle or a fixed wing air vehicle.

Figure 15:
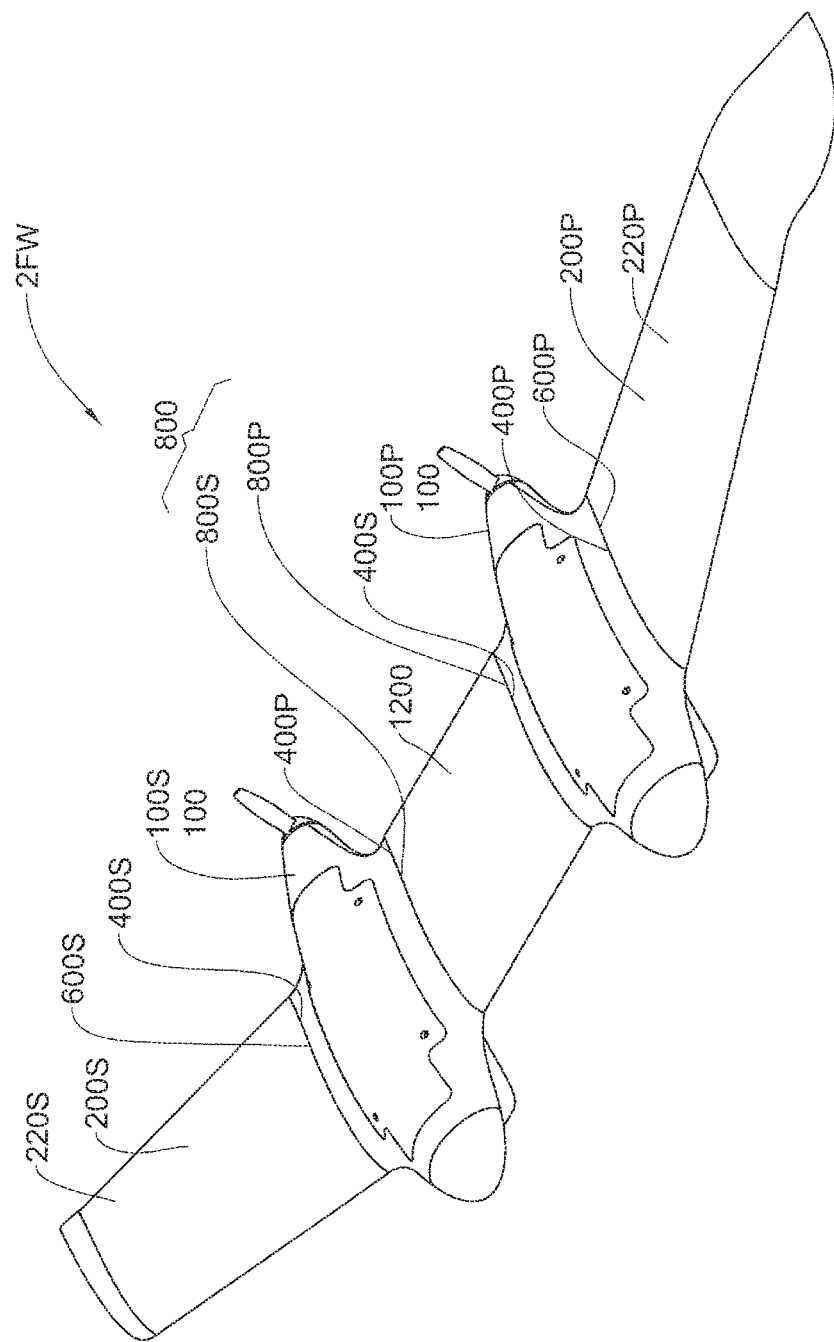
FIG. 15 illustrates, in front-top-side isometric view, another example of a fixed wing air vehicle provided by the system of FIG. 1 including an interconnector wing module.
Figure 16:
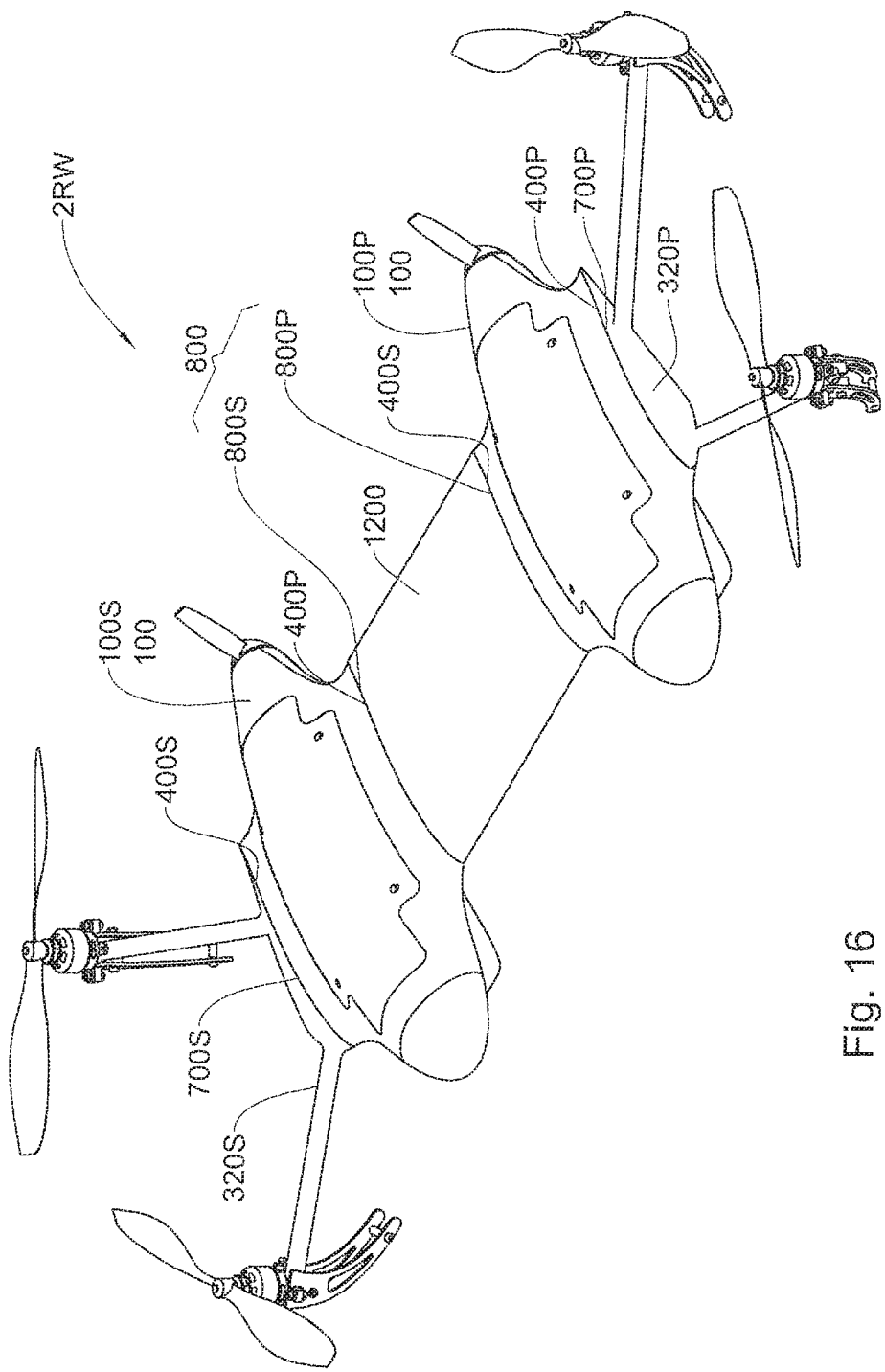
FIG. 16 illustrates, in front-top-side isometric view, another example of a rotor wing air vehicle provided by the system of FIG. 1 including an interconnector wing module.

Referring to FIGS. 15 and 16, the kit 20 further includes a fixed wing utility module 200 in the form of interconnector wing module 1200 configured at least for interconnecting two body modules 100. In this example the interconnector wing module 1200 has a rectangular plan form and a uniform aerofoil shape along the span thereof from port end 1200P to starboard end 1200S. In other examples the interconnector wing module 1200 can have different shapes, for example: a non-linear or curvate leading edge and/or trailing edge and/or a non-uniform aerofoil shape along the span, and/or a forward swept or aft swept configuration.

The interconnector wing module 1200 also comprises a utility module connection interfaces 500. In this example the utility module connection interface 500 is in the form of a third utility module connection interface 800 configured for coupling with the body connection interface 400 to thereby enable coupling of the respective first utility module 1200 concurrently to each one of two body modules 100.

It is to be noted that in at least this example the third utility module connection interface 800 is substantially identical with the first utility module connection interface 600 or with the second utility module connection interface 700, and furthermore the third utility module connection interface 800 selectively reversibly couples with the body connection interface 400 in a substantially identical manner as the first utility module connection interface 600 or the second utility module connection interface 700 selectively reversibly couples with the body connection interface 400.

In this example the third utility module connection interface 800 comprises a port third utility module connection interface 800P located at the port end 1200P, and a starboard third utility module connection interface 800S located at the starboard end 1200S. Furthermore, the port third utility module connection interface 800P is substantially identical to the port first utility module connection interface 600P or the port second utility module connection interface 700P, mutatis mutandis, and the starboard third utility module connection interface 800S is substantially identical to the starboard first utility module connection interface 600S or the starboard second utility module connection interface 700S, mutatis mutandis.

In at least this example, the body connection interface 400 and the third utility module connection interface 800 for example comprise a suitable mechanical coupling arrangement similar to the mechanical coupling arrangement disclosed above regarding the body connection interface 400 and the first utility module connection interface 600 or the second utility module connection interface 700, mutatis mutandis.

Specifically, the port body connection interface 400P and the port third utility module connection interface 800P or the starboard third utility module connection interface 800S, comprise a suitable mechanical coupling arrangement that allows the respective port body connection interface 400P to be selectively and reversibly coupled at least with respect to any one of the port third utility module connection interface 800P and the starboard third utility module connection interface 800S, for example as disclosed herein regarding the port body connection interface 400P and the port first utility module connection interface 600P or the port second utility module connection interface 700P, mutatis mutandis.

Similarly, the starboard body connection interface 400S and the starboard third utility module connection interface 800S or the port third utility module connection interface 800P, comprise another suitable mechanical coupling arrangement that allows the respective starboard body connection interface 400S to be selectively and reversibly coupled at least with respect to any one of the starboard third utility module connection interface 800S and the port third utility module connection interface 800P, for example as disclosed herein regarding the starboard body connection interface 400S and the starboard first utility module connection interface 600S or the starboard second utility module connection interface 700S, mutatis mutandis.

The body connection interface 400 is configured for selective reversible coupling in turn at least with the third utility module connection interface 800, in a similar manner to the aforementioned selective reversible coupling with the first utility module connection interface 600 or the second utility module connection interface 700, mutatis mutandis, to thereby enable the interconnector wing module 1200 to be selectively reversibly coupled to two body modules 100, also marked as a port body module 100P and a starboard body module 100S, one on each lateral side of the interconnector wing module 1200. Thus, and referring to FIGS. 15 and 16 again, the starboard third utility module connection interface 800S is coupled to the port body connection interface 400P of the starboard body module 100S, while the port third utility module connection interface 800P is coupled to the starboard body connection interface 400S of the port body module 100P.

Optionally, one of the two body modules 100 can be configured differently from the other body module 100 or carry a different payload. For example, one of the two body modules 100 may include in the payload bay thereof a plurality of additional batteries or additional fuel, instead of the body operative components 123 which are instead carried by the other body module 100.

In addition, and referring to FIG. 15, a port fixed wing utility module 200P in the form of port wing 220P can be coupled to the port body module 100P by coupling the respective port first utility module connection interface 600P to the port body connection interface 400P of the port body module 100S. Similarly, a starboard fixed wing utility module 200S in the form of starboard wing 220S can be coupled to the starboard body module 100S by coupling the respective starboard first utility module connection interface 600S to the starboard body connection interface 400S of the port body module 100S. This results in a fixed wing air vehicle 2FW having twin body modules 100P, 100S spanned by the interconnector wing module 1200. The fixed wing air vehicle 2FW can be dismantled by reversing the coupling process disclosed above, mutatis mutandis.

Alternatively, and referring to FIG. 16, a port rotor wing utility module 320P can be coupled to the port body module 100P by coupling the respective port second utility module connection interface 700P to the port body connection interface 400P of the port body module 100S. Similarly, a starboard rotor wing utility module 320S can be coupled to the starboard body module 100S by coupling the respective starboard second utility module connection interface 700S to the starboard body connection interface 400S of the port body module 100S. This results in a rotor wing air vehicle 2RW having twin body modules 100P, 100S spanned by the interconnector wing module 1200. The rotor wing air vehicle 2RW can be dismantled by reversing the coupling process disclosed above, mutatis mutandis.

It is readily apparent that in fact a plurality of three or more body modules 100 can be serially connected in a lateral manner, each pair of laterally adjacent body modules 100 being spaced via a respective interconnector wing module 1200, to form a body assembly. The body module 100 at the port end of this body assembly can then be coupled with a port rotor wing utility module 320P or with a port fixed wing utility module 200P. Similarly, the body module 100 at the starboard end of this body assembly can then be coupled with a starboard rotor wing utility module 320S or with a starboard fixed wing utility module 200S.

It is readily apparent that in fact a plurality of two, three or more body modules 100 can be serially connected in a lateral manner, each pair of laterally adjacent body modules 100 being directly coupled to one another, to form a body assembly. In such a case, for each pair of adjacent body modules, the port body connection interface 400P of the starboard located body module 100 thereof is coupled with the starboard body connection interface 400S of the port located body module 100 thereof. The body module 100 at the port end of this body assembly can then be coupled with a port rotor wing utility module 320P or with a port fixed wing utility module 200P. Similarly, the body module 100 at the starboard end of this body assembly can then be coupled with a starboard rotor wing utility module 320S or with a starboard fixed wing utility module 200S. Thus, the body connection interface 400, in particular the port body connection interface 400P and the starboard body connection interface 400S are configured as body-to-body connection interfaces.

It is also apparent that the interconnector wing module 1200 can also be used for laterally spacing a port fixed wing utility module 200P from a body module 100 by coupling the starboard third utility module connection interface 800S of the interconnector wing module 1200 to the port body connection interface 400P of the body module 100, and by coupling the port third utility module connection interface 800P of the interconnector wing module 1200 to the port first utility module connection interface 600P of the port fixed wing utility module 200P.

Similarly, the interconnector wing module 1200 can also be used for laterally spacing a starboard fixed wing utility module 200S from a body module 100 by coupling the port third utility module connection interface 800P of the interconnector wing module 1200 to the starboard body connection interface 400S of the body module 100, and by coupling the starboard third utility module connection interface 800S of the interconnector wing module 1200 to the starboard first utility module connection interface 600S of the starboard fixed wing utility module 200S.

It is also apparent that the interconnector wing module 1200 can also be used for laterally spacing a port rotor wing utility module 320P from a body module 100 by coupling the starboard third utility module connection interface 800S of the interconnector wing module 1200 to the port body connection interface 400P of the body module 100, and by coupling the port third utility module connection interface 800P of the interconnector wing module 1200 to the port second utility module connection interface 700P of the port rotor wing utility module 320P.

Similarly, the interconnector wing module 1200 can also be used for laterally spacing a starboard rotor wing utility module 320S from a body module 100 by coupling the port third utility module connection interface 800P of the interconnector wing module 1200 to the starboard body connection interface 400S of the body module 100, and by coupling the starboard third utility module connection interface 800S of the interconnector wing module 1200 to the starboard second utility module connection interface 700S of the starboard rotor wing utility module 320S.

Figure 17:
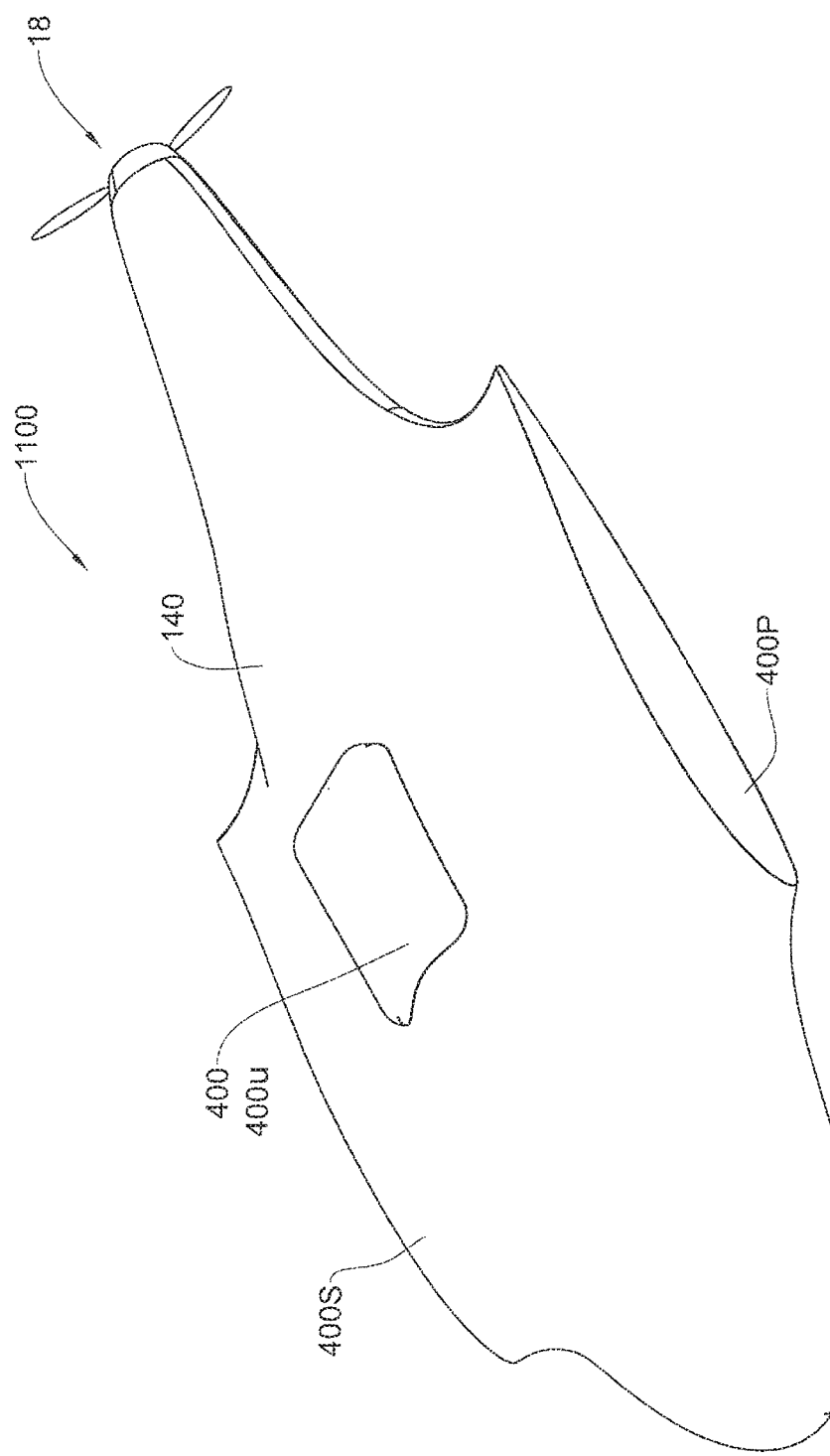
FIG. 17 illustrates, in front-top-side isometric view, another example of a body module of FIG. 1.

Referring to FIG. 17, the modular vehicle system 10 can include a body module 1100 having a single connection interface 400, in addition to or instead of body module 100. In this example the connection interface 400 comprises an upper body connection interface 400U located on upper side 140 of the body module 1100. Optionally, the body module 1100 can instead include three single connection interfaces 400, comprising an upper body connection interface 400U located on upper side 140 of the body module 1100, as well as a port body connection interface 400P and a starboard body connection interface 400S, located on the port and starboard lateral sides, respectively, of the body module 1100. The body module 1100 is similar to the body module 100 as disclosed herein, mutatis mutandis, except for than the inclusion of upper body connection interface 400U, and the optional exclusion of the port body connection interface 400P and of the starboard body connection interface 400S. Thus for example the body module can include a body mounted propulsion unit 18 or can optionally omit the same. The upper body connection interface 400U can be similar to the port body connection interface 400P and a starboard body connection interface 400S, as disclosed herein mutatis mutandis, other than the location thereof with respect to the body module.

In examples of the modular vehicle system 10 that includes body module 1100, the kit 20 comprises at least one first utility module 200 in the form of a unitary first fixed wing utility module 2200, and at least one second utility module 300 in the form of a unitary second rotor wing utility module 2300.

The unitary first fixed wing utility module 2200 comprises at least one utility module connection interface 500 is configured for selectively providing the body module 1100 with fixed wing flight capability when coupled thereto via the respective utility module connection interface 500. In this example, the utility module connection interface 500 is in the form of a fourth utility module connection interface 1600 configured for coupling with the body connection interface 400, in particular the upper body connection interface 400U to thereby enable coupling of the respective unitary first fixed wing utility module 2200 to the body module 1100.

For example, the fourth utility module connection interface 1600 can be similar to the first utility module connection interface 600, as disclosed herein mutatis mutandis, other than the location thereof with respect to the respective first utility module 200.

In this example, and referring to FIGS. 18(a) to 18(d), the unitary first fixed wing utility module 2200 is in the form of an integral wing 2220 and comprises a port fixed-wing portion 2200P, and a starboard fixed-wing portion 2200S.

The port fixed-wing portion 2200P and the starboard fixed-wing port wing portion 2200P are configured for together generating aerodynamic lift sufficient to thereby provide aerodynamic flight capability to the body module 1100 when unitary first fixed wing utility module 2200 is coupled to the body module 1100.

The port fixed-wing portion 2200P and the starboard fixed-wing port wing portion 2200P are integral with or joined to one another.

In this example the fourth utility module connection interface 1600 is centrally located spanwise with respect to the port fixed-wing portion 2200P and the starboard fixed-wing port wing portion 2200P, and on a bottom part of the unitary first fixed wing utility module 2200.

The upper body connection interface 400U is configured for selective reversible coupling at least with fourth utility module connection interface 1600, to thereby enable the unitary first fixed wing utility module 2200 to be selectively reversibly coupled to the body module 1100 to thereby provide a fixed wing air vehicle 11FW.

In this example unitary first fixed wing utility module 2200 does not include any, i.e., has an absence of, wing-mounted propulsion units. However, in alternative variations of this example, and in other examples, the unitary first fixed wing utility module 2200 comprises at least one wing mounted propulsion unit for providing propulsion to the unitary first fixed wing utility module 2200. For example the at least one wing mounted propulsion unit can be similar as disclosed herein regarding the wing mounted propulsion unit 290, mutatis mutandis. For example, each such wing mounted propulsion unit is in fixed geometric relationship with the to provide a forward propulsion thereto and thus to the respective air vehicle formed when the unitary first fixed wing utility module 2200 is coupled to the body 100, for example.

Alternatively, for example, the one or more wing mounted propulsion units can each be pivotably mounted with respect to the unitary first fixed wing utility module 2200 about a pivot axis to provide a vectored propulsion thereto and thus to the air vehicle when the unitary first fixed wing utility module 2200 is coupled to the body 100, for example, to allows the wing mounted propulsion units and the thrust generated thereby to vector between vertical and horizontal directions. Optionally, and referring to FIG. 14, the body module 100 can include a pivotable propulsion unit 182, pivotable about pivot axis APA. This pivotable propulsion unit 182 can be aft mounted instead of the body mounted propulsion unit 180 of FIG. 2, or alternatively can be provided at the forward end of the body module 100 instead of or in addition to body mounted propulsion unit 180 of FIG. 2. This pivoting about pivot axis APA also allows the pivotable propulsion unit 182 and the thrust generated thereby to vector between vertical and horizontal directions. In at least some variations of this example the direction and extent of pivoting of each one of the wing mounted propulsion units and the pivotable propulsion unit 182, can be independently controlled, one from the other to enable control moments to be generated in one or more of pitch, yaw and roll. Additionally or alternatively, the individual thrusts generated by each one of the wing mounted propulsion units and the pivotable propulsion unit 182, can be independently controlled, one from the other to enable control moments to be generated in one or more of pitch, yaw and roll.

In any case, in examples wherein the unitary first fixed wing utility module 2200 comprises at least one wing mounted propulsion unit 290 this can be selectively operatively connected to the respective body module via a suitable propulsion system-body module coupling system.

For example, in examples wherein the unitary first fixed wing utility module 2200 comprises at least one wing mounted propulsion unit 290, in which the mounted propulsion unit 290 comprises an integral electric motor system, such an integral electric motor system being in electrical power communication with electric power source (for example similar to electric power source 190 of FIG. 6) accommodated in the body module 1100 via the respective propulsion system-body module coupling system in the form of a power coupling system. The electrical power source includes batteries and power module. The power coupling system comprises a first power coupling component in the fourth utility module connection interface 1600, and a second power coupling component comprised in the upper body connection interface 400U. When the unitary first fixed wing utility module 2200 is coupled to the body module 100, the respective first power coupling component is coupled with the respective second power coupling component to provide power to the wing mounted propulsion unit(s) of the unitary first fixed wing utility module 2200.

In alternative variations of this example, and in other examples, each wing mounted propulsion unit comprises a fuel engine system, including at least one fuel engine (for example an internal combustion engine) coupled to a rotor. The fuel engine system is in selective fuel communication with a fuel source (accommodated in the body module 1100) via the respective propulsion system-body module coupling system in the form of a fuel coupling system. The fuel coupling system comprises a first fuel coupling component comprised in the fourth utility module connection interface 1600, and a second fuel coupling component comprised in the upper body connection interface 400U. When the unitary first fixed wing utility module 2200 is coupled to the body module 1100, the respective first fuel coupling component is coupled with the respective second fuel coupling component to provide fuel to the wing mounted propulsion unit of the unitary first fixed wing utility module 2200.

In alternative variations of this examples, and in other examples, the wing mounted propulsion unit comprise suitable rotors driven by one or more electric motors and/or one or more fuel engines (for example internal combustion engines) accommodated in the body module 1100, via the respective propulsion system-body module coupling system in the form of a suitable mechanical coupling system. For example, the mechanical coupling system can comprise a first driveshaft coupling component comprised in the fourth utility module connection interface 1600, and a second driveshaft coupling component comprised in the upper body connection interface 400U. When the unitary first fixed wing utility module 2200 is coupled to the body module 1100, the respective first driveshaft coupling component is mechanically coupled with the respective second driveshaft coupling component to drive the wing mounted propulsion unit of the unitary first fixed wing utility module 2200.

Referring to FIGS. 19(a) to 19(d), there is illustrated a fixed wing air vehicle 11FW' which is configured as a glider, and comprises all the elements and features of the fixed wing air vehicle 11FW of FIGS. 18(a) to 18(d) as disclosed herein, mutatis mutandis, with the difference that the fixed wing air vehicle 11FW' does not include a body mounted propulsion system.

The unitary second rotor wing utility module 2300 comprises at least one utility module connection interface 500 configured for selectively providing the body module 1100 with rotor wing flight capability when coupled thereto via the respective utility module connection interface 500. In this example, the utility module connection interface 500 is in the form of a fifth utility module connection interface 1700 configured for coupling with the body connection interface 400, in particular the upper body connection interface 400U to thereby enable coupling of the respective unitary second rotor wing utility module 2300 to the body module 1100.

For example, the fifth utility module connection interface 1700 can be similar to the second utility module connection interface 700, as disclosed herein mutatis mutandis, other than the location thereof with respect to the respective second utility module 300.

Figure 20:
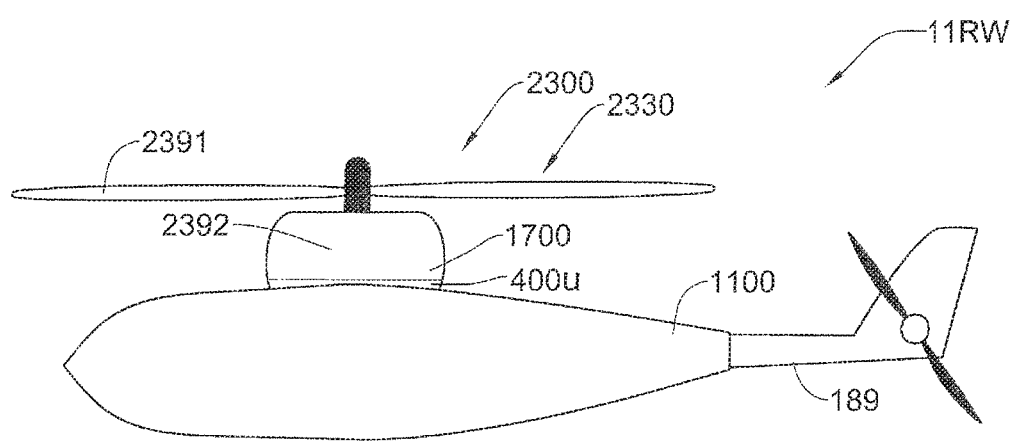
FIG. 20 illustrates, in side view, another example of a rotor wing air vehicle provided by the system of FIG. 1 using the body module of the example of FIG. 17 and fitted with an anti-torque tail unit.

In a first example, and referring to FIG. 20, the unitary second rotor wing utility module 2300 comprises a propulsion unit in the form of one primary rotor unit 2330, configured for generating rotor lift sufficient to thereby provide rotor flight capability to the body module 1100 when unitary second rotor wing utility module 2300 is coupled to the body module 1100.

The primary rotor unit 2330 includes a single rotor 2391 (or, alternatively, a plurality of coaxial, co-rotational rotors) mounted for rotation to a base 2392, and the body module 1100 can be fitted with an auxiliary body mounted anti-torque tail unit 189.

In this example the fifth utility module connection interface 1700 is centrally located laterally with respect to the primary rotor unit 2330, and on a bottom part of the unitary second rotor wing utility module 2300, in particular on a bottom part of the base 2392.

The upper body connection interface 400U is configured for selective reversible coupling at least with fifth utility module connection interface 1700, to thereby enable the unitary second rotor wing utility module 2300 to be selectively reversibly coupled to the body module 1100 to thereby provide a rotor wing air vehicle 11RW.

Figure 21:
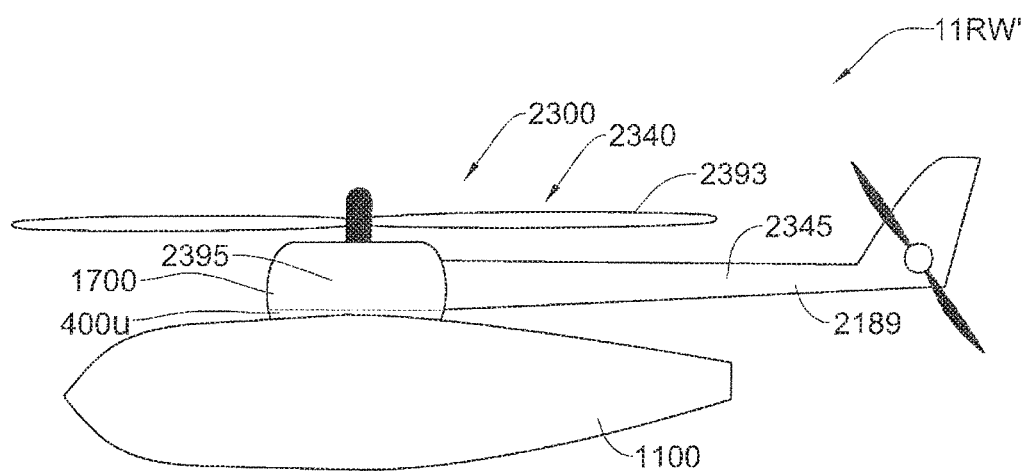
FIG. 21 illustrates, in side view, another example of a rotor wing air vehicle provided by the system of FIG. 1 using the body module of the example of FIG. 17, the rotor wing utility module including an anti-torque tail unit.

In an alternative variation of the example of FIG. 20, and referring to FIG. 21, the unitary second rotor wing utility module 2300 also comprises one primary rotor unit 2340, configured for generating rotor lift sufficient to thereby provide rotor flight capability to the body module 1100 when unitary second rotor wing utility module 2300 is coupled to the body module 1100.

The primary rotor unit 2340 includes a single rotor 2393 (or, alternatively, a plurality of coaxial, co-rotational rotors) mounted for rotation to a base 2395, and further comprises an anti-torque tail unit 2189 spaced from the rotor in an aft direction via strut 2345.

In this example the fifth utility module connection interface 1700 is also centrally located laterally with respect to the primary rotor unit 2340, and on a bottom part of the unitary second rotor wing utility module 2300, in particular on a bottom part of the base 2395. The upper body connection interface 400U is configured for selective reversible coupling at least with fifth utility module connection interface 1700, to thereby enable the unitary second rotor wing utility module 2300 to be selectively reversibly coupled to the body module 1100 to thereby provide a rotor wing air vehicle 11RW'.

Figure 22:
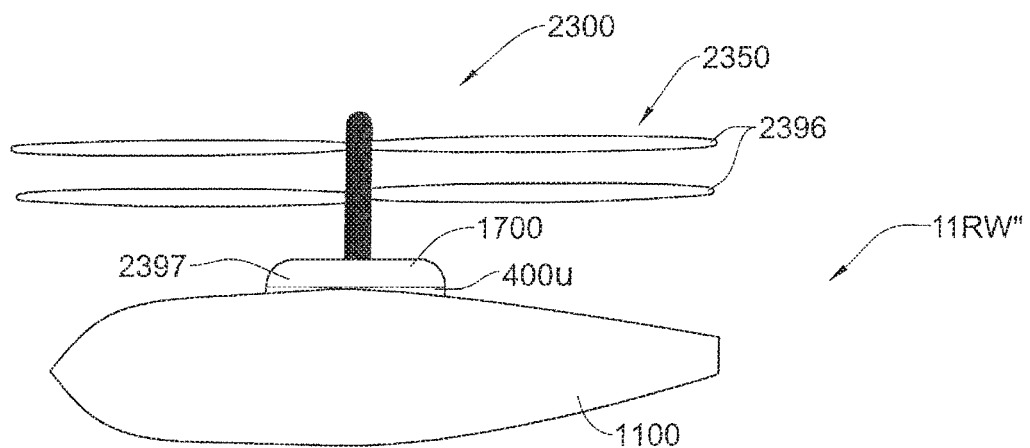
FIG. 22 illustrates, in side view, another example of a rotor wing air vehicle provided by the system of FIG. 1 using the body module of the example of FIG. 17 and including counter rotating rotors.

In an alternative variation of the examples of FIGS. 20 and 21, and referring to FIG. 22, the unitary second rotor wing utility module 2300 also comprises one primary rotor unit 2350, configured for generating rotor lift sufficient to thereby provide rotor flight capability to the body module 1100 when unitary second rotor wing utility module 2300 is coupled to the body module 1100.

However, in this example, the primary rotor unit 2350 includes at least one pair of counter rotating rotors 2396 mounted for rotation to a base 2397. Also in this example the fifth utility module connection interface 1700 is also centrally located laterally with respect to the primary rotor unit 2350, and on a bottom part of the unitary second rotor wing utility module 2300, in particular on a bottom part of the base 2397. The upper body connection interface 400U is configured for selective reversible coupling at least with fifth utility module connection interface 1700, to thereby enable the unitary second rotor wing utility module 2300 to be selectively reversibly coupled to the body module 1100 to thereby provide a rotor wing air vehicle 11RW".

In a second example, and referring to FIG. 23 the unitary second rotor wing utility module 2300 comprises two primary rotor units 2380, configured for generating rotor lift sufficient to thereby provide rotor flight capability to the body module 1100 when unitary second rotor wing utility module 2300 is coupled to the body module 1100.

The two primary rotor units 2380 each includes a single rotor (or, alternatively, a plurality of coaxial, co-rotational rotors or a plurality of pairs of coaxial counter rotating rotors) mounted in lateral spaced arrangement to a base 2382 via struts 2384. In an alternative variation of the example of FIG. 23, and referring to FIG. 24, the two primary rotor units 2380 each includes a single rotor (or, alternatively, a plurality of coaxial, co-rotational rotors or a plurality of pairs of coaxial counter rotating rotors) mounted in tandem spaced arrangement to the base 2382 via struts 2385.

In the examples of FIGS. 23 and 24, the fifth utility module connection interface 1700 is centrally located laterally with respect to the primary rotor unit 2330, and on a bottom part of the unitary second rotor wing utility module 2300, in particular on a bottom part of the base 2382. The upper body connection interface 400U is configured for selective reversible coupling at least with fifth utility module connection interface 1700, to thereby enable the unitary second rotor wing utility module 2300 to be selectively reversibly coupled to the body module 1100 to thereby provide a rotor wing air vehicle 12RW (with laterally spaced primary rotor units 2380—FIG. 23) or rotor wing air vehicle 12RW' (with tandem spaced primary rotor units 2380—FIG. 24).

Figure 25:
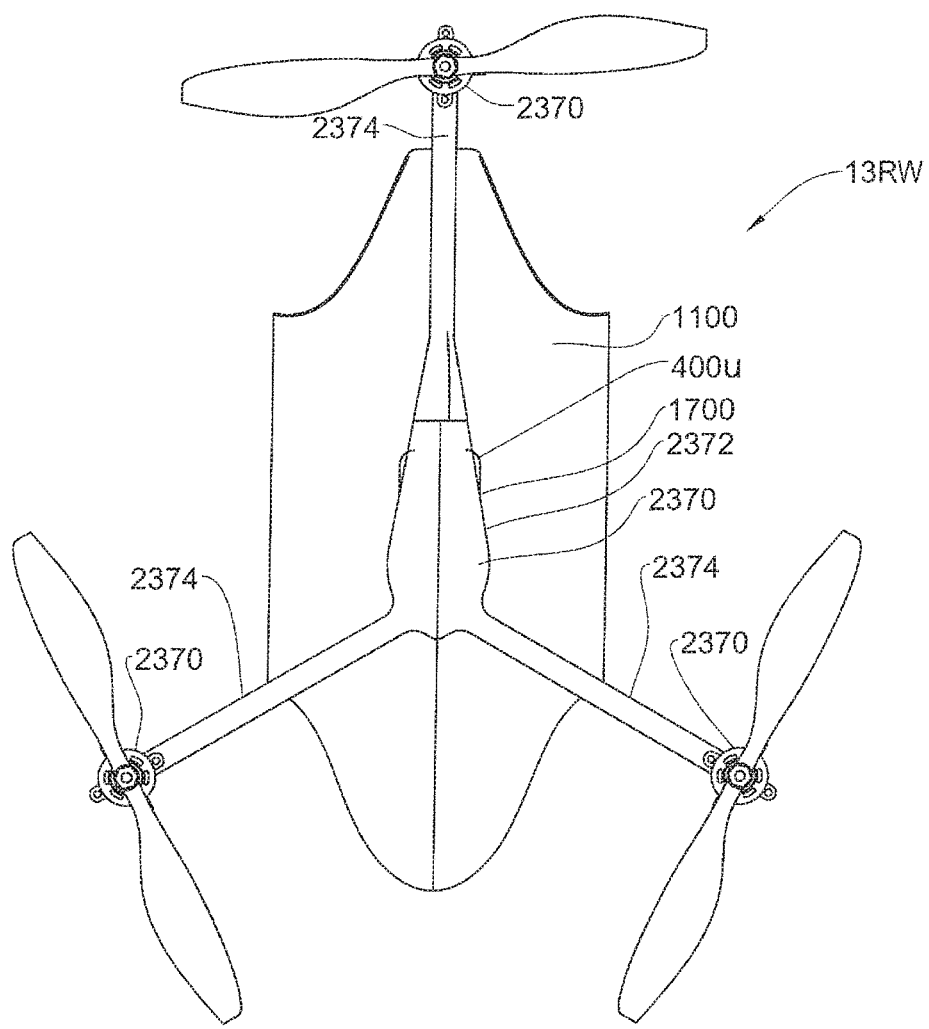
FIG. 25 illustrates, in top view, another example of a rotor wing air vehicle provided by the system of FIG. 1 using the body module of the example of FIG. 17 and including three primary rotor units in triangular arrangement.
Figure 26A:
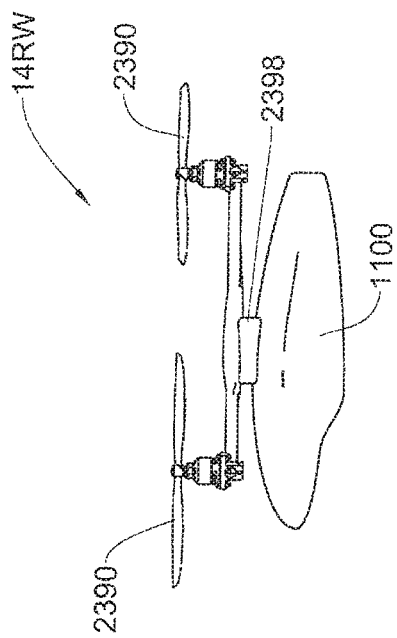
FIGS. 26(*a*) to 26(*d*) illustrate, in top view, side view, front view and in front-top-side isometric view, respectively, another example of a rotor wing air vehicle provided by the system of FIG. 1 using the body module of the example of FIG. 17, and including four primary rotor units in quad copter arrangement.
Figure 26B:
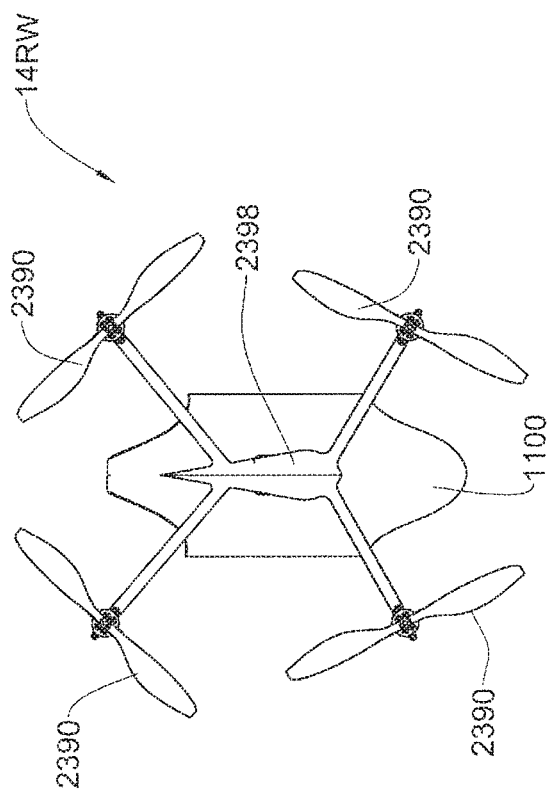
Figure 26C:
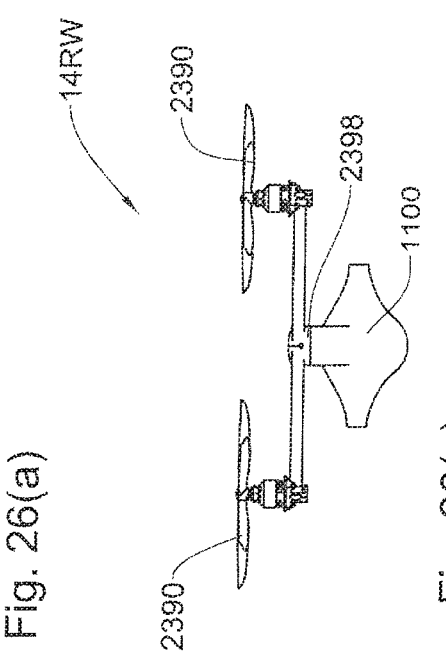
Figure 26D:
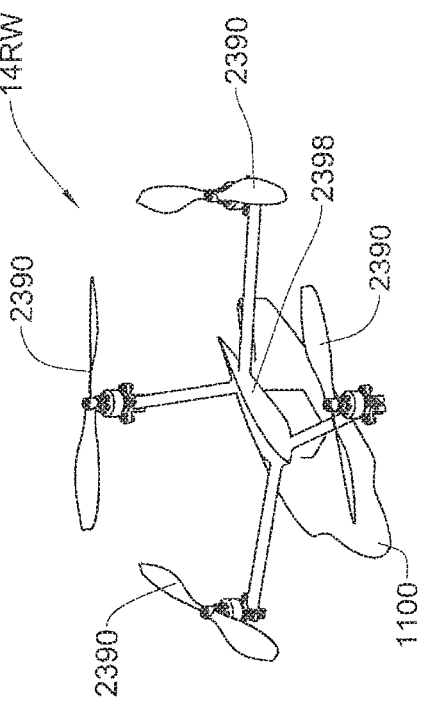

In a third example, and referring to FIG. 25 the unitary second rotor wing utility module 2300 comprises three primary rotor units 2380, in triangular arrangement, and configured for generating rotor lift sufficient to thereby provide rotor flight capability to the body module 1100 when unitary second rotor wing utility module 2300 is coupled to the body module 1100.

The three primary rotor units 2370 each includes a single rotor (or, alternatively, a plurality of coaxial, co-rotational rotors or a plurality of pairs of coaxial counter rotating rotors) mounted in spaced arrangement to a base 2372 via respective struts 2374. Two primary rotor units 2370 are laterally spaced and forward mounted with respect to the base 2372 via struts, while the third primary rotor unit 2370 is aft mounted with respect to the base 2372 via struts. In an alternative variation of the example of FIG. 25, two primary rotor units 2370 are laterally spaced and aft mounted with respect to the base 2372 via struts, while the third primary rotor unit 2370 is forward mounted with respect to the base 2372 via struts.

In the example of FIG. 25, the fifth utility module connection interface 1700 is centrally located laterally with respect to the three primary rotor units 2370, and on a bottom part of the unitary second rotor wing utility module 2300, in particular on a bottom part of the base 2372. The upper body connection interface 400U is configured for selective reversible coupling at least with fifth utility module connection interface 1700, to thereby enable the unitary second rotor wing utility module 2300 to be selectively reversibly coupled to the body module 1100 to thereby provide a rotor wing air vehicle 13RW.

In a fourth example, and referring to FIGS. 26(*a*) to 26(*d*) the unitary second rotor wing utility module 2300 comprises four primary rotor units 2390, in quadcopter arrangement, and configured for generating rotor lift sufficient to thereby provide rotor flight capability to the body module 1100 when unitary second rotor wing utility module 2300 is coupled to the body module 1100.

The four primary rotor units 2390 each includes a single rotor (or, alternatively, a plurality of coaxial, co-rotational rotors or a plurality of pairs of coaxial counter rotating rotors) mounted in spaced arrangement to a base 2398 via respective struts 2374. Two primary rotor units 2370 are laterally spaced and forward mounted with respect to the base 2372 via struts, while the two other primary rotor units 2370 are laterally spaced and aft mounted with respect to the base 2398 via struts.

In the example of FIGS. 26(*a*) to 26(*d*), the fifth utility module connection interface 1700 is centrally located laterally with respect to the four primary rotor units 2390, and on a bottom part of the unitary second rotor wing utility module 2300, in particular on a bottom part of the base 2398. The upper body connection interface 400U is configured for selective reversible coupling at least with fifth utility module connection interface 1700, to thereby enable the unitary second rotor wing utility module 2300 to be selectively reversibly coupled to the body module 1100 to thereby provide a rotor wing air vehicle 14RW.

In alternative variations of the examples of FIGS. 20 to 26(*d*), and in other examples, the unitary second rotor wing utility module 2300 comprises five or more than five primary rotor units.

It is to be noted that kit 20 can include one or more of the first to fifth examples of the unitary second rotor wing utility module 2300 illustrated in FIGS. 20 to 26(*d*).

In any case, in examples wherein the unitary second rotor wing utility module 2300 comprises at least one powered propulsion unit, in the form of primary rotor units 2390, the primary rotor units 2390 can be selectively operatively connected to the respective body module via a suitable propulsion system-body module coupling system.

Referring again to FIGS. 20 to 26(*d*), in each of the first to fifth examples, and variations thereof, each respective primary rotor unit 2390 can comprise an integral electric motor system, such an integral electric motor system being in electrical power communication with electric power source (for example similar to electric power source 190 of FIG. 6) accommodated in the body module 1100 via the respective propulsion system-body module coupling system in the form of a power coupling system. The power coupling system comprises a first power coupling component in the respective fifth utility module connection interface 1700, and a second power coupling component comprised in the upper body connection interface 400U. When the unitary second rotor wing utility module 2300 is coupled to the body module 1100, the respective first power coupling component is coupled with the respective second power coupling component to provide power to the respective primary rotor unit(s) of the unitary second rotor wing utility module 2300.

In alternative variations of these example, and in other examples, each respective primary rotor unit 2390 comprises a fuel engine system, including at least one fuel engine (for example an internal combustion engine) coupled to the respective rotor(s). The fuel engine system is in selective fuel communication with a fuel source (accommodated in the body module 1100) via the respective propulsion system-body module coupling system in the form of a fuel coupling system. The fuel coupling system comprises a first fuel coupling component comprised in the fifth utility module connection interface 1700, and a second fuel coupling component comprised in the upper body connection interface 400U. When the unitary second rotor wing utility module 2300 is coupled to the body module 1100, the respective first fuel coupling component is coupled with the respective second fuel coupling component to provide fuel to the respective primary rotor unit(s) of the unitary second rotor wing utility module 2300.

In alternative variations of these examples, and in other examples, each respective primary rotor unit 2390 comprise respective rotor(s) driven by one or more electric motors and/or one or more fuel engines (for example internal combustion engines) accommodated in the body module 1100, via the respective propulsion system-body module coupling system in the form of a suitable mechanical coupling system. For example, the mechanical coupling system can comprise a first driveshaft coupling component comprised in the fifth utility module connection interface 1700, and a second driveshaft coupling component comprised in the upper body connection interface 400U. When the unitary second rotor wing utility module 2300 is coupled to the body module 1100, the respective first driveshaft coupling component is mechanically coupled with the respective second driveshaft coupling component to drive the respective primary rotor unit(s) of the unitary second rotor wing utility module 2300.

In alternative variations of the examples of FIGS. 20 to 26(*d*), and in other examples, each respective primary rotor unit is configured as an unpowered rotor unit, or is operated unpowered, and, additionally, the body module 1100 also does not include any, i.e., has an absence of, body-mounted propulsion units. Alternatively, each of the each primary rotor unit 2390 is configured as an unpowered rotor unit, or is operated unpowered, and, additionally, the body module 1100 includes at least one body-mounted propulsion units. In either case, the respective unitary second rotor wing utility module 2300 is reversibly coupled to the body module 1100 to thereby provide a rotor wing air vehicle configured for operation as an autogyro.

In alternative variations of the above examples, and in other examples, each unitary first fixed wing utility module 2200, and each unitary second rotor wing utility module 2300 can include a respective the utility module connection interface 500 configured for coupling with the body connection interface 400 which is in the form of a bottom body connection interface 400B, rather than the upper body connection interface 400U to thereby enable coupling of the respective unitary first fixed wing utility module 2200 or of the respective unitary second rotor wing utility module 2300 to the body module 1100.

Operation of the modular vehicle system 10, according to one example, is as follows.

When it is desired to provide a fixed wing vehicle 1FW using the modular vehicle system 10, the fixed wing utility module 200 can be coupled to the body module 100 by coupling the respective body connection interface 400 with the first utility module connection interface 600. If prior to this coupling there is another fixed wing utility module 200 or another rotor wing utility module 300 already coupled to the body module 100 via the same respective body connection interface 400, this other fixed wing utility module 200 or rotor wing utility module 300 must first be uncoupled from the body module 100 to thereby render the body connection interface 400 available for coupling with the desired fixed wing utility module 200.

Such a coupling process is typically carried out by a ground crew, and is not carried out in flight conditions.

In this example, and referring to FIGS. 2, 3, 4 for example, port fixed wing utility module 200P, in the form of port wing 220P, is coupled to the body module 100 by coupling the port body connection interface 400P with the port first utility module connection interface 600P, and the starboard fixed wing utility module 200S, in the form of starboard wing 220S, is coupled to the body module 100 by coupling the starboard body connection interface 400S with the starboard first utility module connection interface 600S.

In corresponding examples wherein the port fixed wing utility module 200P and/or the starboard fixed wing utility module 200S comprises at least one wing mounted propulsion unit 290 in the form of an integral electric motor system and a respective propulsion system-body module coupling system, and where appropriate, each respective first power coupling component 193 is also coupled with the respective second power coupling component 195 to provide power to wing mounted propulsion units 290 of the port fixed-wing utility module 200P and of the starboard fixed-wing utility module 200S.

In corresponding examples wherein the port fixed wing utility module 200P and/or the starboard fixed wing utility module 200S comprises at least one wing mounted propulsion unit 290 in the form of a fuel engine system and a respective propulsion system-body module coupling system, and where appropriate, each respective first fuel coupling component is also coupled with the respective second fuel coupling component to provide fuel to wing mounted propulsion units 290 of the port fixed-wing utility module 200P and of the starboard fixed-wing utility module 200S.

In corresponding examples wherein the port fixed wing utility module 200P and/or the starboard fixed wing utility module 200S comprises at least one wing mounted propulsion unit 290 comprising suitable rotors driven by one or more electric motors and/or one or more fuel engines (for example internal combustion engines) accommodated in the body module 100, via a and a respective propulsion system-body module coupling system in the form of a suitable mechanical coupling system, and where appropriate, each respective first driveshaft coupling component is also coupled with the respective second driveshaft coupling component to drive the wing mounted propulsion units 290 of the port fixed-wing utility module 200P and of the starboard fixed-wing utility module 200S.

The fixed wing vehicle 1FW can then be operated to carry out any one of a number of missions requiring fixed wing capability. If the fixed wing vehicle 1FW does not have wing-mounted propulsion units and yet it is required or desired for the fixed wing vehicle 1FW to operate in powered flight, then the body module 100 is chosen with a body mounted propulsion unit. If powered flight is not required and it is desired to operate the air vehicle as a glider, then either the body mounted propulsion unit is not used, or a different body module 100 is chosen that lacks a body mounted propulsion unit.

The fixed wing utility module 200 can be decoupled from the body module 100 by decoupling the respective body connection interface 400 with respect to the first utility module connection interface 600, essentially reversing the order of the coupling process disclosed above. Such a decoupling process is typically carried out by a ground crew and not under flight conditions.

Figure 18A:
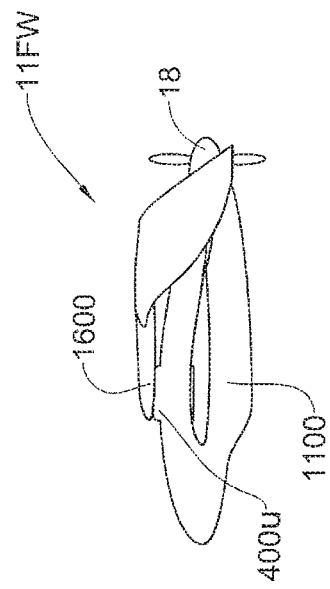
FIGS. 18(*a*) to 18(*d*) illustrate, in top view, side view, front view and in front-top-side isometric view, respectively, another example of a fixed wing air vehicle provided by the system of FIG. 1 using the body module of the example of FIG. 17.
Figure 18B:
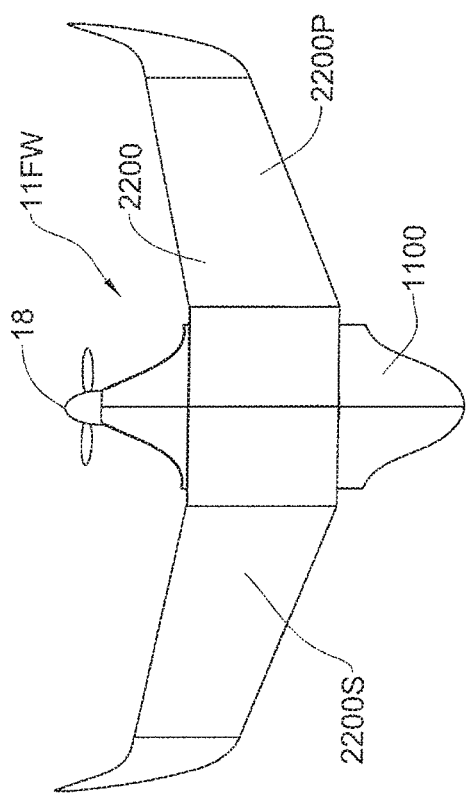
Figure 18C:
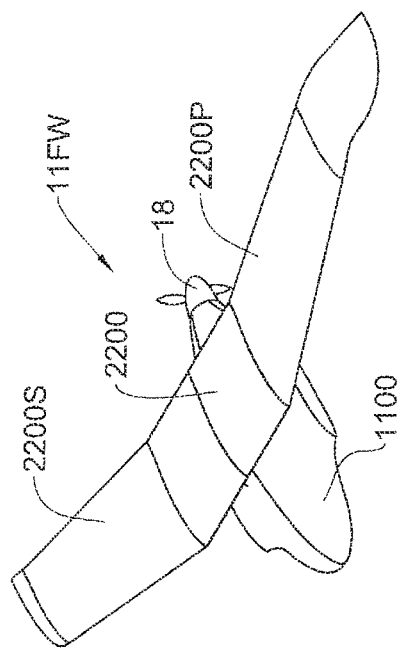
Figure 18D:
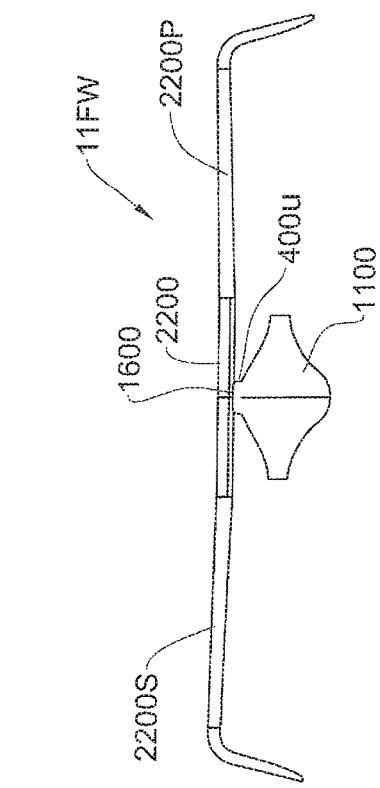
Figure 19B:
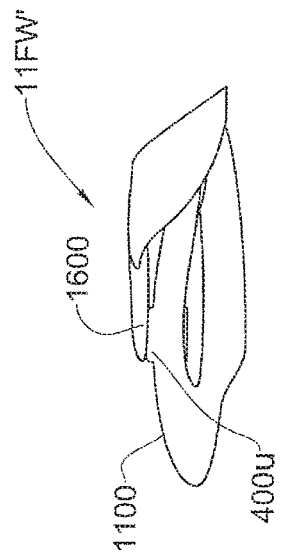
FIGS. 19(*a*) to 19(*d*) illustrate, in top view, side view, front view and in front-top-side isometric view, respectively, another example of a fixed wing air vehicle of FIGS. 18(*a*) to 18(*d*) and configured as a glider.
Figure 19D:
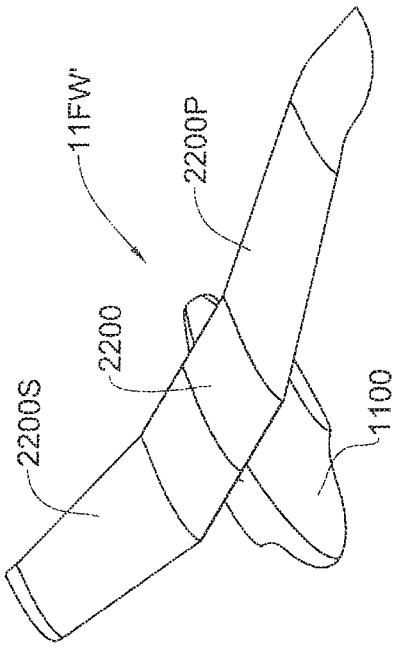
Figure 19A:
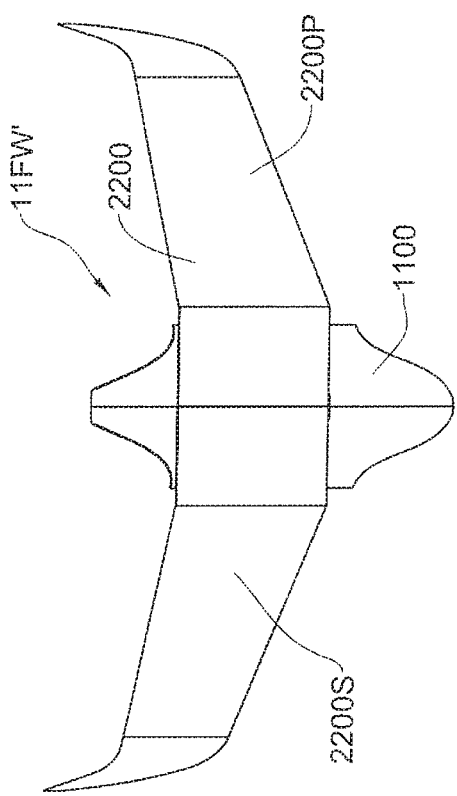
Figure 19C:
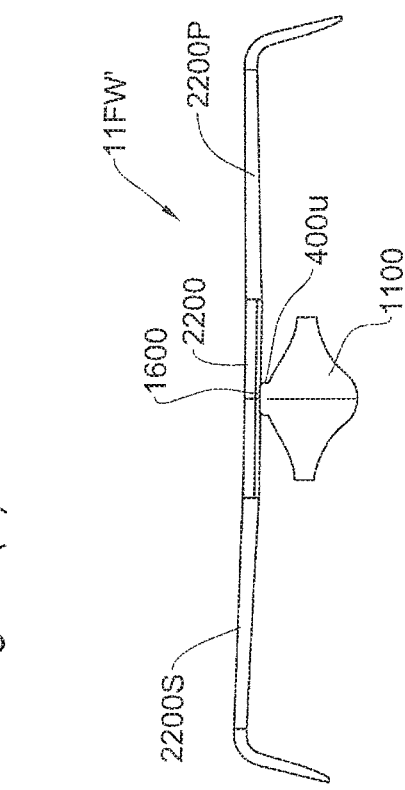

In a similar manner, mutatis mutandis, and referring to FIGS. 17 to 18(d) for example, unitary first fixed wing utility module 2200 is coupled to the body module 1100 by coupling the upper body connection interface 400U with the fourth utility module connection interface 1600.

When it is desired to provide a rotor wing vehicle 1RW, the rotor wing utility module 300 is coupled to the body module 100 by coupling the respective body connection interface 400 with the second utility module connection interface 700. If prior to this coupling there is another fixed wing utility module 200 or another rotor wing utility module 300 already coupled to the body module 100 via the same respective body connection interface 400, this other fixed wing utility module 200 or rotor wing utility module 300 must first be uncoupled from the body module 100 to thereby render the body connection interface 400 available for coupling.

Such a coupling process is typically carried out by a ground crew and is not carried out under flight conditions.

In this example, and referring to FIGS. 2, 3, 5, 10, 11 for example, port rotor wing utility module 320P is coupled to the body module 100 by coupling the port body connection interface 400P with the port second utility module connection interface 700P, and the starboard rotor wing utility module 320S is coupled to the body module 100 by coupling the starboard body connection interface 400S with the starboard second utility module connection interface 700S.

In corresponding examples wherein the port rotor wing utility module 320P and/or the starboard rotor wing utility module 320S comprises at least one primary rotor unit 350 in the form of an integral electric motor system, and where appropriate, each respective first power coupling component 193 is also coupled with the respective second power coupling component 195 to provide power to the primary rotor units 350.

In corresponding examples wherein the port rotor wing utility module 320P and/or the starboard rotor wing utility module 320S comprises at least one primary rotor unit 350 in the form of a fuel engine system and a respective propulsion system-body module coupling system, and where appropriate, each respective first fuel coupling component is also coupled with the respective second fuel coupling component to provide fuel to the primary rotor units 350.

In corresponding examples wherein the port rotor wing utility module 320P and/or the starboard rotor wing utility module 320S comprises at least one primary rotor unit 350 comprising suitable rotors driven by one or more electric motors and/or one or more fuel engines (for example internal combustion engines) accommodated in the body module 100, via a respective propulsion system-body module coupling system in the form of a suitable mechanical coupling system, and where appropriate, each respective first driveshaft coupling component is also coupled with the respective second driveshaft coupling component to drive the primary rotor units 350.

The rotor wing vehicle 1RW can then be operated to carry out any one of a number of missions requiring rotor wing capability.

The rotor wing utility module 300 can be decoupled from the body module 100 by decoupling the respective body connection interface 400 with respect to the second utility module connection interface 700, essentially reversing the order of the coupling process disclosed above. Such a decoupling process is typically carried out by a ground crew and not under flight conditions.

In a similar manner, mutatis mutandis, and referring to FIGS. 17, 20 to 26(d) for example, unitary second rotary wing utility module 2300 is coupled to the body module 1100 by coupling the upper body connection interface 400U with the fifth utility module connection interface 1700.

According to certain aspects of the presently disclosed subject matter, the modular vehicle system 10 allows for many and varied vehicle configurations to be provided, including configurations comprising a plurality of body modules and/or comprising combinations of fixed wing utility modules 200 and rotor wing utility modules 300.

The modular vehicle system 10 can include, for example, variations of the body module 1100 having three single connection interface 400, including an upper body connection interface 400U located on upper side 140 of the body module 1100, as well as a port body connection interface 400P and a starboard body connection interface 400S, located on the port and starboard lateral sides, respectively, of the body module 1100. Additionally or alternatively, modular vehicle system 10 can include, for example, variations of the body module 1100 having four single connection interface 400, including an upper body connection interface 400U located on upper side 140 of the body module 1100, a port body connection interface 400P and a starboard body connection interface 400S, located on the port and starboard lateral sides, respectively, of the body module 1100, and a bottom body connection interface 400B located on bottom side 150 of the body module 1100.

The upper body connection interface 400U, the port body connection interface 400P, the starboard body connection interface 400S, and the bottom body connection interface 400B are each configured as a body-to-body connection. This enables at least coupling between: an upper body connection interface 400U of one body module 1100 with the bottom body connection interface 400B of another body module 1100; a port body connection interface 400P of one body module 1100 with the starboard body connection interface 400S of another body module 1100. It is also to be noted that according to these aspects of the presently disclosed subject matter, the upper body connection interface 400U, the port body connection interface 400P, the starboard body connection interface 400S, and the bottom body connection interface 400B are each configured for coupling with any one of the respective fixed wing utility modules 200 and rotor wing utility modules 300.

For example, and referring to FIG. 27, a fixed wing air vehicle 22FW is provided by vertically coupling two body modules 1100. This vertical coupling is by coupling the upper body connection interface 400U of the respective lower body module 1100 with the bottom body connection interface 400B of the respective upper body module 1100. The upper body module 1100 is also coupled to a starboard fixed-wing port wing utility module 200S and to a port fixed-wing port wing utility module 200P.

For example, and referring to FIG. 28, a fixed wing air vehicle 3FW is provided by laterally two body modules 1100 together via a modified interconnector wing modules 1200' that includes an upper connection interface similar to upper body connection interface 400U, which is coupled to the bottom body connection interface 400B of a third body module 1100. The third (upper) body module 1100 is also coupled to a starboard fixed-wing port wing utility module 200S and a port fixed-wing port wing utility module 200P.

For example, and referring to FIG. 29, a fixed wing air vehicle 4FW is provided by laterally coupling two pairs of vertically coupled body modules 1100 together via two interconnector wing modules 1200. Each such pair is vertically coupled by coupling the upper body connection interface 400U of the respective lower body module 1100 with the bottom body connection interface 400B of the respective upper body module 1100. The upper body modules 1100 are also coupled to one or the other of starboard fixed-wing port wing utility module 200S and port fixed-wing port wing utility module 200P.

Figure 30:
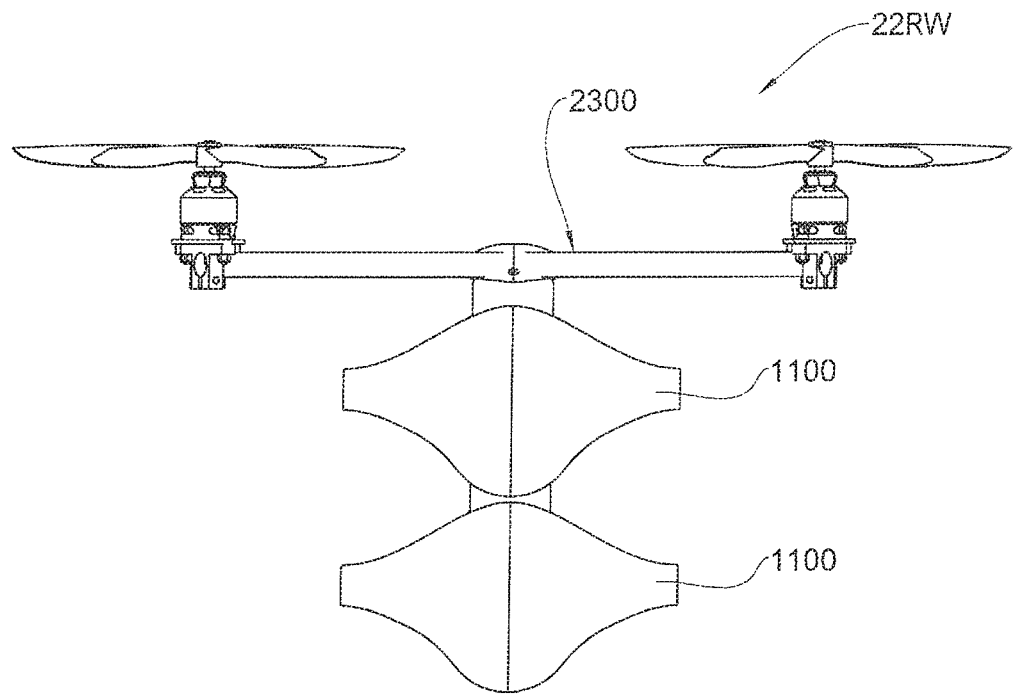
FIG. 30 illustrates, in front view, another example of a rotor wing air vehicle provided by the system of FIG. 1 using two body modules of the example of FIG. 17 mounted to one another.

For example, and referring to FIG. 30, a rotor wing air vehicle 22RW is provided by vertically coupling two body modules 1100. This vertical coupling is by coupling the upper body connection interface 400U of the respective lower body module 1100 with the bottom body connection interface 400B of the respective upper body module 1100. The upper body module 1100 is also coupled to a unitary second rotor wing utility module 2300.

Figure 31:
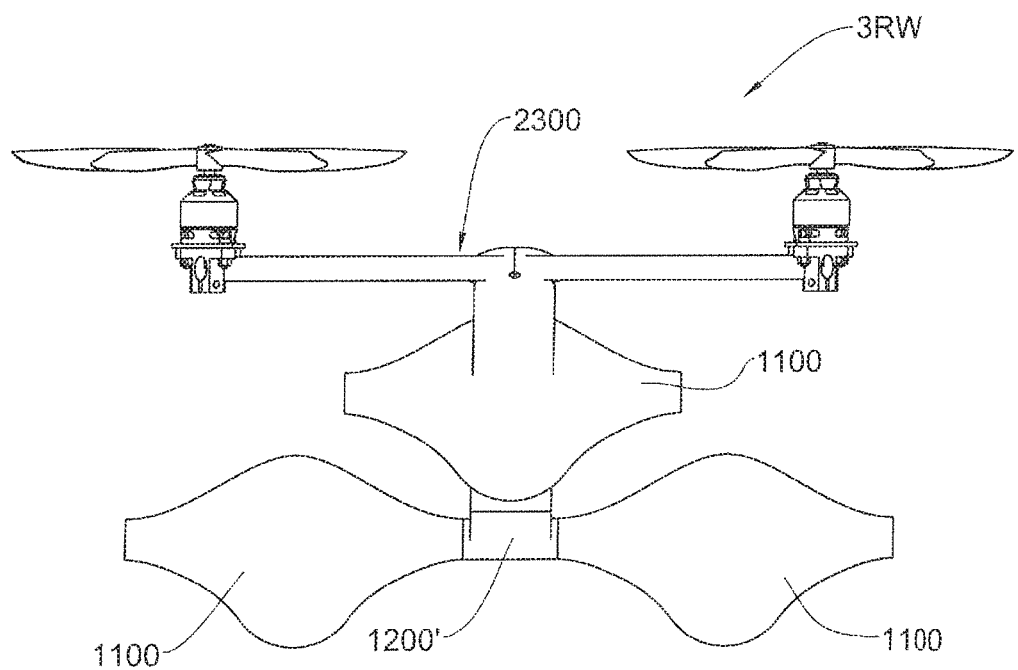
FIG. 31 illustrates, in front view, another example of a rotor wing air vehicle provided by the system of FIG. 1 using three body modules of the example of FIG. 17 mounted to one another.

For example, and referring to FIG. 31, a rotor wing air vehicle 3RW is provided by laterally two body modules 1100 together via a modified interconnector wing modules 1200' that includes an upper connection interface similar to upper body connection interface 400U, which is coupled to the bottom body connection interface 400B of a third body module 1100. The third (upper) body module 1100 is also coupled to a unitary second rotor wing utility module 2300.

Figure 32:
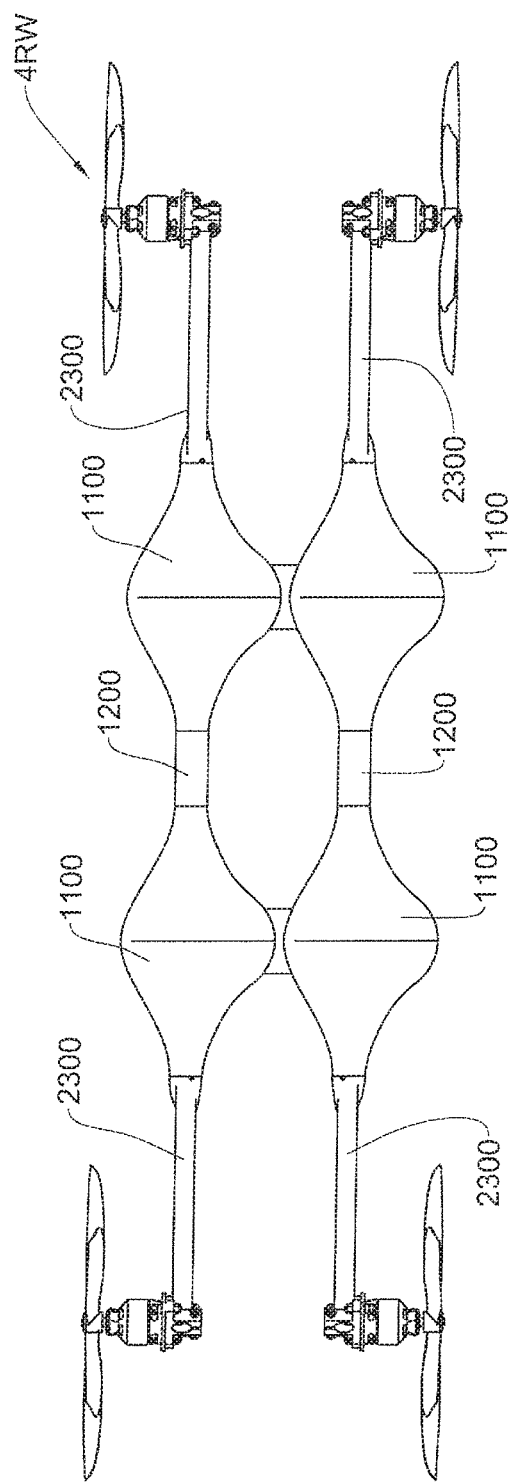
FIG. 32 illustrates, in front view, another example of a rotor wing air vehicle provided by the system of FIG. 1 using four body modules of the example of FIG. 17 mounted to one another.

For example, and referring to FIG. 32, a rotor wing air vehicle 4RW is provided by laterally coupling two pairs of vertically coupled body modules 1100 together via two interconnector wing modules 1200. Each such pair is vertically coupled by coupling the upper body connection interface 400U of the respective lower body module 1100 with the bottom body connection interface 400B of the respective upper body module 1100. The upper body modules 1100 and the lower body modules 1100 are also coupled to a unitary second rotor wing utility module 2300.

Figure 33:
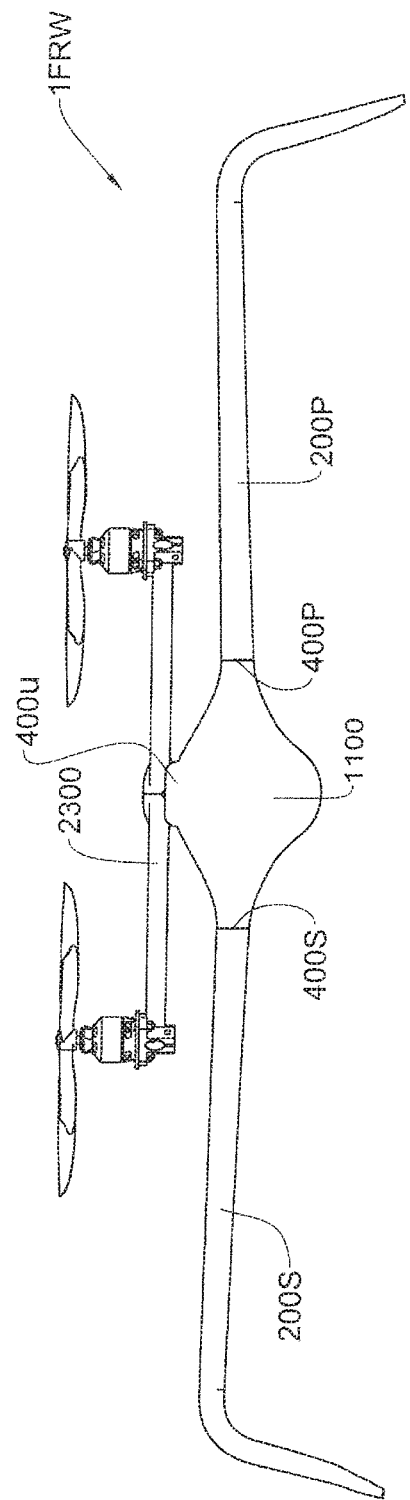
FIG. 33 illustrates, in front view, an example of a hybrid fixed wing/rotary wing air vehicle provided by the system of FIG. 1 using a body module of the example of FIG. 17.

For example, and referring to FIG. 33, a hybrid fixed wing/rotary wing air vehicle 1FRW is provided by coupled a starboard fixed-wing port wing utility module 200S and port fixed-wing port wing utility module 200P to a body module 1100 via the starboard body connection interface 400S and the port body connection interface 400P. The body module 1100 is also coupled to a unitary second rotor wing utility module 2300 via the upper body connection interface 400U.

Figure 34A:
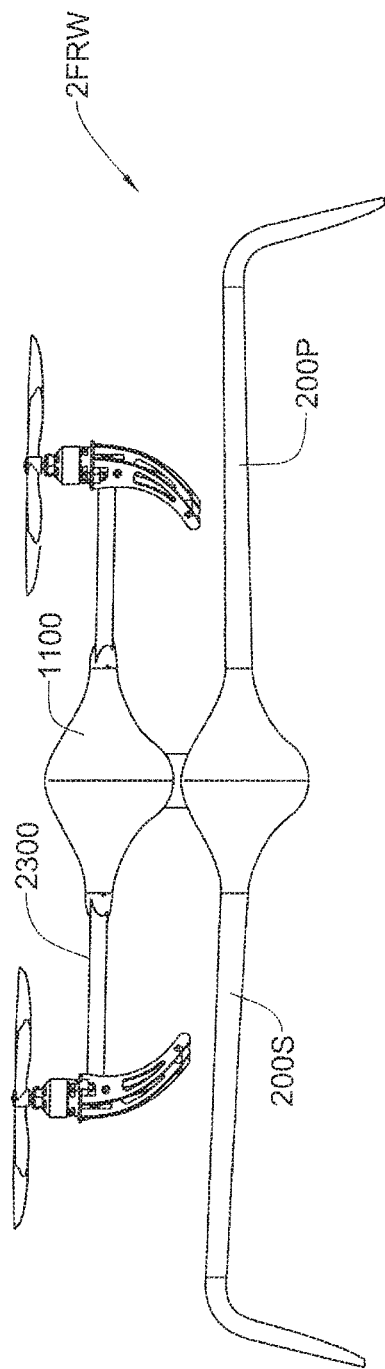
FIG. 34 illustrates, in front view, another example of a hybrid fixed wing/rotary wing air vehicle provided by the system of FIG. 1 using two body module of the example of FIG. 17 mounted to one another.
Figure 34B:
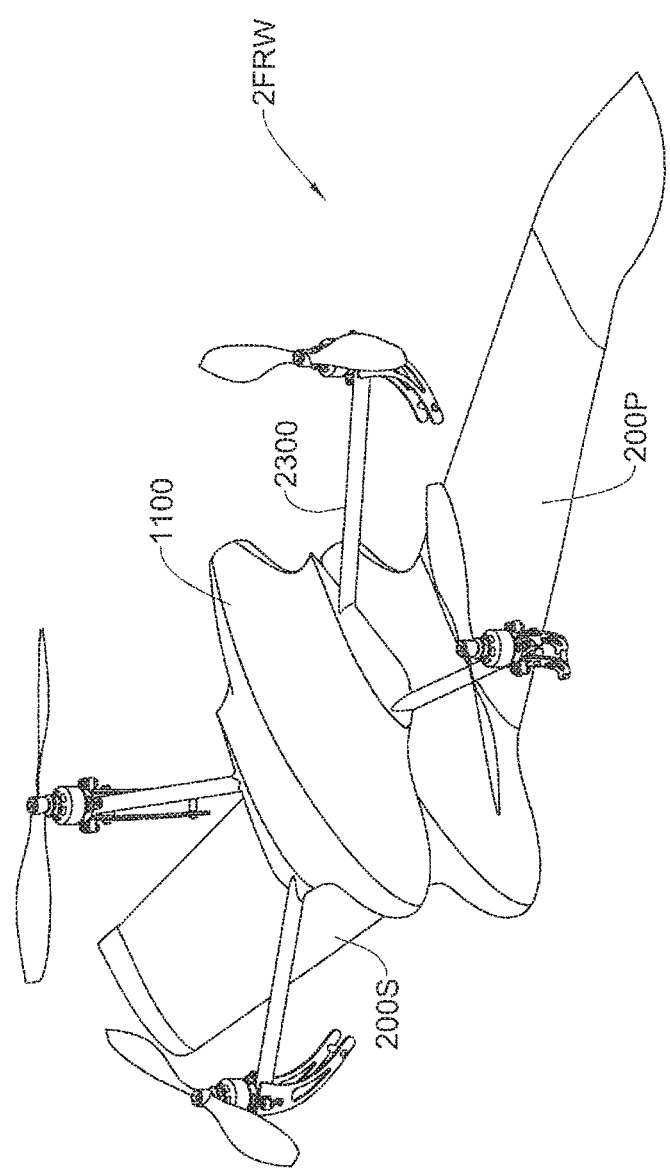

For example, and referring to FIGS. 34(a) and 34(b), a hybrid fixed wing/rotary wing air vehicle 2FRW is provided by vertically coupling two body modules 1100. This vertical coupling is by coupling the upper body connection interface 400U of the respective lower body module 1100 with the bottom body connection interface 400B of the respective upper body module 1100. The upper body module 1100 is also coupled to a unitary second rotor wing utility module 2300. The lower body module 1100 is also coupled to a starboard fixed-wing port wing utility module 200S and a port fixed-wing port wing utility module 200P.

According to certain aspects of the presently disclosed subject matter, the modular vehicle system 10, and in particular the kit 20, further comprises a third utility module 900 configured for enabling at least one body module 1100 or 100 to travel over terrain. The third utility module 900 is in the form of a terrain locomotion system.

Figure 35:
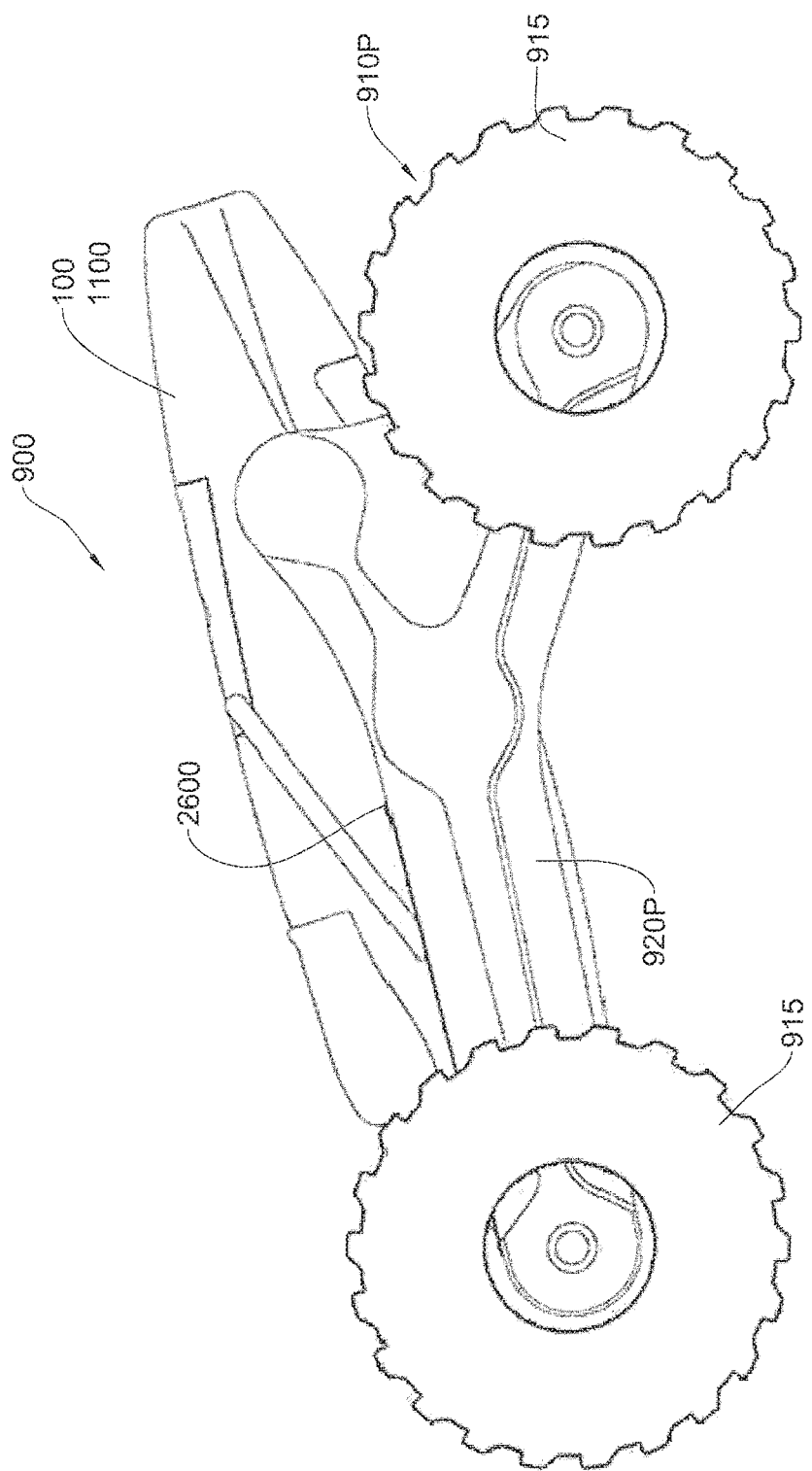
FIG. 35 illustrates, in side view, an example of an air vehicle provided by the system of FIG. 1 using a body module of the example of FIG. 2 or of FIG. 17, and another example utility module of FIG. 1 in the form of a terrain locomotion unit.

Referring to FIG. 35, a first example of third utility module 900 comprises a port locomotion unit 910P including at least two wheels 915 rotatably mounted to a port chassis 920P, and a starboard locomotion unit 910S including at least two wheels rotatably mounted to a starboard chassis 920S.

The third utility module 900 comprises at least one utility module connection interface 500 configured for selectively enabling coupling to the body module 1100 or body module 100. In this example, the utility module connection interface 500 is in the form of a sixth utility module connection interface 2600 configured for coupling with the body connection interface 400. In particular the sixth utility module connection interface 2600 comprises a starboard sixth utility module connection interface 2600S for coupling with the starboard body connection interface 400S, and a port sixth utility module connection interface 2600P for coupling with the port body connection interface 400P, to thereby enable coupling of the respective u third utility module 900 to the body module 1100 or body module 100.

For example, the fourth utility module connection interface 2600 can be similar to the first utility module connection interface 600, as disclosed herein mutatis mutandis.

The wheels can include integral electrical motors or fuel engines, which are supplied with power or fuel by the body module 1100 or body module 100, or can be driven by electrical motors or fuel engines accommodated in the body module 1100 or body module 100 and mechanically coupled thereto, for example in a similar manner to that disclosed herein for the second utility module 200, mutatis mutandis.

Referring to FIGS. 36(*a*) to 36(*d*), an alternative variation of the first example of third utility module 900 comprises a port locomotion unit 910P including a first caterpillar track arrangement 935P instead of wheels, mounted to the port chassis 920P, and a starboard locomotion unit 910S including a second caterpillar track arrangement 935S instead of wheels, mounted to a starboard chassis 920S.

In yet other alternative variations of the first example of third utility module 900 comprises a port locomotion unit 910P including a ski arrangement instead of wheels, mounted to the port chassis 920P, and a starboard locomotion unit 910S including a second ski arrangement instead of wheels, mounted to a starboard chassis 920S. The ski arrangements allow locomotion of the body module over ice or snow. The body module can also include, for example, a body mounted propulsion unit 180 for providing propulsion.

The wheels or caterpillar track arrangements can include integral electrical motors or fuel engines, which are supplied with power or fuel by the body module 1100 or body module 100, or can be driven by electrical motors or fuel engines accommodated in the body module 1100 or body module 100 and mechanically coupled thereto, for example in a similar manner to that disclosed herein for the second utility module 200, mutatis mutandis.

Referring to FIGS. 37(*a*) and 37(*b*), an alternative variation of the example of third utility module 900 of FIGS. 36(*a*) to 36(*d*), further comprises an auxiliary port caterpillar unit 945P connected to the port locomotion unit 910P, in particular to the first caterpillar track arrangement 935P instead of wheels, mounted to the port chassis 920P, and a starboard locomotion unit 910S including a second caterpillar track arrangement 935S instead of wheels, mounted to a starboard chassis 920S.

Furthermore, for example, and referring to FIGS. 38(*a*) and 38(*b*), a hybrid rotary wing/terrain vehicle 1RT is provided by coupling the body module 1100 to a unitary second rotor wing utility module 2300 via the upper body connection interface 400U. The body module 1100 is also coupled to a third utility module 900 via the respective bottom body connection interface 400B. The respective third utility module 900 includes an upper connection interface similar to upper body connection interface 400U, which is coupled to the bottom body connection interface 400B of a body module 1100. The respective third utility module 900 also includes a set of wheels for terrain locomotion. FIG. 38(*a*) shows the hybrid rotary wing/terrain vehicle 1RT in detached configuration, and FIG. 38(*b*) shows the hybrid rotary wing/terrain vehicle 1RT in attached configuration.

According to certain aspects of the presently disclosed subject matter, the modular vehicle system 10, and in particular the kit 20, further comprises a fourth utility module configured for enabling at least one body module 1100 or 100 to travel over water. The fourth utility module can be in the form of a water locomotion system, and for example can include any one of hydrofoils, floats, hulls. Furthermore, the water locomotion system can comprises a drive unit coupled to any one of: water screw, water paddle, air propeller, ducted fan.

Herein, body module 100 or 1100, as well as each utility module, including each first utility module 200, each second utility module 300, and each third utility module 900, is also referred to as a vehicle component.

In the method claims that follow, alphanumeric characters and Roman numerals used to designate claim steps are provided for convenience only and do not imply any particular order of performing the steps.

Finally, it should be noted that the word "comprising" as used throughout the appended claims is to be interpreted to mean "including but not limited to".

While there has been shown and disclosed examples in accordance with the presently disclosed subject matter, it will be appreciated that many changes may be made therein without departing from the spirit of the presently disclosed subject matter.

The invention claimed is:

1. A modular vehicle system, comprising:
   at least one body module comprising at least one body connection interface;
   a kit comprising a plurality of utility modules including at least one first utility module and at least one second utility module, wherein:
   each said first utility module is in the form of a fixed-wing utility module configured for selectively providing said at least one body module with fixed wing flight capability when the fixed-wing utility module is coupled to the at least one body module, each said first utility module comprising at least one utility module connection interface in the form of a first utility module connection interface for coupling with at least one said body connection interface to enable coupling of the respective said first utility module to the said at least one body module;
   each said second utility module is in the form of a rotor-wing utility module configured for selectively providing said at least one body module with rotor wing flight capability when the rotor-wing utility module is coupled to the at least one body module, each said second utility module comprising at least one said utility module connection interface in the form of a second utility module connection interface, distinct from said first utility module connection interface, for coupling with at least one said body connection interface to enable coupling of the respective said second utility module to the said at least one body module;

wherein each said body connection interface is configured for selective reversible coupling at least with respect to any one of said utility module connection interfaces while concurrently excluding coupling of another said utility module connection interface to said body connection interface, to provide an air vehicle, and wherein each said body connection interface is further configured as a body-to-body interface.

2. The modular vehicle system according to claim 1, wherein each said body module comprises one body connection interface for alternately coupling said body module with said fixed-wing utility module or said rotor-wing utility module via the respective said first utility module connection interface or said second utility module connection interface.

3. The modular vehicle system according to claim 2, wherein said fixed-wing utility module comprises an integral wing comprising a port wing component connected to a starboard wing component, wherein said port wing component and said starboard wing component are configured for generating aerodynamic lift sufficient to provide aerodynamic flight capability to said at least one body module when said fixed-wing utility module is coupled to the at least one body module.

4. The modular vehicle system according to claim 1, wherein said fixed-wing utility module comprises at least one wing mounted propulsion unit for providing propulsion to said fixed-wing utility module.

5. The modular vehicle system according to claim 4, including one of the following:
wherein at least one said wing mounted propulsion unit is in fixed geometric relationship with said integral wing to provide a forward propulsion to said integral wing;
wherein at least one said wing mounted propulsion unit is pivotably mounted with respect to said integral wing to provide a vectored propulsion to said integral wing;
wherein said at least one wing mounted propulsion unit is selectively operatively connected to the respective body module via a propulsion system-body module coupling system;
wherein at least one said wing mounted propulsion unit is in fixed geometric relationship with said integral wing to provide a forward propulsion to said integral wing, and, wherein said at least one wing mounted propulsion unit is selectively operatively connected to the respective body module via a propulsion system-body module coupling system; or
wherein at least one said wing mounted propulsion unit is pivotably mounted with respect to said integral wing to provide a vectored propulsion to said integral wing, and, wherein said at least one wing mounted propulsion unit is selectively operatively connected to the respective body module via a propulsion system-body module coupling system.

6. The modular vehicle system according to claim 2, including one of the following:
wherein said rotor-wing utility module comprises a propulsion unit in the form of at least one primary rotor unit for generating rotor lift sufficient to provide rotor flight capability to said at least one body module when coupled to said at least one body module;
wherein said rotor-wing utility module comprises a propulsion unit in the form of at least one primary rotor unit for generating rotor lift sufficient to provide rotor flight capability to said at least one body module when coupled to said at least one body module, and, wherein said rotor-wing utility module comprises one said primary rotor unit for generating rotor lift sufficient to provide rotor flight capability to said at least one body module when coupled to said at least one body module;
wherein said rotor-wing utility module comprises a propulsion unit in the form of at least one primary rotor unit for generating rotor lift sufficient to provide rotor flight capability to said at least one body module when coupled to said at least one body module, and, wherein said rotor-wing utility module comprises one said primary rotor unit for generating rotor lift sufficient to provide rotor flight capability to said at least one body module when coupled to said at least one body module, and, including one of the following:
wherein said primary rotor unit comprises at least one pair of counter-rotating coaxial rotors;
wherein said primary rotor unit comprises at least one main rotor, and said rotor-wing utility module further comprises an anti-torque tail rotor unit;
wherein said rotor-wing utility module comprises a plurality of said primary rotor units for together generating rotor lift sufficient to provide rotor flight capability to said at least one body module when coupled to said at least one body module;
wherein said rotor-wing utility module comprises two said primary rotor units in tandem rotor arrangement or in adjacent lateral spaced arrangement for together generating rotor lift sufficient to provide rotor flight capability to said at least one body module when coupled to said at least one body module;
wherein said rotor-wing utility module comprises three said primary rotor units in triangular arrangement for together generating rotor lift sufficient to provide rotor flight capability to said at least one body module when coupled to said at least one body module;
wherein said rotor-wing utility module comprises three said primary rotor units in triangular arrangement for together generating rotor lift sufficient to provide rotor flight capability to said at least one body module when coupled to said at least one body module, wherein one said rotor unit is aligned with a longitudinal axis of the said at least one body module, wherein the other two said rotor units is spaced on opposite laterals sides of the longitudinal axis;
wherein said rotor-wing utility module comprises four said primary rotor units in quadcopter arrangement for together generating rotor lift sufficient to provide rotor flight capability to said at least one body module when coupled to said at least one body module;
wherein said at least one primary rotor unit is selectively operatively connected to the respective body module via a suitable propulsion system-body module coupling system;
wherein said at least one primary rotor unit is selectively operatively connected to the respective body module via a propulsion system-body module coupling system, and, including one of the following:
wherein said at least one said primary rotor unit comprises an integral electric motor system, and wherein said integral electric motor system is in electrical power communication with an electric power source accommodated in said at least one body module via said propulsion system-body module coupling system in the form of a power coupling system;
wherein said at least one said primary rotor unit comprises an integral electric motor system, and wherein said integral electric motor system is in electrical power communication with an electric power source accommodated in said at least one body module via said propulsion system-body module coupling system in the form of a power coupling system, and wherein said power coupling system comprises a first power coupling component comprised in said utility module connection interface, and a second power coupling component comprised in said body connection interface;
wherein said at least one said primary rotor unit comprises a fuel engine system, and wherein said fuel engine system is in fuel communication with a fuel source accommodated in said at least one body module via said propulsion system-body module coupling system in the form of a fuel coupling system;
wherein said at least one primary rotor unit is driven by an integral electric motor system via said propulsion system-body module coupling system in the form of a mechanical coupling system, and wherein said integral electric motor system is accommodated in said at least one body module;
wherein said at least one primary rotor unit is driven by an integral electric motor system via said propulsion system-body module coupling system in the form of a mechanical coupling system, and wherein said integral electric motor system is accommodated in said at least one body module, and wherein said mechanical coupling system comprises a first driveshaft coupling component comprised in said utility module connection interface, and a second driveshaft coupling component comprised in said body connection interface;
wherein said at least one primary rotor unit is unpowered by a propulsion unit.

7. The modular vehicle system according to claim 2, wherein:
said at least one body module comprises at least two said body connection interfaces, including a port said body connection interface and a starboard said body connection interface;
said fixed-wing utility module comprises at least one port fixed-wing utility module comprising one said first utility module connection interface for selective reversible coupling with said port body connection interface, and at least one starboard fixed-wing utility module comprising another said first utility module connection interface for selective reversible coupling with said starboard body connection interface; and
said rotor-wing utility module comprises at least one port rotor-wing utility module comprising one said second utility module connection interface for selective reversible coupling with said port body connection interface, and at least one starboard rotor-wing utility module comprising another said second utility module connection interface for selective reversible coupling with said starboard body connection interface.

8. The modular vehicle system according to claim 7, including one of the following:
wherein said port fixed-wing utility module and said starboard fixed-wing port wing utility module are configured for generating aerodynamic lift sufficient to provide aerodynamic flight capability to said at least one body module when said port fixed-wing utility module and said starboard fixed-wing port wing utility module are coupled thereto;
wherein said port fixed-wing utility module and said starboard fixed-wing port wing utility module are configured for generating aerodynamic lift sufficient to provide aerodynamic flight capability to said at least one body module when said port fixed-wing utility module and said starboard fixed-wing port wing utility module are coupled thereto, and, wherein each one of said port fixed-wing utility module and said starboard fixed-wing port wing utility module comprises at least one wing mounted propulsion unit for providing propulsion to the respective said port fixed-wing utility module and said starboard fixed-wing port wing utility module;
wherein said port fixed-wing utility module and said starboard fixed-wing port wing utility module are configured for generating aerodynamic lift sufficient to provide aerodynamic flight capability to said at least one body module when said port fixed-wing utility module and said starboard fixed-wing port wing utility module are coupled thereto, and, wherein each one of said port fixed-wing utility module and said starboard fixed-wing port wing utility module comprises at least one wing mounted propulsion unit for providing propulsion to the respective said port fixed-wing utility module and said starboard fixed-wing port wing utility module, and, including at least one of the following:
wherein at least one said wing mounted propulsion unit is in fixed geometric relationship with the respective said port fixed-wing utility module or said starboard fixed-wing port wing utility module to provide a forward propulsion thereto;
wherein at least one said wing mounted propulsion unit is pivotably mounted with respect to the respective said port fixed-wing utility module or said starboard fixed-wing port wing utility module to provide a vectored propulsion thereto;
wherein said port fixed-wing utility module and said starboard fixed-wing port wing utility module are configured for generating aerodynamic lift sufficient to provide aerodynamic flight capability to said at least one body module when said port fixed-wing utility module and said starboard fixed-wing port wing utility module are coupled thereto, and, wherein each one of said port fixed-wing utility module and said starboard fixed-wing port wing utility module comprises at least one wing mounted propulsion unit for providing propulsion to the respective said port fixed-wing utility module and said starboard fixed-wing port wing utility module, and, wherein said at least one wing mounted propulsion unit is selectively operatively connected to the respective body module via a propulsion system-body module coupling system;
wherein said port fixed-wing utility module and said starboard fixed-wing port wing utility module are configured for generating aerodynamic lift sufficient to provide aerodynamic flight capability to said at least one body module when said port fixed-wing utility module and said starboard fixed-wing port wing utility module are coupled thereto, and, wherein each one of said port fixed-wing utility module and said starboard fixed-wing port wing utility module comprises at least one wing mounted propulsion unit for providing propulsion to the respective said port fixed-wing utility module and said starboard fixed-wing port wing utility module, and, wherein said at least one wing mounted propulsion unit is selectively operatively connected to the respective body module via a propulsion system-body module coupling system, and including at least one of the following:
wherein said at least one wing mounted propulsion unit comprises an integral electric motor system, and wherein said integral electric motor system is in electrical power communication with an electric power source accommodated in said at least one body module via said propulsion system-body module coupling system in the form of a power coupling system;
wherein said at least one wing mounted propulsion unit comprises a fuel engine system, and wherein said fuel engine system is in fuel communication with a fuel source accommodated in said at least one body module via said propulsion system-body module coupling system in the form of a fuel coupling system;
wherein said at least one wing mounted propulsion unit comprises an integral electric motor system, and wherein said integral electric motor system is in electrical power communication with an electric power source accommodated in said at least one body module via said propulsion system-body module coupling system in the form of a power coupling system, and wherein said power coupling system comprises a first power coupling component comprised in said utility module connection interface, and a second power coupling component comprised in said body connection interface;
wherein said at least one wing mounted propulsion unit is driven by an electric motor system via said propulsion system-body module coupling system in the form of a mechanical coupling system, and wherein said electric motor system is accommodated in said at least one body module;
wherein said at least one wing mounted propulsion unit is driven by an electric motor system via said propulsion system-body module coupling system in the form of a mechanical coupling system, and wherein said electric motor system is accommodated in said at least one body module, and wherein said mechanical coupling system comprises a first driveshaft coupling component comprised in said utility module connection interface, and a second driveshaft coupling component comprised in said body connection interface;
wherein said port fixed-wing utility module and said starboard fixed-wing port wing utility module are configured for generating aerodynamic lift sufficient to provide aerodynamic flight capability to said at least one body module when said port fixed-wing utility module and said starboard fixed-wing port wing utility module are coupled thereto, and, wherein each one of said port fixed-wing utility module and said starboard fixed-wing port wing utility module comprises at least one wing mounted propulsion unit for providing propulsion to the respective said port fixed-wing utility module and said starboard fixed-wing port wing utility module, and, including at least one of the following:
wherein said fixed-wing utility module has an absence of propulsion unit;
wherein said fixed-wing utility module has an absence of propulsion unit, and wherein said air vehicle comprising said body module coupled with said fixed-wing utility module is configured for operation as a glider.

9. The modular vehicle system according to claim 7, wherein said port rotor-wing utility module comprises at least one primary rotor unit for generating rotor lift and said starboard rotor-wing utility module comprises at least one said primary rotor unit for generating rotor lift, wherein a collective said rotor lift is sufficient to provide rotor flight capability to said at least one body module when said port rotor-wing utility module and said starboard rotor-wing utility module are coupled to said at least one body module, and further including one of the following:
wherein each one of said port rotor-wing utility module and said starboard rotor-wing port wing utility module comprises one said primary rotor unit for generating said corresponding rotor lift;
wherein each one of said port rotor-wing utility module and said starboard rotor-wing port wing utility module comprises one said primary rotor unit for generating said corresponding rotor lift, and, wherein each one of said port rotor-wing utility module and said starboard rotor-wing port wing utility module comprises at least one pair of counter-rotating coaxial rotors;
wherein each one of said port rotor-wing utility module and said starboard rotor-wing port wing utility module comprises one said primary rotor unit for generating said corresponding rotor lift, and, wherein each one of said port rotor-wing utility module and said starboard rotor-wing port wing utility module comprises at least one pair of counter-rotating coaxial rotors, and, wherein each one of said port rotor-wing utility module and said starboard rotor-wing port wing utility module comprises at least one said primary rotor;
wherein each one of said port rotor-wing utility module and said starboard rotor-wing port wing utility module comprises a plurality of said primary rotor units for together generating rotor lift sufficient to provide rotor flight capability to said at least one body module when coupled to said at least one body module; or
wherein each one of said port rotor-wing utility module and said starboard rotor-wing port wing utility module comprises two said primary rotor units to provide a quadcopter arrangement for said at least one body module when coupled to said at least one body module, said rotor units together generating rotor lift sufficient to provide aerodynamic flight capability to said at least one body module when coupled to said at least one body module;
wherein said at least one wing mounted propulsion unit is selectively operatively connected to the respective body module via a propulsion system-body module coupling system.

10. The modular vehicle system according to claim 7, wherein said port rotor-wing utility module comprises at least one primary rotor unit for generating rotor lift and said starboard rotor-wing utility module comprises at least one said primary rotor unit for generating rotor lift, wherein a collective said rotor lift is sufficient to provide rotor flight capability to said at least one body module when said port rotor-wing utility module and said starboard rotor-wing utility module are coupled thereto, and wherein said at least one wing mounted propulsion unit is selectively operatively connected to the respective body module via a propulsion system-body module coupling system, and including at least one of the following:

wherein said at least one said primary rotor unit comprises an integral electric motor system, and wherein said integral electric motor system is in electrical power communication with an electric power source accommodated in said at least one body module via said propulsion system-body module coupling system in the form of a power coupling system;

wherein said at least one said primary rotor unit comprises an integral electric motor system, and wherein said integral electric motor system is in electrical power communication with an electric power source accommodated in said at least one body module via said propulsion system-body module coupling system in the form of a power coupling system, and wherein said power coupling system comprises a first power coupling component comprised in said utility module connection interface, and a second power coupling component comprised in said body connection interface;

wherein said at least one said primary rotor unit comprises a fuel engine system, and wherein said fuel engine system is in fuel communication with a fuel source accommodated in said at least one body module via said propulsion system-body module coupling system in the form of a fuel coupling system;

wherein said at least one primary rotor unit is driven by an electric motor system via said propulsion system-body module coupling system in the form of a mechanical coupling system, and wherein said electric motor system is accommodated in said at least one body module;

wherein said at least one primary rotor unit is driven by an electric motor system via said propulsion system-body module coupling system in the form of a mechanical coupling system, and wherein said electric motor system is accommodated in said at least one body module, and wherein said mechanical coupling system comprises a first driveshaft coupling component comprised in said utility module connection interface, and a second driveshaft coupling component comprised in said body connection interface.

11. The modular vehicle system according to claim 1, wherein at least one said body module comprises a least one body mounted propulsion unit for providing propulsion to said body module.

12. The modular vehicle system according to claim 1, including at least one of the following:
   wherein at least one said body module comprises operative components including a power supply and at least one of: navigation module, control computer, sensors, communication system; or
   wherein at least one of said operative components is in modular form, and said body module is configured for enabling replacement of said modular operative components.

13. The modular vehicle system according to claim 1, wherein at least one of said body module, fixed-wing utility module, and rotor-wing utility module comprises an undercarriage.

14. The modular vehicle system according to claim 1, wherein at least one said body module comprises a payload bay.

15. The modular vehicle system according to claim 1, comprising at least two body modules, each said body module having at least one body-to-body connection interface configured for coupling to another said body-to-body connection interface to enable coupling of one said body module to another said body module.

16. The modular vehicle system according to claim 1, wherein at least one said body module comprises a terrain locomotion system for enabling the body to travel over terrain.

17. The modular vehicle system according to claim 16, including one of the following:
   wherein said terrain locomotion system comprises any one of wheels, caterpillar tracks, skis; or
   wherein said terrain locomotion system comprises any one of wheels, caterpillar tracks, skis, and wherein said terrain locomotion system comprises a drive unit coupled to said wheels or caterpillar tracks.

18. The modular vehicle system according to claim 1, wherein at least one said body module comprises one of the following:
   a water locomotion system for enabling the body to travel over water; or
   a water locomotion system for enabling the body to travel over water, and including one of the following:
      wherein said water locomotion system comprises any one of hydrofoils, floats, hull; or
      wherein said water locomotion system comprises any one of hydrofoils, floats, hull, and wherein said water locomotion system comprises a drive unit coupled to any one of: water screw, water paddle, air propeller, ducted fan.

19. A modular vehicle comprising at least one body module and at least one first utility module or at least one second utility module coupled to the at least one body module, wherein said at least one body module, said at least one first utility module, and said at least one second utility module are provided by the modular vehicle system as defined in claim 1.

20. The modular vehicle according to claim 19, wherein the modular vehicle is configured as a UAV.

21. The modular vehicle according to claim 19, wherein at least one said body module comprises at least one of:
   a terrain locomotion system for enabling the body to travel over terrain; or
   a water locomotion system for enabling the body to travel over water.

22. A method for operating a modular vehicle system, the method comprising:
   providing at least one said modular vehicle system as defined in claim 1;
   coupling one of said fixed-wing utility module or said rotor-wing utility module to said body module to provide said air vehicle; and
   operating said air vehicle.

23. The method according to claim 22, further comprising
   uncoupling said one of said fixed-wing utility module or said rotor-wing utility module from said body module;
   coupling the other one of said fixed-wing utility module or said rotor-wing utility module to said body module to provide said air vehicle.

24. The method according to claim 22, further comprising providing a third utility module in the form of a terrain locomotion system to the body module to enable the body module to travel over terrain.

25. The method according to claim 22, further comprising providing a fourth utility module in the form of a water locomotion system to the body module to enable the body module to travel over water.

26. A method for operating a modular vehicle system, the method comprising:

providing at least one said modular vehicle system as defined in claim 1;

coupling at least one additional said body module to said at least one said body module to provide said air vehicle; and operating said air vehicle.

\* \* \* \* \*